(12) United States Patent
Piepgras et al.

(10) Patent No.: US 7,161,313 B2
(45) Date of Patent: Jan. 9, 2007

(54) LIGHT EMITTING DIODE BASED PRODUCTS

(75) Inventors: Colin Piepgras, Salem, MA (US); George G. Mueller, Boston, MA (US); Ihor A. Lys, Milton, MA (US); Kevin J. Dowling, Westford, MA (US); Frederick M. Morgan, Quincy, MA (US)

(73) Assignee: Color Kinetics Incorporated, Boston, MA (US)

( * ) Notice: Subject to any disclaimer, the term of this patent is extended or adjusted under 35 U.S.C. 154(b) by 0 days.

(21) Appl. No.: 11/106,381

(22) Filed: Apr. 14, 2005

(65) Prior Publication Data

US 2005/0285547 A1    Dec. 29, 2005

Related U.S. Application Data

(63) Continuation of application No. 10/245,786, filed on Sep. 17, 2002, now Pat. No. 6,965,205, which is a continuation-in-part of application No. 09/971,367, filed on Oct. 4, 2001, now Pat. No. 6,788,011, which is a continuation of application No. 09/669,121, filed on Sep. 25, 2000, now Pat. No. 6,806,659, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038, said application No. 10/245,786 is a continuation-in-part of application No. 09/805,368, filed on Mar. 13, 2001, and a continuation-in-part of application No. 09/805,590, filed on Mar. 13, 2001, now Pat. No. 7,064,498, and a continuation-in-part of application No. 09/215,624, filed on Dec. 17, 1998, now Pat. No. 6,528,954, and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, and a continuation-in-part of application No. 09/333,739, filed on Jun. 15, 1999, and a continuation-in-part of application No. 09/815,418, filed on Mar. 22, 2001, now Pat. No. 6,577,080, which is a continuation of application No. 09/213,548, filed on Dec. 17, 1998, now Pat. No. 6,166,496.

(60) Provisional application No. 60/071,281, filed on Dec. 17, 1997, provisional application No. 60/329,202, filed on Oct. 12, 2001, provisional application No. 60/341,476, filed on Oct. 30, 2001, provisional application No. 60/335,679, filed on Oct. 23, 2001, provisional application No. 60/353,569, filed on Feb. 1, 2002, provisional application No. 60/199,333, filed on Apr. 24, 2000, provisional application No. 60/211,417, filed on Jun. 14, 2000, provisional application No. 60/322,765, filed on Sep. 17, 2001.

(51) Int. Cl.
*H05B 37/00* (2006.01)

(52) U.S. Cl. .................. 315/318; 315/312; 315/292; 315/294; 362/606; 362/615; 362/612; 362/236

(58) Field of Classification Search ............... 315/292, 315/294, 295, 297, 312, 316, 318, 76; 362/601, 362/605, 606, 612, 615, 609, 628, 620, 800, 362/516, 230, 231, 293, 236, 543; 345/102; 349/61

See application file for complete search history.

(56) References Cited

U.S. PATENT DOCUMENTS

| | | |
|---|---|---|
| 1,324,008 A | 12/1919 | D'Humy |
| 2,135,480 A | 11/1938 | Birdseye |
| 2,769,897 A | 11/1956 | Rzeszuiko |
| 3,201,576 A | 8/1965 | Scott |
| 3,644,785 A | 2/1972 | Jarmar |
| 3,696,263 A | 10/1972 | Wacher |
| 3,875,456 A | 4/1975 | Kano et al. |

| | | | |
|---|---|---|---|
| 4,045,664 A | 8/1977 | Vrenken et al. | |
| 4,317,071 A | 2/1982 | Murad | |
| 4,342,906 A | 8/1982 | Hyatt | |
| 4,641,227 A | 2/1987 | Kusuhara | |
| 4,957,291 A | 9/1990 | Miffitt et al. | |
| 5,057,981 A | 10/1991 | Bowen et al. | |
| 5,060,118 A | 10/1991 | Penrod et al. | |
| 5,136,483 A | 8/1992 | Schöniger et al. | |
| 5,165,778 A | 11/1992 | Matthias et al. | |
| 5,217,285 A | 6/1993 | Sopori | |
| 5,278,610 A | 1/1994 | Ishiwatari et al. | |
| 5,301,090 A * | 4/1994 | Hed | 362/558 |
| 5,309,541 A | 5/1994 | Flint | |
| 5,353,786 A | 10/1994 | Wilk | |
| 5,384,519 A | 1/1995 | Gotoh | |
| 5,400,228 A | 3/1995 | Kao | |
| 5,418,697 A | 5/1995 | Chiou | |
| 5,515,136 A | 5/1996 | Nishio | |
| 5,521,708 A | 5/1996 | Beretta | |
| 5,532,848 A | 7/1996 | Beretta | |
| 5,544,037 A | 8/1996 | Luger | |
| 5,577,832 A | 11/1996 | Lodhie | |
| 5,607,227 A | 3/1997 | Yasumoto et al. | |
| 5,642,933 A | 7/1997 | Hitora | |
| 5,653,529 A | 8/1997 | Spocharski | |
| 5,655,830 A | 8/1997 | Ruskouski | |
| 5,682,035 A | 10/1997 | Gallagher et al. | |
| 5,707,139 A | 1/1998 | Haitz | |
| 5,749,646 A | 5/1998 | Brittell | |
| 5,803,579 A * | 9/1998 | Turnbull et al. | 362/516 |
| 5,806,965 A | 9/1998 | Deese | |
| 5,831,686 A | 11/1998 | Beretta | |
| 5,887,968 A | 3/1999 | Logan | |
| 5,899,552 A * | 5/1999 | Yokoyama et al. | 362/619 |
| 5,949,581 A | 9/1999 | Kurtenbach et al. | |
| 5,959,316 A | 9/1999 | Lowery | |
| 5,982,957 A | 11/1999 | DeCaro | |
| 5,982,969 A | 11/1999 | Sugiyama et al. | |
| 5,998,925 A | 12/1999 | Shimizu et al. | |
| 6,007,209 A | 12/1999 | Pelka | 362/30 |
| 6,056,420 A | 5/2000 | Wilson et al. | |
| 6,066,861 A | 5/2000 | Höhn et al. | |
| 6,158,882 A | 12/2000 | Bischoff, Jr. | |
| 6,161,941 A | 12/2000 | Tait | |
| 6,243,068 B1 | 6/2001 | Evanicky et al. | 345/102 |
| 6,245,259 B1 | 6/2001 | Höhn et al. | |
| 6,252,254 B1 | 6/2001 | Soules | |
| 6,259,430 B1 | 7/2001 | Riddle et al. | |
| 6,277,301 B1 | 8/2001 | Höhn et al. | |
| 6,299,329 B1 | 10/2001 | Mui et al. | |
| 6,299,338 B1 | 10/2001 | Levinson et al. | |
| 6,335,548 B1 | 1/2002 | Roberts et al. | |
| 6,386,720 B1 | 5/2002 | Mochizuki | |
| 6,394,623 B1 | 5/2002 | Tsui | |
| 6,441,943 B1 | 8/2002 | Roberts et al. | |
| 6,357,893 B1 | 11/2002 | Belliveau | |
| 6,474,837 B1 | 11/2002 | Belliveau | |
| 6,508,564 B1 | 1/2003 | Kuwabara et al. | |
| 6,576,930 B1 | 6/2003 | Reeh et al. | |
| 6,592,780 B1 | 7/2003 | Höhn et al. | |
| 6,609,813 B1 | 8/2003 | Showers et al. | |
| 6,618,031 B1 | 9/2003 | Bohn | |
| 6,676,284 B1 | 1/2004 | Wynne Willson | |
| 6,744,223 B1 | 6/2004 | Laflamme | |
| 6,788,011 B1 * | 9/2004 | Mueller et al. | 315/294 |
| 6,812,500 B1 | 11/2004 | Reeh et al. | |
| 7,014,336 B1 * | 3/2006 | Ducharme et al. | 362/231 |
| 2002/0114155 A1 | 8/2002 | Katogi et al. | |
| 2003/0021115 A1 | 1/2003 | Sloan et al. | |
| 2003/0048641 A1 | 3/2003 | Alexanderson et al. | |
| 2004/0218387 A1 | 11/2004 | Gerlach | |
| 2005/0063194 A1 * | 3/2005 | Lys et al. | 362/545 |
| 2005/0122064 A1 | 6/2005 | Chevalier et al. | |
| 2005/0122292 A1 | 6/2005 | Schritz et al. |
| 2005/0122293 A1 | 6/2005 | Wang |
| 2005/0122718 A1 | 6/2005 | Kazar et al. |
| 2005/0128743 A1 | 6/2005 | Chuey et al. |

FOREIGN PATENT DOCUMENTS

| | | |
|---|---|---|
| CH | 253968 | 12/1948 |
| DE | 01950581 | 10/1969 |
| DE | 02243245 | 9/1972 |
| DE | 03526590 A1 | 7/1985 |
| DE | 19624087 A1 | 6/1996 |
| DE | 19638667 A1 | 9/1996 |
| DE | 29620583 U1 | 2/1997 |
| DE | 29620583 U1 | 3/1997 |
| DE | 19829270 A1 | 7/1998 |
| DE | 20007134 U1 | 4/2000 |
| DE | 20007134 U1 | 9/2000 |
| EP | 0490329 A1 | 6/1992 |
| EP | 0639938 A1 | 2/1995 |
| EP | 0689373 A2 | 12/1995 |
| EP | 0701390 A2 | 3/1996 |
| EP | 0971421 A2 | 1/2000 |
| JP | 04-015685 | 1/1992 |
| JP | 07335942 A | 12/1995 |
| JP | 08248901 A | 9/1996 |
| JP | 08293391 A | 11/1996 |
| JP | 09007774 A | 1/1997 |
| JP | 09167861 A | 6/1997 |
| JP | 10-071951 | 3/1998 |
| JP | 10242513 A | 9/1998 |
| JP | 11039917 A | 2/1999 |
| JP | 11087770 A | 3/1999 |
| JP | 11087774 A | 3/1999 |
| JP | 11133891 A | 5/1999 |
| JP | 11202330 A | 7/1999 |
| JP | 2001-153690 | 6/2001 |
| WO | WO 97/48138 | 12/1997 |
| WO | WO 00/33390 | 6/2000 |

OTHER PUBLICATIONS

U.S. Appl. No. 10/935,329, filed Sep. 7, 2004, by Ducharme*
U.S. Appl. No. 10/705,543, filed Nov. 10, 2003, by Ducharme et al.*
U.S. Appl. No. 10/930,345, filed Aug. 31, 2004, by Ducharme et al.*
U.S. Appl. No. 11/322,891, filed Dec. 30, 2005, by Ducharme et al.*
U.S. Appl. No. 10/678,971, filed Oct. 3, 2003, by Mueller et al.*
U.S. Appl. No. 10/701,132, filed Nov. 4, 2003, by Mueller et al.*
U.S. Appl. No. 10/810,481, filed Mar. 26, 2004, by Mueller et al.*
U.S. Appl. No. 110/958,168, filed Oct. 4, 2004, by Mueller et al.*
U.S. Appl. No. 11/224,683, filed Sep. 12, 2005, by Chemel et al.*
U.S. Appl. No. 10/159,593, filed May 30, 2002, by Lys et al.*
U.S. Appl. No. 09/333,739, filed Jun. 15, 1999, by Morgan et al.*
U.S. Appl. No. 10/360,594, filed Feb. 6, 2003, by Morgan et al.*
Munch, W., "Fortschritte in der Bewertung der Farbwiedergabe durch Lichtquellen." Tagungsbericht uber das IV, Internationale Kolloquium an der Hochschule fur Elektronik Ilmenau, Oct. 1959.
Bass, M, "Handbook of Optics," McGraw Hill, USA, 1995, p. 26.33.
Girardet, V. W., "Handbuch for Beleuchtung," Essen, Germany 1975.
Ganslandt et al., "Handbuch der Lichtplanung," Vieweg +Sohn, Wiesbaden, 1992.
Nakamura, S., "The Blue Laser Diode," Seiten 7-10, pp. 216-221, Springer Verlag, Berlin, Germany, 1997.
Opposition Brief, May 8, 2006, by Osram GmbH, opposing European Patent No. 1234140, pp. 1-21.
Opposition Brief, May 4, 2006, by Tridonic Atco GmbH and Co. KG, opposing European Patent No. 1234140, pp. 1-21.
Opposition Brief, May 10, 2006, by ERCO Leuchten GmbH, opposing European Patent No. 1234140, pp. 1-20.
Opposition Brief, May 10, 2006, by Koniklijke Philips Electronics N.V., opposing European Patent No. 1234140, pp. 1-24.

Proctor, P., "Bright Lights, Big Reliability," *Aviation Week and Space Technology*, Sep. 5, 1994, vol. 141, No. 10. pg. 29, Abstract Only.

Pollack, A., "The Little Light Light That Could," *The New York Times*, Apr. 29, 1996, Business/Financial Desk, Section D, p. 1, col. 2, Abstract Only.

Chinnock, C., "Blue Laser, Bright Future," *Byte*, Aug. 1995, vol. 20, Abstract Only.

*Electronics*, vol. 67, No. 20, pg. A4, Abstract Only; Oct. 24, 1994.

LEDtronics, Inc., LEDtronics Press Releases, "Conversion to LED System Provides Safe, Cost-Effective Lighting for Safelight Manufacturing," and "Ultra-Bright LED Replacements Offered for Industrial Control, Motor Control, Pilot Lights," Jun. 30, 1997.

*Color Kinetics* v. *Super Vision International, Inc.,* "Super Vision International, Inc's Notice of Filing Declaration of Steve Faber," United States District Court, District of Massachusetts, Case No. 02 CV 11137 MEL, Apr. 29, 2005.

*Color Kinetics* v. *Super Vision International, Inc.,* "Super Vision International, Inc.'s Notice of Filing Declaration of Russell Martin," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Tam Bailey," United States District Court, District of Massachusetts, Case No. 02 CV 11137 MEL, Apr. 27, 2005.

*Color Kinetics* v. *Super Vision International, Inc.,* "Super Vision International, Inc.'s Notice of Filing Declaration of Peter Micha," United States District Court, District of Massachusetts, Case No. 02 CV 11137 MEL, Apr. 29, 2005.

*Color Kinetics* v. *Super Vision International, Inc.,* "Super Vision International, Inc.'s Notice of Filing Declaration of Brett Kingstone Part I," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingstone Part II," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingstone Part III," United States District Court, District of Massachusetts, Case No, 02 CV 11137 MEL, May 3, 2005.

*Color Kinetics* v. *Super Vision International, Inc.,* "Super Vision International, Inc's Notice of Filing Declaration of Brett Kingstone Part IV," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingstone Part V," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingstone Part VII," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingstone Part VIII," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingstone Part IX," United States District Court, District of Massachusetts, Case No. 02 CV 11137 MEL, May 3, 2005.

*Color Kinetics* v. *Super Vision International, Inc.,* "Super Vision International, Inc's Notice of Filing Declaration of Brett Kingston Part X," United States District Court, District of Massachusetts, Case No. 02 CV 11137 MEL, May 3, 2005.

*Color Kinetics Incorporated* v. *Super Vision International, Inc.,* "Declaration of Wayne Howell in Opposition to Color Kinetics's Motions for Summary Judgment Against Super Vision International, Inc.," United States District Court, District of Massachusetts, Case No. 02 CV 11137 MEL, May 9, 2005.

*Color Kinetics Incorporated* v. *Super Vision International, Inc.,* "Declaration of Wayne Howell in Opposition to Color Kinetics's Motions for Summary Judgment Against Super Vision International, Inc.," United States District Court, District of Massachusetts, Case No. 02 CV 11137 MEL, May 9, 2005.

*Color Kinetics Incorporated* v. *Super Vision International, Inc.,* "Declaration of Jerry Laidman in Opposition of Color Kinetics, Inc.'s Motion for Summary Judgment Against Super Vision International, Inc.," United States District Court, District of Massachusetts, Case No. 02 CV 11137 MEL, May 12, 2005.

*Color Kinetics Incorporated* v. *Super Vision International, Inc.,* "Affidavit of Alfred D. Ducharme," United States District Court, District of Massachusetts, Case No. 02 CV 11137 MEL, May 5, 2003.

*Color Kinetics Incorporated* v. *Super Vision International, Inc.,* "Declaration of Clive Mitchell in Opposition of Color Kinetics Inc.'s Motion for Summary Judgement Against Super Vision International, Inc.," United States District Court, District of Massachusetts, Case No. 02 CV 11137 MEL, May 10, 2005.

*Color Kinetics Incorporated* v. *Super Vision International, Inc.,* "Declaration of Bruce Hagopian in Support of Super Vision International, Inc.'s Motion for Summary Judgement Against Color Kinetics, Inc.," United States District Court, District of Massachusetts, Case No. 02 CV 11137 MEL, Feb. 18, 2005.

*Color Kinetics Incorporated* v. *Super Vision International, Inc.,* "Declaration of William Little in Opposition to Color Kinetics's Motions for Summary Judgment Against Super Vision International, Inc." United States District Court, District of Massachusetts, Case No. 02 CV 11137 MEL May 9, 2005.

*Color Kinetics Incorporated* v. *Super Vision International, Inc.,* "Super Vision Intentional, Inc.'s Notice of Filing Declaration of Brent W. Brown," United States District Court, district of Massachusetts, Case No. 02 CV 11137 MEL, May 23, 2005.

Color Kinetics Incorporated v. Super Vision International, Inc., "Super Vision International, Inc.'s Notice of Filing Amended Declaration of George G. Izenour," United States District Court, District of Massachusetts, Case No. 02 CV 11137 MEL, May 24, 2005.

Color Kinetics Incorporated v. Super Vision International, Inc., "Super Vision International Inc.'s Notice of Filing Declaration of Paul A. Miller," United States District Court, District of Massachusetts, Case No. 02 CV 11137 MEL, May 20, 2005.

Color Kinetics Incorporated v. Super Vision International, Inc., "Declaration of Brett Kingstone in Opposition to Color Kinetic's Motion for Summary Judgment Against Super Vision International, Inc.," United States District Court, District of Massachusetts Case No. 02 CV 11137 MEL, June 1, 2005.

* cited by examiner

*Primary Examiner*—Haissa Philogene
(74) *Attorney, Agent, or Firm*—Wolf, Greenfield & Sacks

(57) ABSTRACT

Various exemplary implementations of light emitting diode (LED) based illumination products and methods are disclosed including, but not limited to, glow sticks, key chains, toys, balls, various game accessories, light bulbs, night lights, wall lights, wall switches, wall sockets, wall panels, modular lights, flexible lights, automotive lights, wearable accessories, light ropes, decorative lights such as icicles and icicle strings, light tubes, insect control lights and methods, and lighted air fresheners/scent dispensers. Any of the foregoing devices may be equipped with various types of user interfaces (both "local" and "remote") to control light generated from the device. Additionally, devices may be controlled via light control information or programs stored in device memory and/or transmitted or downloaded to the devices (e.g., devices may be controlled individually or collectively in groups via a network, glow sticks or other products may be downloaded with programming information that is stored in memory, etc.). Devices also may include sensors so that the generated light may change in response to various operating and/or environmental conditions or a user input. Various optical processing devices which may be used with any of the devices (e.g., reflectors, diffusers, etc.) also are disclosed.

33 Claims, 40 Drawing Sheets

LIGHT EMITTING DIODE BASED PRODUCTS

CROSS-REFERENCES TO RELATED APPLICATIONS

This application claims the benefit under 35 U.S.C. §120 as a continuation U.S. Non-provisional application Ser. No. 10/245,786, filed Sep. 17, 2002, now U.S. Pat. No. 6,965, 205, entitled "Light Emitting Diode Based Products" which claims the benefit under 35 U.S.C. §119(e) of the following U.S. Provisional Applications:

Ser. No. 60/322,765, filed Sep. 17, 2001, entitled "Light Emitting Diode Illumination Systems and Methods;"

Ser. No. 60/329,202, filed Oct. 12, 2001, entitled "Light Emitting Diode Illumination Systems and Methods;"

Ser. No. 60/341,476, filed Oct. 30, 2001, entitled "Systems and Methods for LED Lighting;"

Ser. No. 60/335,679, filed Oct. 23, 2001, entitled "Systems and Methods for Programmed LED Devices;"

Ser. No. 60/341,898, filed Dec. 19, 2001, entitled "Systems and Methods for LED Lighting;" and Ser. No. 60/353,569, filed Feb. 1, 2002, entitled "LED Systems and Methods."

Ser. No. 10/245,786 also claims the benefit under 35 U.S.C. §120 as a continuation-in-part (CIP) of U.S. Non-provisional application Ser. No. 09/971,367, filed Oct. 4, 2001, now U.S. Pat. No. 6,788,011, entitled "Multicolored LED Lighting Method and Apparatus," which is a continuation of U.S. Non-provisional application Ser. No. 09/669,121, filed Sep. 25, 2000, Now U.S. Pat. No. 6,806,659, entitled "Multicolored LED Lighting Method and Apparatus," which is a continuation of U.S. Ser. No. 09/425,770, filed Oct. 22, 1999, now U.S. Pat. No. 6,150,774, which is a continuation of U.S. Ser. No. 08/920,156, filed Aug. 26, 1997, now U.S. Pat. No. 6,016,038.

Ser. No. 10/245,786 also claims the benefit under 35 U.S.C. §120 as a continuation-in-part (CIP) of the following U.S. Non-provisional Applications:

Ser. No. 09/805,368, filed Mar. 13, 2001, entitled "Light-Emitting Diode Based Products" which claims priority to the following two provisional applications:

Ser. No. 60/199,333, filed Apr. 24, 2000, entitled "Autonomous Color Changing Accessory;" and Ser. No. 60/211,417, filed Jun. 14, 2000, entitled LED-Based Consumer Products;"

Ser. No. 09/805,590, filed Mar. 13, 2001, now U.S. Pat. No. 7,064,498, entitled "Light-Emitting Diode Based Products;"

Ser. No. 09/215,624, filed Dec. 17, 1998, now U.S. Pat. No. 6,528,954, entitled "Smart Light Bulb;" which in turn claims priority to the following five provisional applications:

Ser. No. 60/071,281, filed Dec. 17, 1997, entitled "Digitally Controlled Light Emitting Diodes Systems and Methods;"

Ser. No. 60/068,792, filed Dec. 24, 1997, entitled "Multi-Color Intelligent Lighting;"

Ser. No. 60/078,861, filed Mar. 20, 1998, entitled "Digital Lighting Systems;"

Ser. No. 60/079,285, filed Mar. 25, 1998, entitled "System and Method for Controlled Illumination and;"

Ser. No. 60/090,920, filed Jun. 26, 1998, entitled "Methods for Software Driven Generation of Multiple Simultaneous High Speed Pulse Width Modulated Signals;"

Ser. No. 09/213,607, filed Dec. 17, 1998, now abandoned entitled "Systems and Methods for Sensor-Responsive Illumination;"

Ser. No. 09/213,189, filed Dec. 17, 1998, now U.S. Pat. No. 6,459,919, entitled "Precision Illumination;"

Ser. No. 09/213,581, filed Dec. 17, 1998, now U.S. Pat. No. 7,038,398, entitled "Kinetic Illumination;"

Ser. No. 09/213,540, filed Dec. 17, 1998, now U.S. Pat. No. 6,720,745, entitled "Data Delivery Track;"

Ser. No. 09/333,739, filed Jun. 15, 1999, entitled "Diffuse Illumination Systems and Methods;" and Ser. No. 09/815,418, filed Mar. 22, 2001, now U.S. Pat. No. 6,577,080, entitled "Lighting Entertainment System," which is a continuation of U.S. Ser. No. 09/213, 548, filed Dec. 17, 1998, now U.S. Pat. No. 6,166,496.

Each of the foregoing applications is hereby incorporated herein by reference.

BACKGROUND

Lighting elements are sometimes used to illuminate a system, such as a consumer product, wearable accessory, novelty item, or the like. Existing illuminated systems, however, are generally only capable of exhibiting fixed illumination with one or more light sources. An existing wearable accessory, for example, might utilize a single white-light bulb as an illumination source, with the white-light shining through a transparent colored material. Such accessories only exhibit an illumination of a single type (a function of the color of the transparent material) or at best, by varying the intensity of the bulb output, a single-colored illumination with some range of controllable brightness. Other existing systems, to provide a wider range of colored illumination, may utilize a combination of differently colored bulbs. Such accessories, however, remain limited to a small number of different colored states, for example, three distinct illumination colors: red (red bulb illuminated); blue (blue bulb illuminated); and purple (both red and blue bulbs illuminated). The ability to blend colors to produce a wide range of differing tones is of color is not present.

Techniques are known for producing multi-colored lighting effects with LED's. Some such techniques are shown in, for example, U.S. Pat. No. 6,016,038, U.S. patent application Ser. No. 09/215,624, and U.S. Pat. No. 6,150,774, the teachings of which are incorporated herein by reference. While these references teach systems for producing lighting effects, they do not address some applications of programmable, multi-colored lighting systems.

For example, many toys, such as balls, may benefit from improved color illumination processing, and/or networking attributes. There are toy balls that have lighted parts or balls where the entire surface appears to glow; however there is no ball available that employs dynamic color changing effects. Moreover, there is no ball available that responds to data signals provided from a remote source. As another example, ornamental devices are often lit to provide enhanced decorative effects. U.S. Pat. Nos. 6,086,222 and 5,975,717, for example, disclose lighted ornamental icicles with cascading lighted effects. As a significant disadvantage, these systems apply complicated wiring harnesses to achieve dynamic lighting. Other examples of crude dynamic lighting may be found in consumer products ranging from consumer electronics to home illumination (such as night lights) to toys to clothing, and so on.

Thus, there remains a need for existing products to incorporate programmable, multi-colored lighting systems to enhance user experience with sophisticated color changing effects, including systems that operate autonomously and systems that are associated with wired or wireless computer networks.

SUMMARY OF THE INVENTION

High-brightness LEDs, combined with a processor for control, can produce a variety of pleasing effects for display and illumination. Systems disclosed herein use high-brightness, processor-controlled LEDs in combination with diffuse materials to produce color-changing effects. The systems described herein may be usefully employed to bring autonomous color-changing ability and effects to a variety of consumer products and other household items. The systems may also include sensors so that the illumination of the LEDs may change in response to environmental conditions or a user input. Additionally, the systems may include an interface to a network, so that the illumination of the LEDs may be controlled via the network.

DETAILED DESCRIPTION

Figure 1:
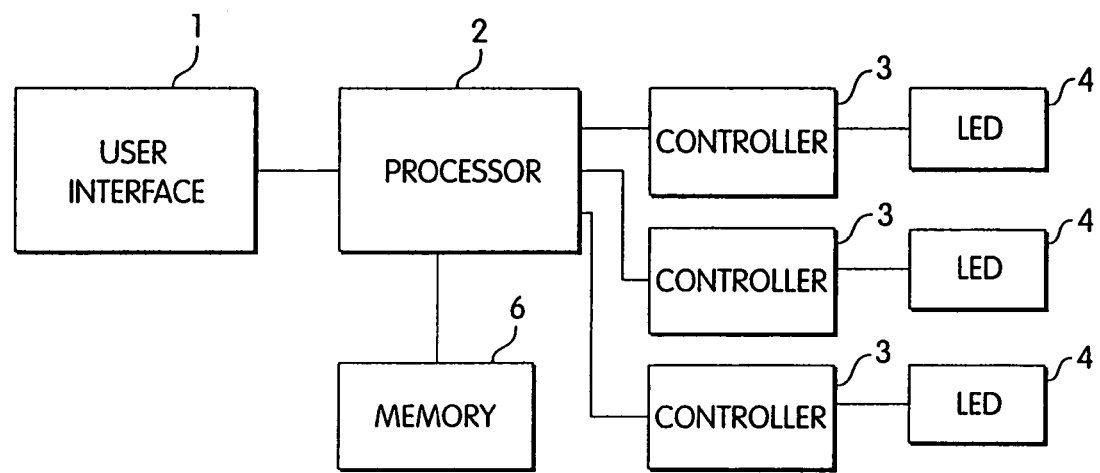
FIG. 1 is a block diagram of a device according to the principles of the invention.

Various exemplary implementations of light emitting diode (LED) based illumination products and methods are disclosed including, but not limited to, glow sticks, key chains, toys, balls, various game accessories, light bulbs, night lights, wall lights, wall switches, wall sockets, wall panels, modular lights, flexible lights, automotive lights, wearable accessories, light ropes, decorative lights such as icicles and icicle strings, light tubes, insect control lights and methods, and illuminated air fresheners/scent dispensers. Any of the foregoing devices may be equipped with various types of user interfaces (both "local" and "remote") to control light generated from the device. Additionally, devices may be controlled via light control information or programs stored in device memory and/or transmitted or downloaded to the devices (e.g., devices may be controlled individually or collectively in groups via a network, glow sticks or other products may be downloaded with programming information that is stored in memory, etc.). Devices also may include sensors so that the generated light may change in response to various operating and/or environmental conditions or a user input. Various optical processing devices which may be used with any of the devices (e.g., reflectors, diffusers, etc.) also are disclosed.

To provide an overall understanding of the invention, certain illustrative embodiments will now be described, including various applications for programmable LED's. However, it will be understood by those of ordinary skill in the art that the methods and systems described herein may be suitably adapted to other environments where programmable lighting may be desired, and that some of the embodiments described herein may be suitable to non-LED based lighting.

As used herein, the term "LED" means any system that is capable of receiving an electrical signal and producing a color of light in response to the signal. Thus, the term "LED" should be understood to include light emitting diodes of all types, including white LEDs, infrared LEDs, ultraviolet LEDs, visible color LEDs, light emitting polymers, semiconductor dies that produce light in response to current, organic LEDs, electro-luminescent strips, silicon based structures that emit light, and other such systems. In an embodiment, an "LED" may refer to a single light emitting diode package having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with phosphor wherein the phosphor may convert energy from the LED to a different wavelength.

An LED system is one type of illumination source. As used herein "illumination source" should be understood to include all illumination sources, including LED systems, as well as incandescent sources, including filament lamps, pyro-luminescent sources, such as flames, candle-luminescent sources, such as gas mantles and carbon arch radiation sources, as well as photo-luminescent sources, including gaseous discharges, fluorescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources, and radioluminescent sources. Illumination sources may also include luminescent polymers capable of producing primary colors.

The term "illuminate" should be understood to refer to the production of a frequency of radiation by an illumination source with the intent to illuminate a space, environment, material, object, or other subject. The term "color" should be understood to refer to any frequency of radiation, or combination of different frequencies, within the visible light spectrum. The term "color," as used herein, should also be understood to encompass frequencies in the infrared and ultraviolet areas of the spectrum, and in other areas of the electromagnetic spectrum where illumination sources may generate radiation.

FIG. 1 is a block diagram of a lighting system or device 500 according to the principles of the invention. The device may include a user interface 1, a processor 2, one or more controllers 3, one or more LEDs 4, and a memory 6. In general, the processor 2 may execute a program stored in the memory 6 to generate signals that control stimulation of the LEDs 4. The signals may be converted by the controllers 3 into a form suitable for driving the LEDs 4, which may include controlling the current, amplitude, duration, or waveform of the signals impressed on the LEDs 4.

As used herein, the term processor may refer to any system for processing electronic signals. A processor may include a microprocessor, microcontroller, programmable digital signal processor or other programmable device, along with external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. A processor may also, or instead, include an application specific integrated circuit, a programmable gate array programmable array logic, a programmable logic device, a digital signal processor, an analog-to-digital converter, a digital-to-analog converter, or any other device that may be configured to process electronic signals. In addition, a processor may include discrete circuitry such as passive or active analog components including resistors, capacitors, inductors, transistors, operational amplifiers, and so forth, as well as discrete digital components such as logic components, shift registers, latches, or any other separately packaged chip or other component for realizing a digital function. Any combination of the above circuits and components, whether packaged discretely, as a chip, as a chipset, or as a die, may be suitably adapted to use as a processor as described herein. Where a processor includes a programmable device such as the microprocessor or microcontroller mentioned above, the processor may further include computer executable code that controls operation of the programmable device.

The controller 3 may be a pulse width modulator, pulse amplitude modulator, pulse displacement modulator, resistor ladder, current source, voltage source, voltage ladder, switch, transistor, voltage controller, or other controller. The controller 3 generally regulates the current, voltage and/or power through the LED, in response to signals received from the processor 2. In an embodiment, several LEDs 4 with different spectral output may be used. Each of these colors may be driven through separate controllers 3. The processor 2 and controller 3 may be incorporated into one device, e.g., sharing a single semiconductor package. This device may drive several LEDs 4 in series where it has sufficient power output, or the device may drive single LEDs 4 with a corresponding number of outputs. By controlling the LEDs 4 independently, color mixing can be applied for the creation of lighting effects.

The memory 6 may store algorithms or control programs for controlling the LEDs 4. The memory 6 may also store look-up tables, calibration data, or other values associated with the control signals. The memory 6 may be a read-only memory, programmable memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, address information, and program output or other intermediate or final results. A program, for example, may store control signals to operate several different colored LEDs 4.

A user interface 1 may also be associated with the processor 2. The user interface 1 may be used to select a program from the memory 6, modify a program from the memory 6, modify a program parameter from the memory 6, select an external signal for control of the LEDs 4, initiate a program, or provide other user interface solutions. Several methods of color mixing and pulse width modulation control are disclosed in U.S. Pat. No. 6,016,038 "Multicolored LED Lighting Method and Apparatus", the teachings of which are incorporated by reference herein. The processor 2 can also be addressable to receive programming signals addressed to it via a network connection (not shown in FIG. 1).

The '038 patent discloses LED control through a technique known as Pulse-Width Modulation (PWM). This technique can provide, through pulses of varying width, a way to control the intensity of the LED's as seen by the eye. Other techniques are also available for controlling the brightness of LED's and may be used with the invention. By mixing several hues of LED's, many colors can be produced that span a wide gamut of the visible spectrum. Additionally, by varying the relative intensity of LED's over time, a variety of color-changing and intensity-varying effects can be produced. Other techniques for controlling the intensity of one or more LEDs are known in the art, and may be usefully employed with the systems described herein. In an embodiment, the processor 2 is a Microchip PIC processor 12C672 that controls LEDs through PWM, and the LEDs 4 are red, green and blue.

Figure 2A:
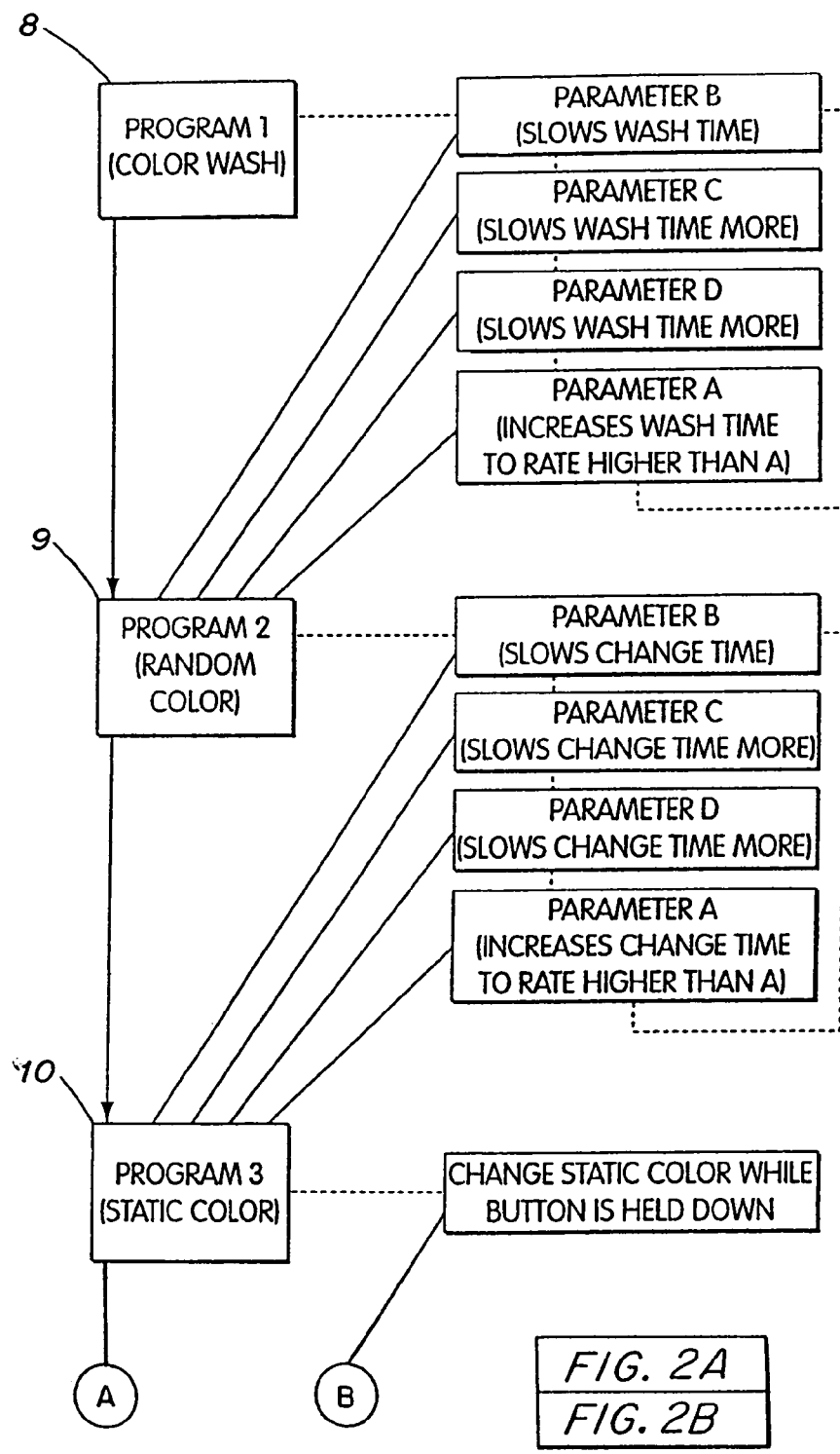
FIGS. 2A–2B are state diagrams showing operation of a device according to the principles of the invention.
Figure 2B:
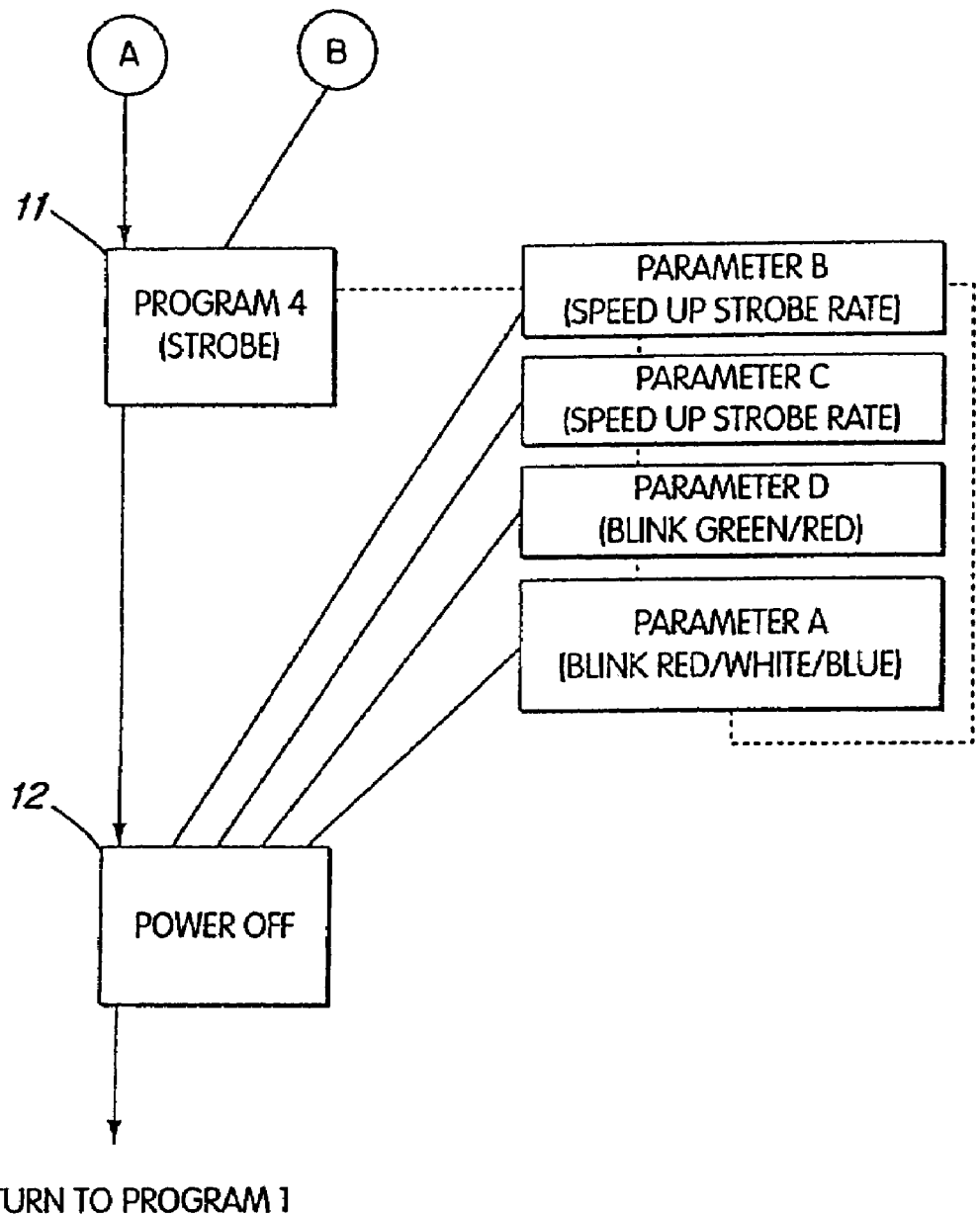

FIGS. 2A–2B are a state diagram of operation of a device according to the principles of the invention. The terms 'mode' and 'state' are used in the following description interchangeably. When the device is powered on, it may enter a first mode 8, for example, under control of a program executing on the processor 2 of FIG. 1. The first mode 8 may provide a color wash, in which the LEDs cycle continuously through the full color spectrum, or through some portion of the color spectrum. In the first mode 8, a rate of the color wash may be determined by a parameter stored, for example, in the memory 6 shown in FIG. 1A. Through a user interface such as a button, dial, slider, or the like, a user may adjust the rate of the color wash. Within each mode, the parameter may correspond to a different aspect of the lighting effect created by the mode, or each mode may access a different parameter so that persistence is maintained for a parameter during subsequent returns to that mode.

A second mode 9 may be accessed from the first mode 8. In the second mode 9, the device may randomly select a sequence of colors, and transition from one color to the next. The transitions may be faded to appear as continuous transitions, or they may be abrupt, changing in a single step from one random color to the next. The parameter may correspond to a rate at which these changes occur.

A third mode 10 may be accessed from the second mode 9. In the third mode, the device may provide a static, i.e., non-changing, color. The parameter may correspond to the frequency or spectral content of the color.

A fourth mode 11 may be accessed from the third mode 10. In the fourth mode 11, the device may strobe, that is, flash on and off. The parameter may correspond to the color of the strobe or the rate of the strobe. At a certain value, the parameter may correspond to other lighting effects, such as a strobe that alternates red, white, and blue, or a strobe that alternates green and red. Other modes, or parameters within a mode, may correspond to color changing effects coordinated with a specific time of the year or an event such as Valentine's Day, St. Patrick's Day, Easter, the Fourth of July, Halloween, Thanksgiving, Christmas, Hanukkah, New Years or any other time, event, brand, logo, or symbol.

A fifth mode 12 may be accessed from the fourth mode 11. The fifth mode 12 may correspond to a power-off state. In the fifth mode 12, no parameter may be provided. A next transition may be to the first mode 8, or to some other mode. It will be appreciated that other lighting effects are known, and may be realized as modes or states that may be used with a device according to the principles of the invention.

A number of user interfaces may be provided for use with the device. Where, for example, a two-button interface is provided, a first button may be used to transition from mode to mode, while a second button may be used to control selection of a parameter within a mode. In this configuration, the second button may be held in a closed position, with a parameter changing incrementally until the button is released. The second button may be held, and a time that the button is held (until released) may be captured by the device, with this time being used to change the parameter. Or the parameter may change once each time that the second button is held and released. Some combination of these techniques may be used for different modes. For example, it will be appreciated that a mode having a large number of parameter values, such as a million or more different colors available through color changing LEDs, individually selecting each parameter value may be unduly cumbersome, and an approach permitting a user to quickly cycle through parameter values by holding the button may be preferred. By contrast, a mode with a small number of parameter values, such as five different strobe effects, may be readily controlled by stepping from parameter value to parameter value each time the second button is depressed.

A single button interface may instead be provided, where, for example, a transition between mode selections and parameter selections are signaled by holding the button depressed for a predetermined time, such as one or two seconds. That is, when the single button is depressed, the device may transition from one mode to another mode, with a parameter initialized at some predetermined value. If the button is held after it is depressed for the transition, the parameter value may increment (or decrement) so that the parameter may be selected within the mode. When the button is released, the parameter value may be maintained at its last value.

The interface may include a button and an adjustable input. The button may control transitions from mode to mode. The adjustable input may permit adjustment of a parameter value within the mode. The adjustable input may be, for example, a dial, a slider, a knob, or any other device whose physical position may be converted to a parameter value for use by the device. Optionally, the adjustable input may only respond to user input if the button is held after a transition between modes.

The interface may include two adjustable inputs. A first adjustable input may be used to select a mode, and a second adjustable input may be used to select a parameter within a mode. In another configuration, a single dial may be used to cycle through all modes and parameters in a continuous fashion. It will be appreciated that other controls are possible, including keypads, touch pads, sliders, switches, dials, linear switches, rotary switches, variable switches, thumb wheels, dual inline package switches, or other input devices suitable for human operation.

In one embodiment, a mode may have a plurality of associated parameters, each parameter having a parameter value. For example, in a color-changing strobe effect, a first parameter may correspond to a strobe rate, and a second parameter may correspond to a rate of color change. A device having multiple parameters for one or more modes may have a number of corresponding controls in the user interface.

The user interface may include user input devices, such as the buttons and adjustable controls noted above, that produce a signal or voltage to be read by the processor. The voltage may be a digital signal corresponding to a high and a low digital state. If the voltage is in the form of an analog voltage, an analog to digital converter (A/D) may be used to convert the voltage into a processor-useable digital form. The output from the A/D would then supply the processor with a digital signal. This may be useful for supplying signals to the lighting device through sensors, transducers, networks or from other signal generators.

The device may track time on an hourly, daily, weekly, monthly, or annual basis. Using an internal clock for this purpose, lighting effects may be realized on a timely basis for various Holidays or other events. For example, on Halloween the light may display lighting themes and color shows including, for example, flickering or washing oranges. On the Fourth of July, a red, white, and blue display may be provided. On December 25, green and red lighting may be displayed. Other themes may be provided for New Years, Valentine's Day, birthdays, etc. As another example, the device may provide different lighting effects at different times of day, or for different days of the week.

Figure 3:
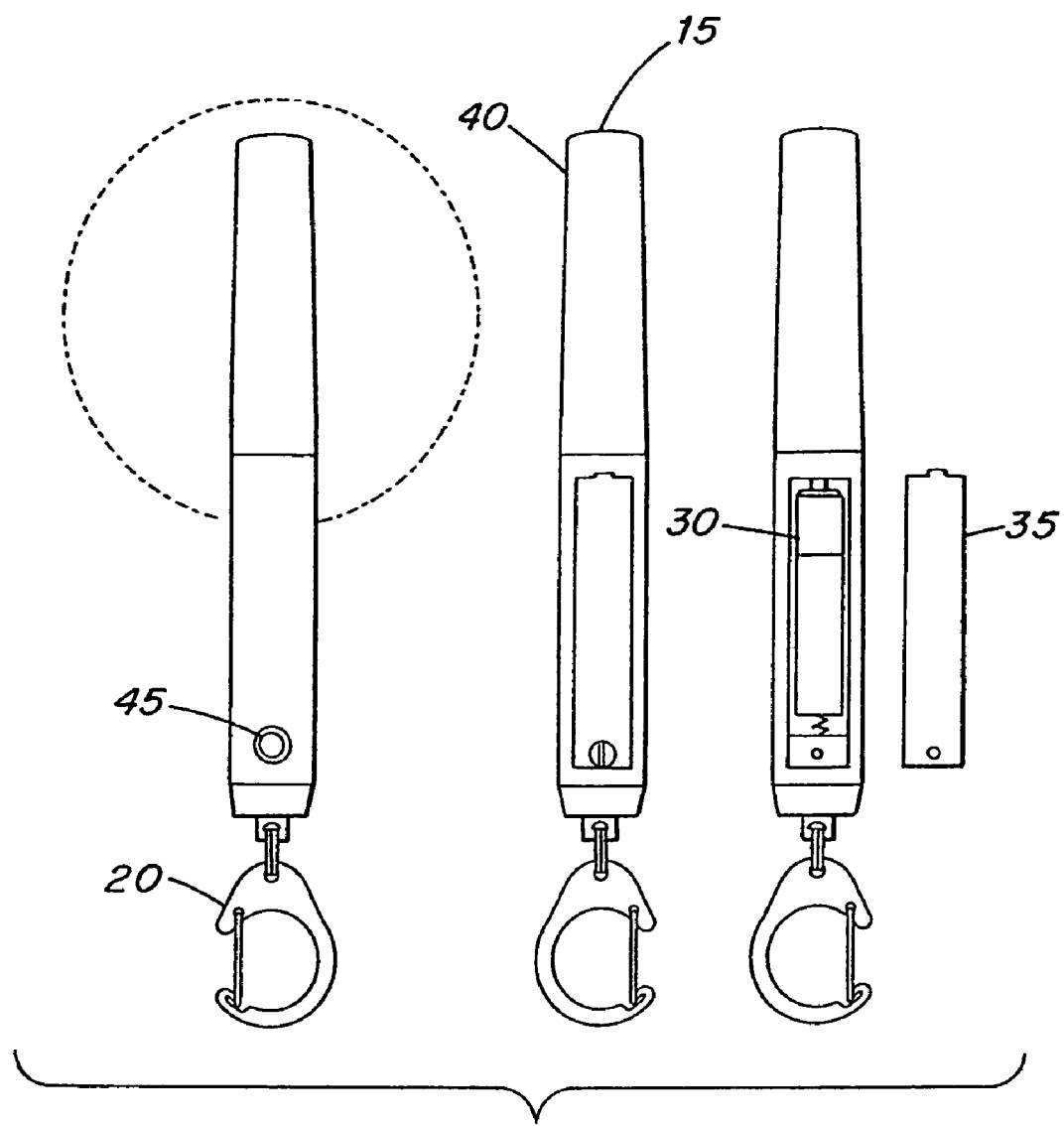
FIG. 3 shows a glow stick according to the principles of the invention.

FIG. 3 shows a glow stick according to the principles of the invention. The glow stick 15 may include the components described above with reference to FIG. 1, and may operate according to the techniques described above with reference to FIGS. 2A–2B. The glow stick 15 may be any small, cylindrical device that may hang from a lanyard, string, chain, bracelet, anklet, key chain, or necklace, for example, by a clip 20. The glow stick 15, as with many of the lighting devices described herein, may also be used as a handheld device. The glow stick 15 may operate from a battery 30 within the glow stick 10, such as an A, AA, AAA sized battery other battery. The battery 30 may be covered by a detachable portion 35 which hides the battery from view during normal use. An illumination lens 40 may encase a plurality of LEDs and diffuse color emanating therefrom. The lens 40 may be a light-transmissive material, such as transparent material, translucent material, semitransparent material, or other material suitable for this application. In general, the light-transmissive material may be any material that receives light emitted from one or more LEDs and displays one or more colors that are a combination the spectra of the plurality of LEDs. A user interface 45 may be included for providing user input to control operation of the glow stick 15. In the embodiment depicted in FIG. 2, the user interface 45 is a single button, however it will be appreciated that any of the interfaces discussed above may suitably be adapted to the glow stick 15. The user interface 45 may be a switch, button or other device that generates a signal to a processor that controls operation of the glow stick 15.

Figure 4:
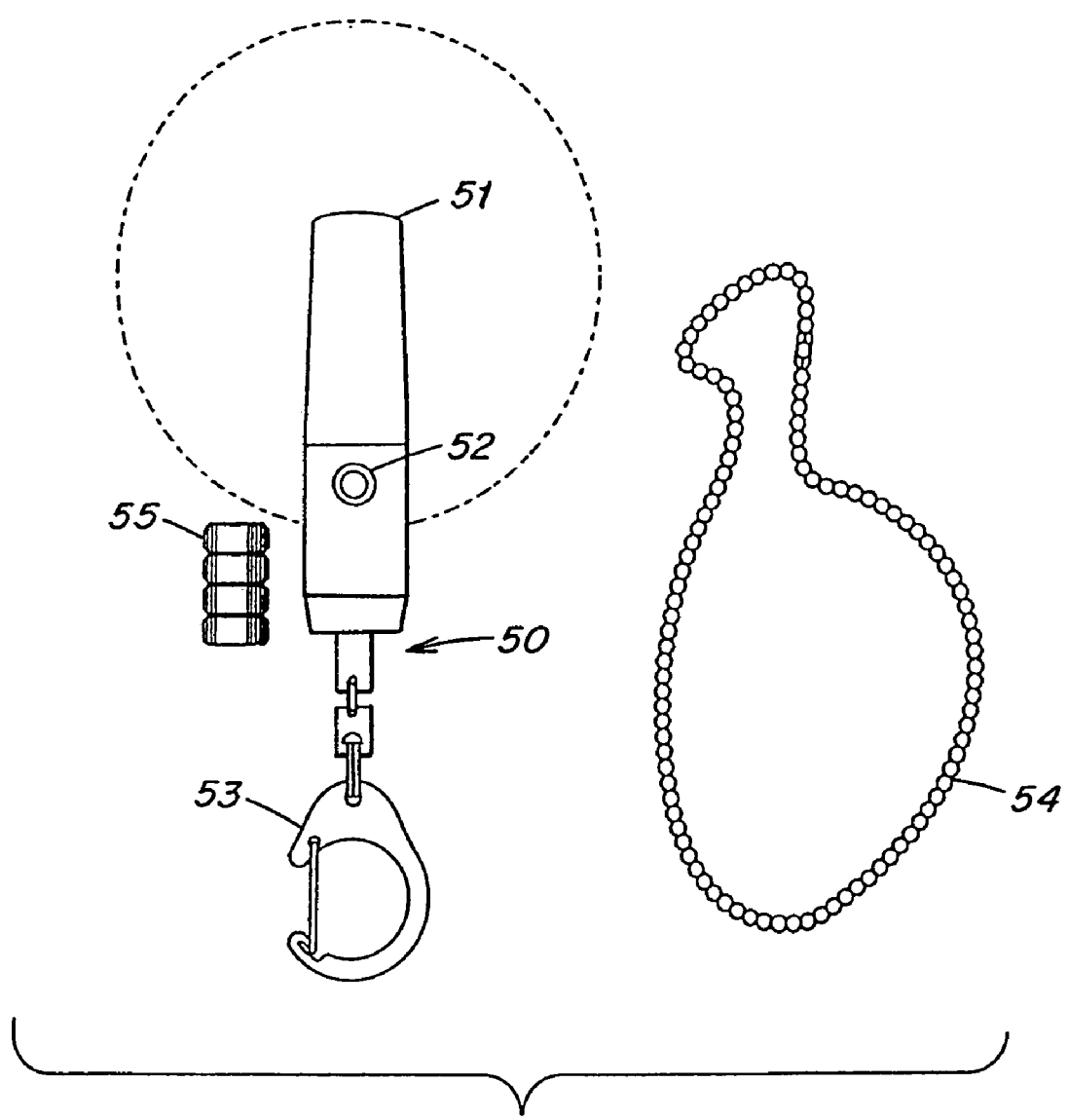
FIG. 4 shows a key chain according to the principles of the invention.

FIG. 4 shows a key chain according to the principles of the invention. The key chain 50 may include a light-transmissive material 51 enclosing one or more LEDs and a system such as the system of FIG. 1 (not shown), a one-button user interface 52, a clip 53 suitable for connecting to a chain 54, and one or more batteries 55. The key chain 50 may be similar to the glow stick 15 of FIG. 2, although it may be of smaller size. To accommodate the smaller size, more compact batteries 55 may be used. The key chain 50 may operate according to the techniques described above with reference to FIGS. 2A–2B.

Figure 5:
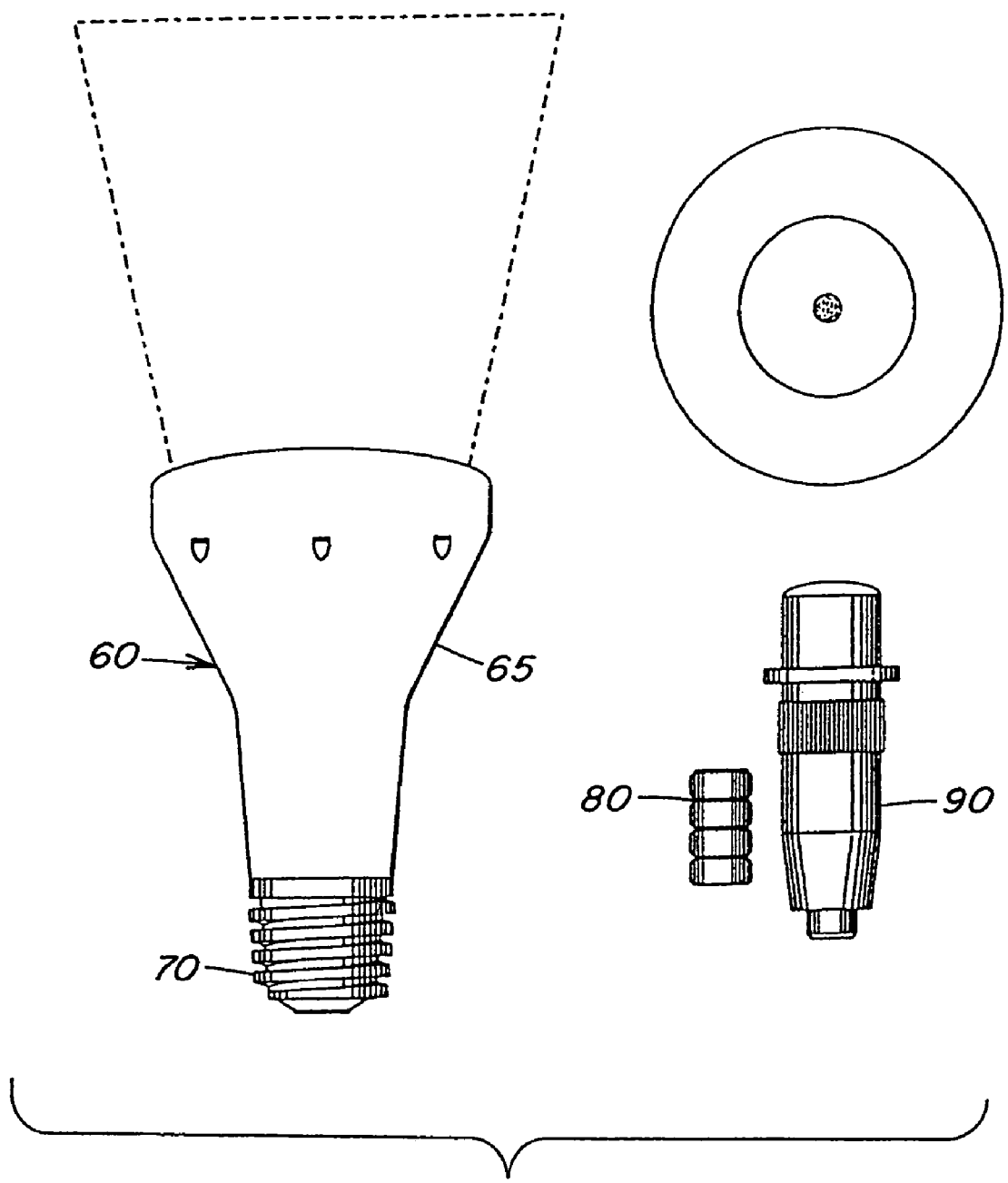
FIG. 5 shows a spotlight according to the principles of the invention.

FIG. 5 shows a spotlight according to the principles of the invention. The spotlight 60 may include a system such as that depicted in FIG. 1 for controlling a plurality of LEDs within the spotlight 60, and may operate according to the techniques described above with reference to FIGS. 2A–2B. The spotlight 60 may include a housing 65 suitable for use with conventional lighting fixtures, such as those used with AC spotlights, and including a light-transmissive material on one end to permit LEDs to illuminate through the housing 65. The spotlight configurations may be provided to illuminate an object or for general illumination, for example, and the material may not be required. The mixing of the colors may take place in the projection of the beam, for example. The spotlight 60 may draw power for illumination from an external power source through a connection 70, such as an Edison mount fixture, plug, bi-pin base, screw base, base, Edison base, spade plug, and power outlet plug or any other adapter for adapting the spotlight 60 to external power. The connection 70 may include a converter to convert received power to power that is useful for the spotlight. For example, the converter may include an AC to DC converter to convert one-hundred twenty Volts at sixty Hertz into a direct current at a voltage of, for example, five Volts or twelve Volts. The spotlight 60 may also be powered by one or more batteries 80, or a processor in the spotlight 60 may be powered by one or more batteries 80, with LEDs powered by electrical power received through the connection 70. A battery case 90 may be integrated into the spotlight 60 to contain the one or more batteries 80.

The connector 70 may include any one of a variety of adapters to adapt the spotlight 60 to a power source. The connector 70 may be adapted for, for example, a screw socket, socket, post socket, pin socket spade socket, wall socket, or other interface. This may be useful for connecting the lighting device to AC power or DC power in existing or new installations. For example, a user may want to deploy the spotlight 60 in an existing one-hundred and ten VAC socket. By incorporating an interface to this style of socket into the spotlight 60, the user can easily screw the new lighting device into the socket. U.S. Pat. No. 6,292,901, entitled "Power/Data Protocol," describes techniques for transmitting data and power along the same lines and then extracting the data for use in a lighting device. The methods and systems disclosed therein could also be used to communicate information to the spotlight 60 of FIG. 5, through the connector 70.

Figure 6:
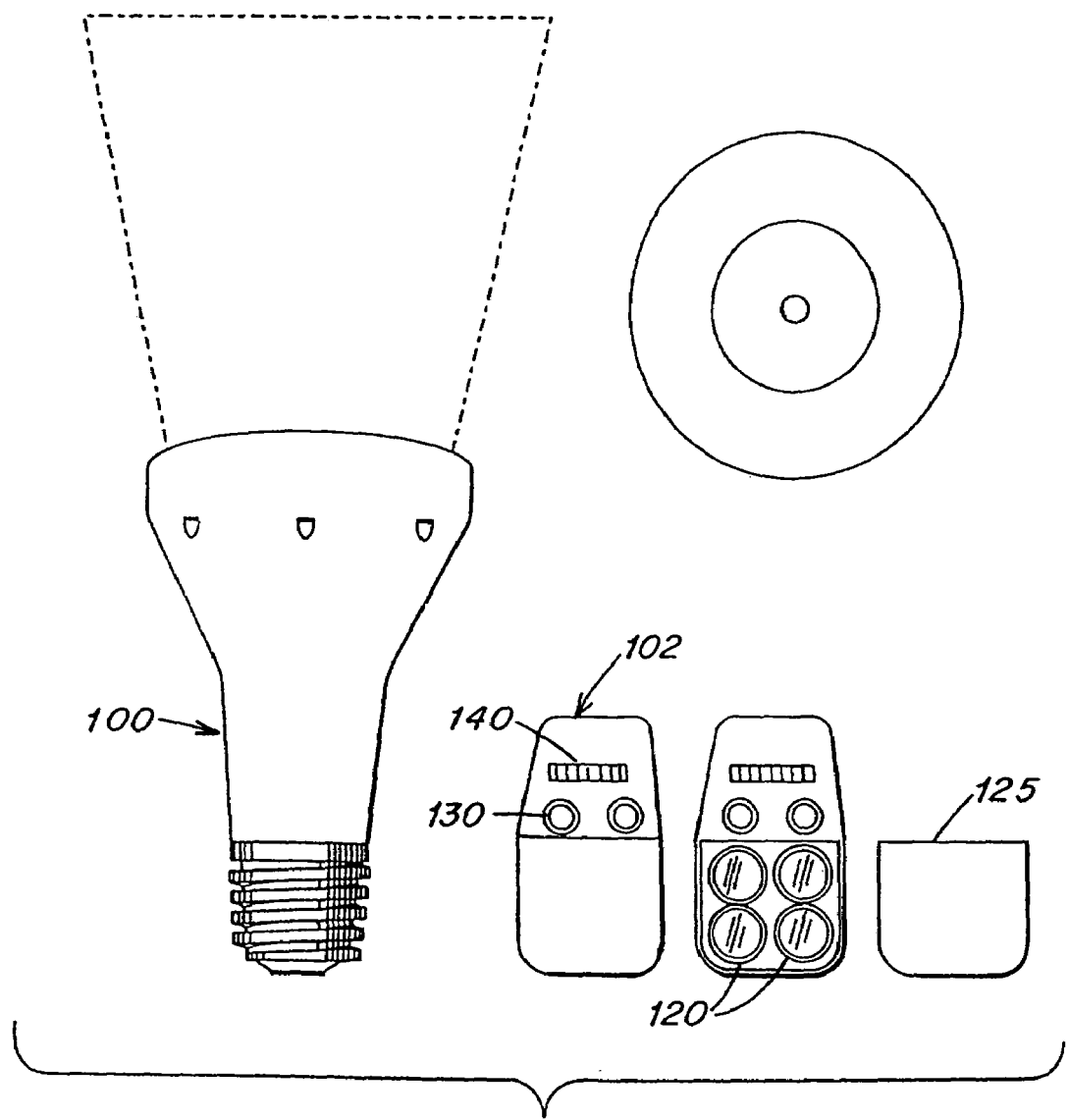
FIG. 6 shows a spotlight according to the principles of the invention.

FIG. 6 shows a spotlight according to the principles of the invention. The spotlight 10 may be similar to the spotlight of FIG. 5. A remote user interface 102 may be provided, powered by one or more batteries 120 that are covered by a removable battery cover 125. The remote user interface 102 may include, for example, one or more buttons 130 and a dial 140 for selecting modes and parameters. The remote user interface 102 may be remote from the spotlight 100, and may transmit control information to the spotlight 100 using, for example, an infrared or radio frequency communication link, with corresponding transceivers in the spotlight 100 and the remote user interface 102. The information could be transmitted through infrared, RF, microwave, electromagnetic, or acoustic signals, or any other transmission medium. The transmission could also be carried, for its complete path or a portion thereof, through a wire, cable, fiber optic, network or other transmission medium.

Figure 7:
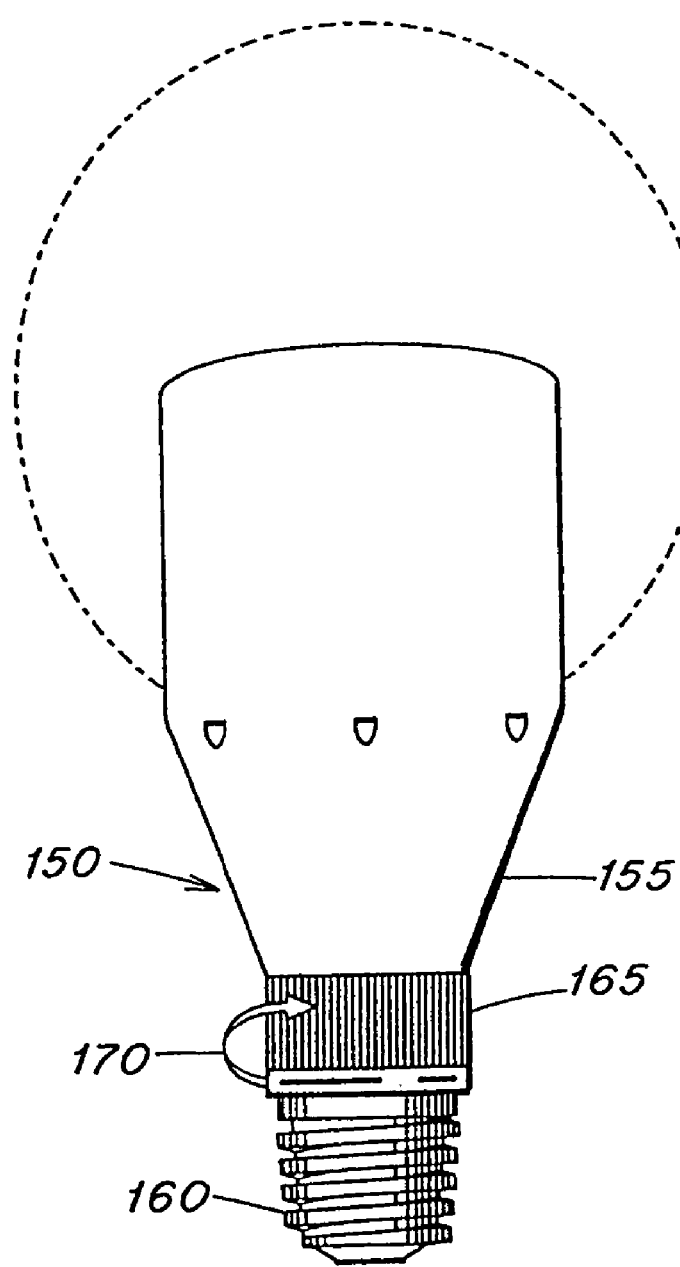
FIG. 7 shows an Edison mount light bulb according to the principles of the invention.

FIG. 7 shows an Edison mount light bulb according to the principles of the invention. The light bulb 150 may include a system such as that depicted in FIG. 1 for controlling a plurality of LEDs within the light bulb 150, and may operate according to the techniques described above with reference to FIGS. 2A–2B. The light bulb 150 may include a housing 155 suitable for use with conventional lighting fixtures, such as those used with AC light bulbs, and including a light-transmissive material on one end to permit LEDs to illuminate through the housing 155. In the embodiment of FIG. 7, the light bulb 150 includes a screw base 160, and a user interface 165 in the form of a dial integrated into the body of the light bulb 150. The dial may be rotated, as indicated by an arrow 170, to select modes and parameters for operation of the light bulb 150.

Figure 8:
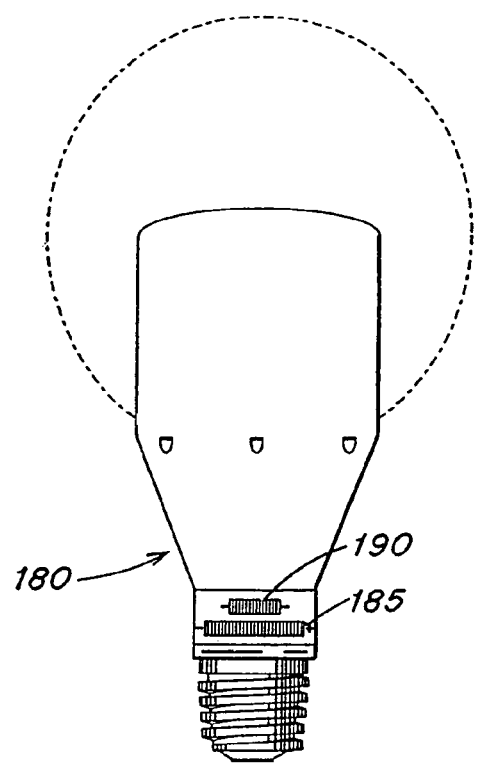
FIG. 8 shows an Edison mount light bulb according to the principles of the invention.

FIG. 8 shows an Edison mount light bulb according to the principles of the invention. The light bulb 180 is similar to the light bulb 150 of FIG. 7, with a different user interface. The user interface of the light bulb 180 includes a thumbwheel 185 and a two-way switch 190. In this embodiment, the switch 190 may be used to move forward and backward through a sequence of available modes. For example, if the light bulb 180 has four modes numbered 1–4, by sliding the switch 190 to the left in FIG. 7, the mode may move up one mode, i.e., from mode 1 to mode 2. By sliding the switch 190 to the right in FIG. 7, the mode may move down one mode, i.e., from mode 2 to mode 1. The switch 190 may include one or more springs to return the switch 190 to a neutral position when force is not applied. The thumbwheel 185 may be constructed for endless rotation in a single direction, in which case a parameter controlled by the thumbwheel 185 may reset to a minimum value after reaching a maximum value (or vice versa). The thumbwheel may be constructed to have a predefined span, such as one and one-half rotations. In this latter case, one extreme of the span may represent a minimum parameter value and the other extreme of the span may represent a maximum parameter value. In an embodiment, the switch 190 may control a mode (left) and a parameter (right), and the thumbwheel 185 may control a brightness of the light bulb 180.

A light bulb such as the light bulb 180 of FIG. 8 may also be adapted for control through conventional lighting control systems. Many incandescent lighting systems have dimming control that is realized through changes to applied voltages, typically either through changes to applied voltages or chopping an AC waveform. A power converter can be used within the light bulb 180 to convert the received power, whether in a form of a variable amplitude AC signal or a chopped waveform, to the requisite power for the control circuitry and the LEDs, and where appropriate, to maintain a constant DC power supply for digital components. An analog-to-digital converter may be included to digitize the AC waveform and generate suitable control signals for the LEDs. The light bulb 180 may also detect and analyze a power supply signal and make suitable adjustments to LED outputs. For example, a light bulb 180 may be programmed to provide consistent illumination whether connected to a one-hundred and ten VAC, 60 Hz power supply or a two-hundred and twenty VAC, 50 Hz power supply.

Control of the LEDs may be realized through a look-up table that correlates received AC signals to suitable LED outputs for example. The look-up table may contain full brightness control signals and these control signals may be communicated to the LEDs when a power dimmer is at 100%. A portion of the table may contain 80% brightness control signals and may be used when the input voltage to the lamp is reduced to 80% of the maximum value. The processor may continuously change a parameter with a program as the input voltage changes. The lighting instructions could be used to dim the illumination from the lighting system as well as to generate colors, patterns of light, illumination effects, or any other instructions for the LEDs. This technique could be used for intelligent dimming of the lighting device, creating color-changing effects using conventional power dimming controls and wiring as an interface, or to create other lighting effects. In an embodiment both color changes and dimming may occur simultaneously. This may be useful in simulating an incandescent dimming system where the color temperature of the incandescent light becomes warmer as the power is reduced.

Three-way light bulbs are also a common device for changing illumination levels. These systems use two contacts on the base of the light bulb and the light bulb is installed into a special electrical socket with two contacts. By turning a switch on the socket, either contact on the base may be connected with a voltage or both may be connected to the voltage. The lamp includes two filaments of different resistance to provide three levels of illumination. A light bulb such as the light bulb 180 of FIG. 8 may be adapted for use with a three-way light bulb socket. The light bulb 180 could have two contacts on the base and a look-up table, a program, or another system within the light bulb 180 could contain control signals that correlate to the socket setting. Again, this could be used for illumination control, color control or any other desired control for the LEDs.

This system could be used to create various lighting effects in areas where standard lighting devices where previously used. The user can replace existing incandescent light bulbs with an LED lighting device as described herein, and a dimmer on a wall could be used to control color-changing effects within a room. Color changing effects may include dimming, any of the color-changing effects described above, or any other color-changing or static colored effects.

Figure 9:
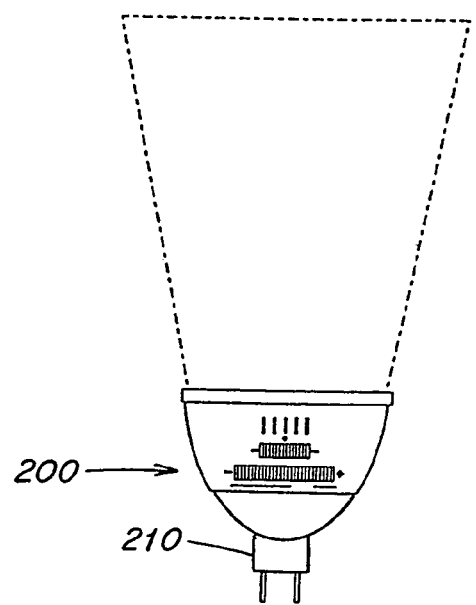
FIG. 9 shows a light bulb according to the principles of the invention.

FIG. 9 shows a light bulb according to the principles of the invention. As seen in FIG. 8, the light bulb 200 may operate from fixtures other than Edison mount fixtures, such as an MR-16, low voltage fixture 210 that may be used with direct current power systems.

Figure 10:
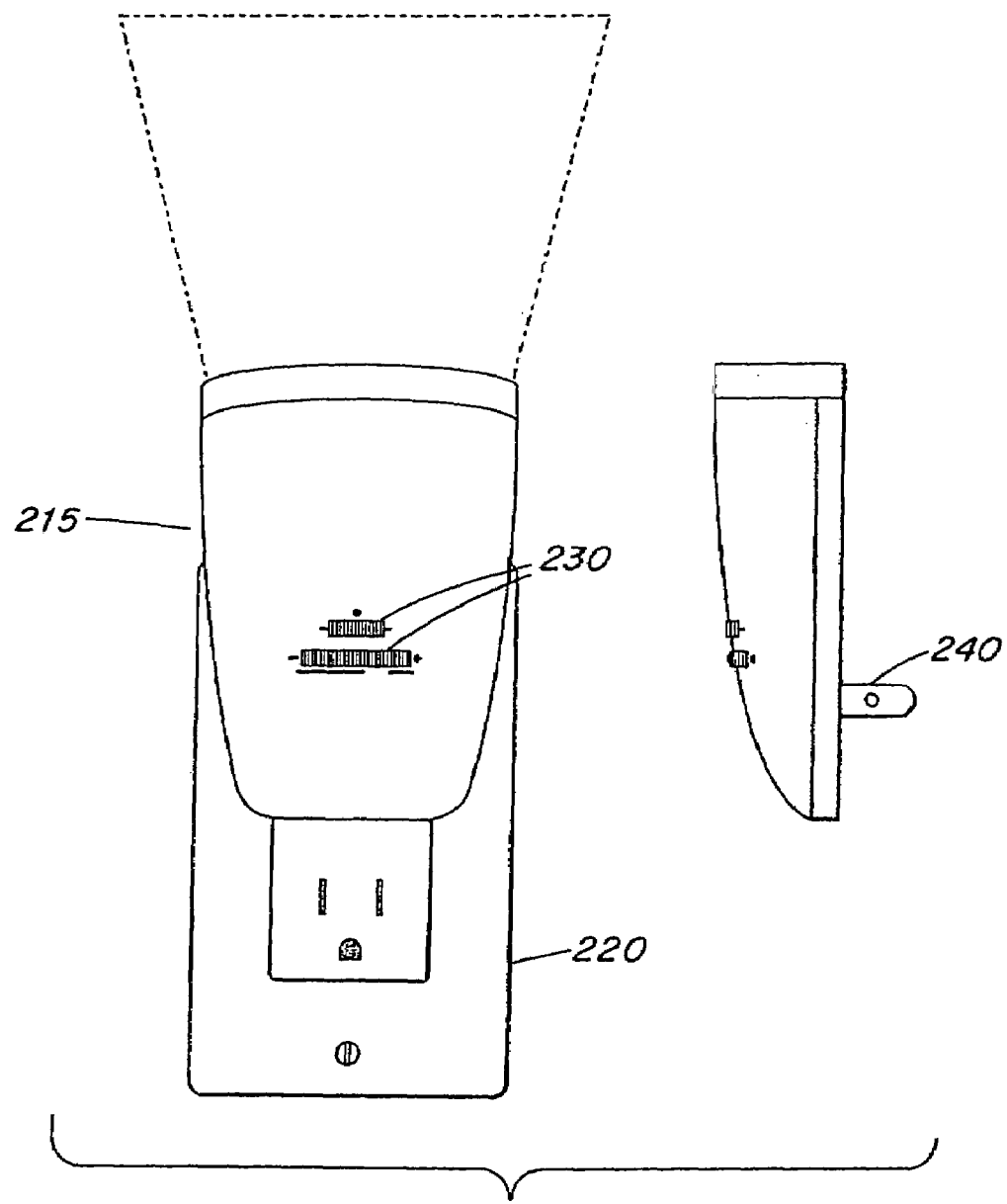
FIG. 10 shows a wall socket mounted light according to the principles of the invention.

FIG. 10 shows a wall socket mounted light according to the principles of the invention. The light 210 may include a plug adapted to, for example, a one-hundred and ten volt alternating current outlet 220 constructing according to ANSI specifications. The light 210 may include a switch and thumbwheel as a user interface 230, and one or more spades 240 adapted for insertion into the outlet 220. The body of the light 210 may include a reflective surface for directing light onto a wall for color changing wall washing effects.

Figure 11:
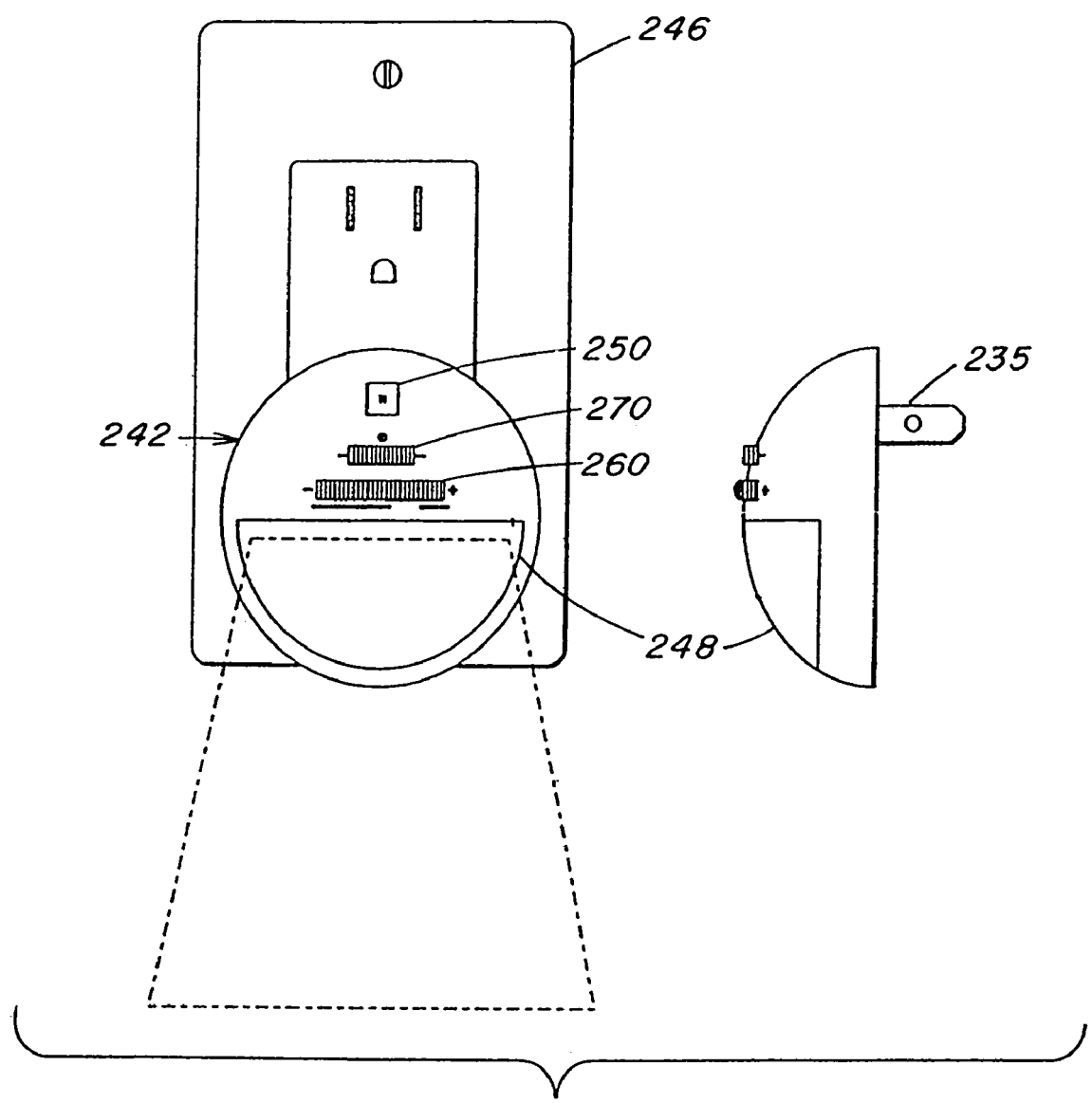
FIG. 11 shows a night light according to the principles of the invention.

FIG. 11 shows a night light according to the principles of the invention. The night light 242 may include a plug 230 adapted to, for example, a one-hundred and ten volt alternating current outlet 246. The night light 242 may include a system such as that depicted in FIG. 1 for controlling a plurality of LEDs within the night light 242, and may operate according to the techniques described above with reference to FIGS. 2A–2B. The night light 242 may include a light-transmissive material 248 for directing light from the LEDs, e.g., in a downward direction. The night light 242 may also include a sensor 250 for detecting low ambient lighting, such that the night light 242 may be activated only when low lighting conditions exist. The sensor 250 may generate a signal to the processor to control activation and display type of the night light 242. The night light 242 may also include a clock/calendar, such that the seasonal lighting displays described above may be realized. The night light 242 may include a thumbwheel 260 and a switch 270, such as those described above, for selecting a mode and a parameter. As with several of the above embodiments, the night light 242 may include a converter that generates DC power suitable to the control circuitry of the night light 242.

Figure 12:
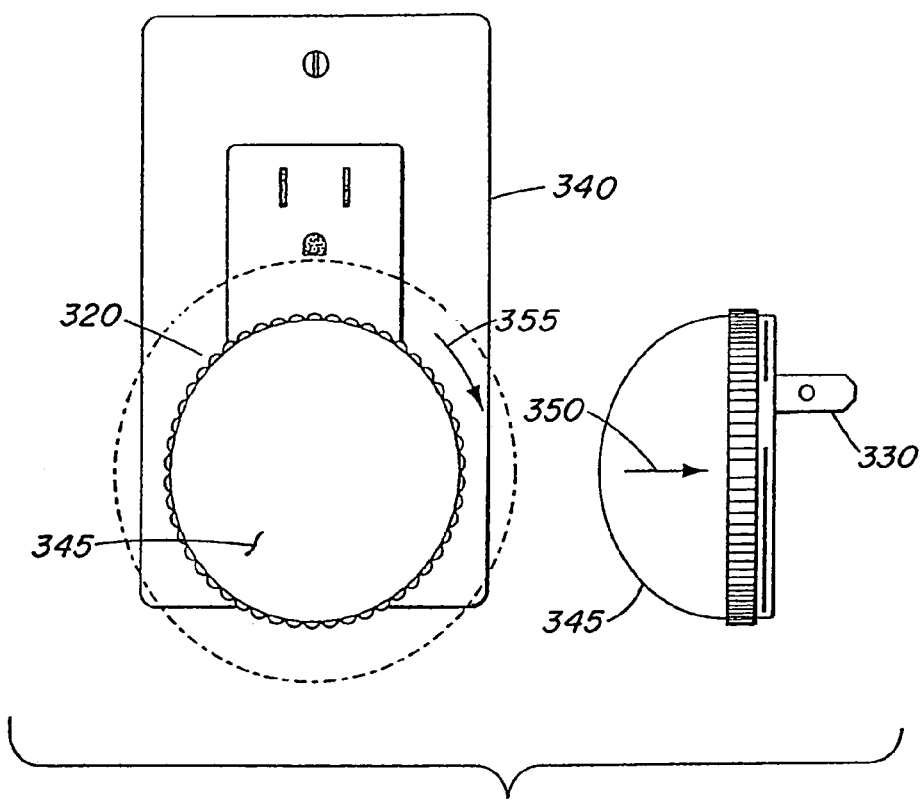
FIG. 12 shows a night light according to the principles of the invention.

FIG. 12 shows a night light according to the principles of the invention. The night light 320 may include a plug 330 adapted to, for example, a one-hundred and ten volt alternating current outlet 340. The night light 320 may include a system such as that depicted in FIG. 1 for controlling a plurality of LEDs within the night light 320, and may operate according to the techniques described above with reference to FIGS. 2A–2B. The night light 320 may include a light-transmissive dome 345. The night light 320 may also include a sensor within the dome 345 for detecting low ambient lighting, such that the night light 320 may be automatically activated when low lighting conditions exist. The night light 320 may also include a clock/calendar, such that the seasonal lighting displays described above may be realized. In the embodiment of FIG. 12, the dome 345 of the night light 320 may also operate as a user interface. By depressing the dome 345 in the direction of a first arrow 350, a mode may be selected. By rotating the dome 345 in the direction of a second arrow 355, a parameter may be selected within the mode. As with several of the above embodiments, the night light 220 may include a converter that generates DC power suitable to the control circuitry of the night light 220.

As will be appreciated from the foregoing examples, an LED system such as that described in reference to FIGS. 1 & 2A–2B may be adapted to a variety of lighting applications, either as a replacement for conventional light bulbs, including incandescent light bulbs, halogen light bulbs, tungsten light bulbs, fluorescent light bulbs, and so forth, or as an integrated lighting fixture such as a desk lamp, vase, night light, lantern, paper lantern, designer night light, strip light, cove light, MR light, wall light, screw based light, lava lamp, orb, desk lamp, decorative lamp, string light, or camp light. The system may have applications to architectural lighting, including kitchen lighting, bathroom lighting, bedroom lighting, entertainment center lighting, pool and spa lighting, outdoor walkway lighting, patio lighting, building lighting, facade lighting, fish tank lighting, or lighting in other areas where light may be employed for aesthetic effect. The system could be used outdoors in sprinklers, lawn markers, pool floats, stair markers, in-ground markers, or door bells, or more generally for general lighting, ornamental lighting, and accent lighting in indoor or outdoor venues. The systems may also be deployed where functional lighting is desired, as in brake lights, dashboard lights, or other automotive and vehicle applications.

Color-changing lighting effects may be coordinated among a plurality of the lighting devices described herein. Coordinated effects may be achieved through conventional lighting control mechanisms where, for example, each one of a plurality of lighting devices is programmed to respond differently, or with different start times, to a power-on signal or dimmer control signal delivered through a conventional home or industrial lighting installation.

Each lighting device may instead be addressed individually through a wired or wireless network to control operation thereof. The LED lighting devices may have transceivers for communicating with a remote control device, or for communicating over a wired or wireless network.

It will be appreciated that a particular lighting application may entail a particular choice of LED. Pre-packaged LEDs generally come in a surface mount package or a T package. The surface mount LEDs have a very large beam angle, the angle at which the light intensity drops to 50% of the maximum light intensity, and T packages may be available in several beam angles. Narrow beam angles project further with relatively little color mixing between adjacent LEDs. This aspect of certain LEDs may be employed for projecting different colors simultaneously, or for producing other effects. Wider angles can be achieved in many ways such as, but not limited to, using wide beam angle T packages, using surface mount LEDs, using un-packaged LEDs, using chip on board technology, or mounting the die directly on a substrate as described in U.S. Prov. Patent App. No. 60/235, 966, entitled "Optical Systems for Light Emitting Semiconductors." A reflector may also be associated with one or more LEDs to project illumination in a predetermined pattern. One advantage of using the wide-beam-angle light source is that the light can be gathered and projected onto a wall while allowing the beam to spread along the wall. This accomplishes the desired effect of concentrating illumination on the wall while colors projected from separate LEDs mix to provide a uniform color.

Figure 13:
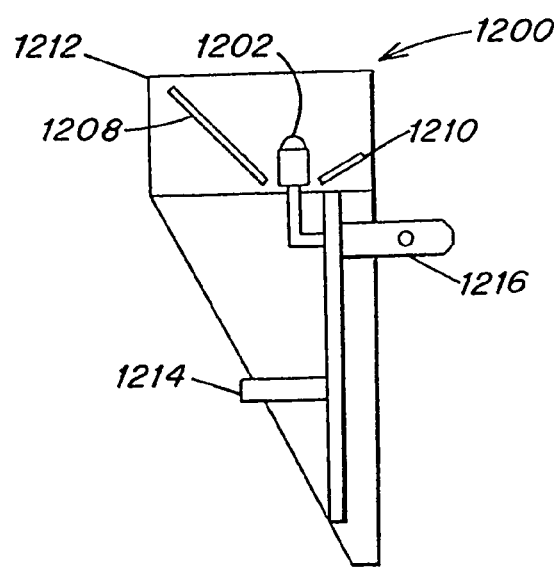
FIG. 13 shows a wall washing light according to the principles of the invention.

FIG. 13 illustrates a lighting device 1200 with at least one LED 1202. There may be a plurality of LEDs 1202 of different colors, or a plurality of LEDs 1202 of a single color, such as to increase intensity or beam width of illumination for that color, or a combination of both. A reflector including a front section 1208 and a rear section 1210 may also be included in the device 1200 to project light from the LED. This reflector can be formed as several pieces or one piece of reflective material. The reflector may direct illumination from the at least one LED 1202 in a predetermined direction, or through a predetermined beam angle. The reflector may also gather and project illumination scattered by the at least one LED 1202. As with other examples, the lighting device 1200 may include a light-transmissive material 1212, a user interface 1214, and a plug 1216.

As shown in FIG. 13, the user interface 1214 may be in the form of a simple thumbscrew or set-screw which a user may rotate (e.g., using their fingers or a small calibration screwdriver or similar instrument) to change one or more parameters of the generated light (e.g., color, intensity, dynamic effect, etc.). Of course, the user interface 1214 may be implemented in various other ways as discussed herein. Furthermore, it should be appreciated that a simple thumb-screw or set-screw implementation for a user interface may be used in connection with any other of the lighting devices disclosed herein (e.g., various spotlights or bulbs, night lights, other wall lights or panel devices, toys, etc.).

Figure 14:
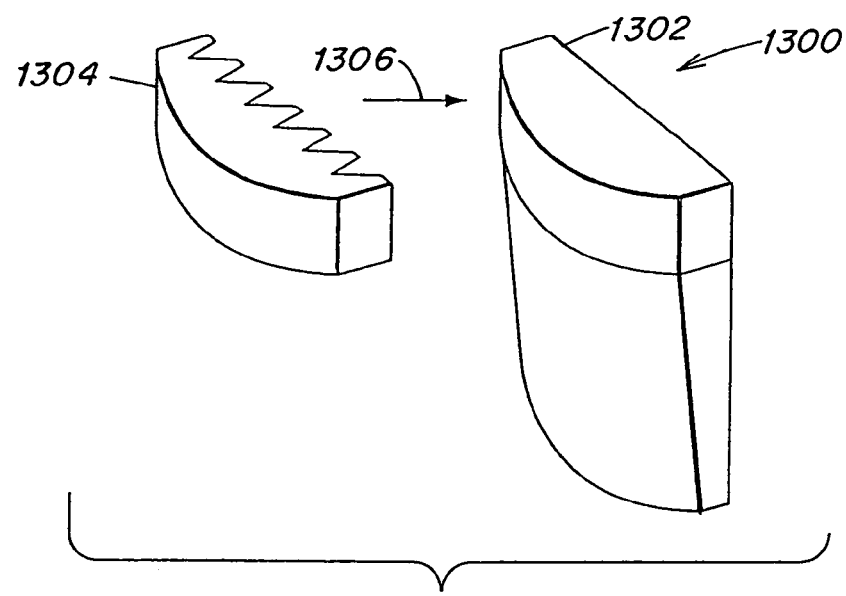
FIG. 14 shows a wall washing light according to the principles of the invention.

FIG. 14 shows another embodiment of a wall washing light according to the principles of the invention. The night light 1300 may include an optic 1302 formed from a light-transmissive material and a detachable optic 1304. The detachable optic 1304 may fit over the optic 1302 in a removable and replaceable fashion, as indicated by an arrow 1306, to provide a lighting effect, which may include filtering, diffusing, focusing, and so forth. The detachable optic 1304 may direct illumination from the night light 1300 into a predetermined shape or image, or spread the spectrum of the illumination in a prismatic fashion. The detachable optic 1304 may, for example, have a pattern etched into including, for example, a saw tooth, slit, prism, grating, squares, triangles, half-tone screens, circles, semi-circles, stars or any other geometric pattern. The pattern can also be in the form of object patterns such as, but not limited to, trees, stars, moons, sun, clovers or any other object pattern. The detachable optic 1304 may also be a holographic lens. The detachable optic 1304 may also be an anamorphic lens configured to distort or reform an image. These patterns can also be formed such that the projected light forms a non-distorted pattern on a wall, provided the geometric relationship between the wall and the optic is known in advance. The pattern could be designed to compensate for the wall projection. Techniques for applying anamorphic lenses are described, for example, in "Anamorphic Art and Photography—Deliberate Distortions That Can Be Easily Undone," *Optics and Photonics News*, November 1992, the teachings of which are incorporated herein by reference. The detachable optic 1304 may include a multi-layered lens. At least one of the lenses in a multi-layered lens could also be adjustable to provide the user with adjustable illumination patterns.

Figure 15:
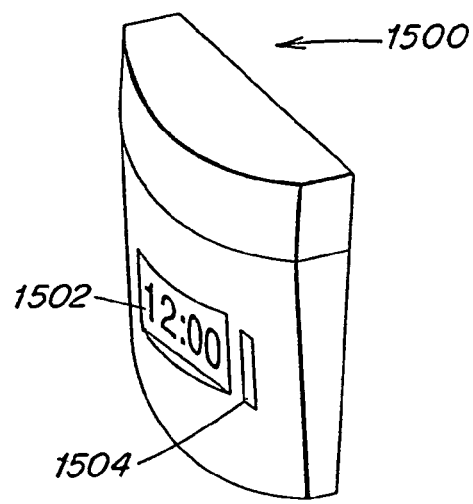
FIG. 15 shows a light according to the principles of the invention.

FIG. 15 shows a lighting device according to the principles of the invention. The lighting device 1500 may be any of the lighting devices described above. The lighting device may include a display screen 1502. The display screen 1502 can be any type of display screen such as, but not limited to, an LCD, plasma screen, backlit display, edgelit display, monochrome screen, color screen, screen, or any other type of display. The display screen 1502 could display information for the user such as the time of day, a mode or parameter value for the lighting device 1500, a name of a mode, a battery charge indication, or any other information useful to a user of the lighting device 1500. A name of a mode may be a generic name, such as 'strobe', 'static', and so forth, or a fanciful name, such as 'Harvard' for a crimson illumination or 'Michigan' for a blue-yellow fade or wash. Other names may be given to, and displayed for, modes relating to a time of the year, holidays, or a particular celebration. Other information may be displayed, including a time of the day, days left in the year, or any other information. The display information is not limited to characters; the display screen 1502 could show pictures or any other information. The display screen 1502 may operate under control of the processor 2 of FIG. 1. The lighting device 1500 may include a user interface 1504 to control, for example, the display screen 1502, or to set a tine or other information displayed by the display screen 1502, or to select a mode or parameter value.

The lighting device 1500 may also be associated with a network, and receive network signals. The network signals could direct the lighting device to project various colors as well as depict information on the display screen 1502. For example, the device could receive signals from the World Wide Web and change the color or projection patterns based on the information received. The device may receive outside temperature data from the Web or other device and project a color based on the temperature. The colder the temperature the more saturated blue the illumination might become, and as the temperature rises the lighting device 1500 might project red illumination. The information is not limited to temperature information. The information could be any information that can be transmitted and received. Another example is financial information such as a stock price. When the stock price rises the projected illumination may turn green, and when the price drops the projected illumination may turn red. If the stock prices fall below a predetermined value, the lighting device 1500 may strobe red light or make other indicative effects.

It will be appreciated that systems such as those described above, which receive and interpret data, and generate responsive color-changing illumination effects, may have broad application in areas such as consumer electronics. For example, information may be obtained, interpreted, and converted to informative lighting effects in devices such as a clock radio, a telephone, a cordless telephone, a facsimile machine, a boom box, a music box, a stereo, a compact disk player, a digital versatile disk player, an MP3 player, a cassette player, a digital tape player, a car stereo, a television, a home audio system, a home theater system, a surround sound system, a speaker, a camera, a digital camera, a video recorder, a digital video recorder, a computer, a personal digital assistant, a pager, a cellular phone, a computer mouse, a computer peripheral, or an overhead projector.

Figure 16:
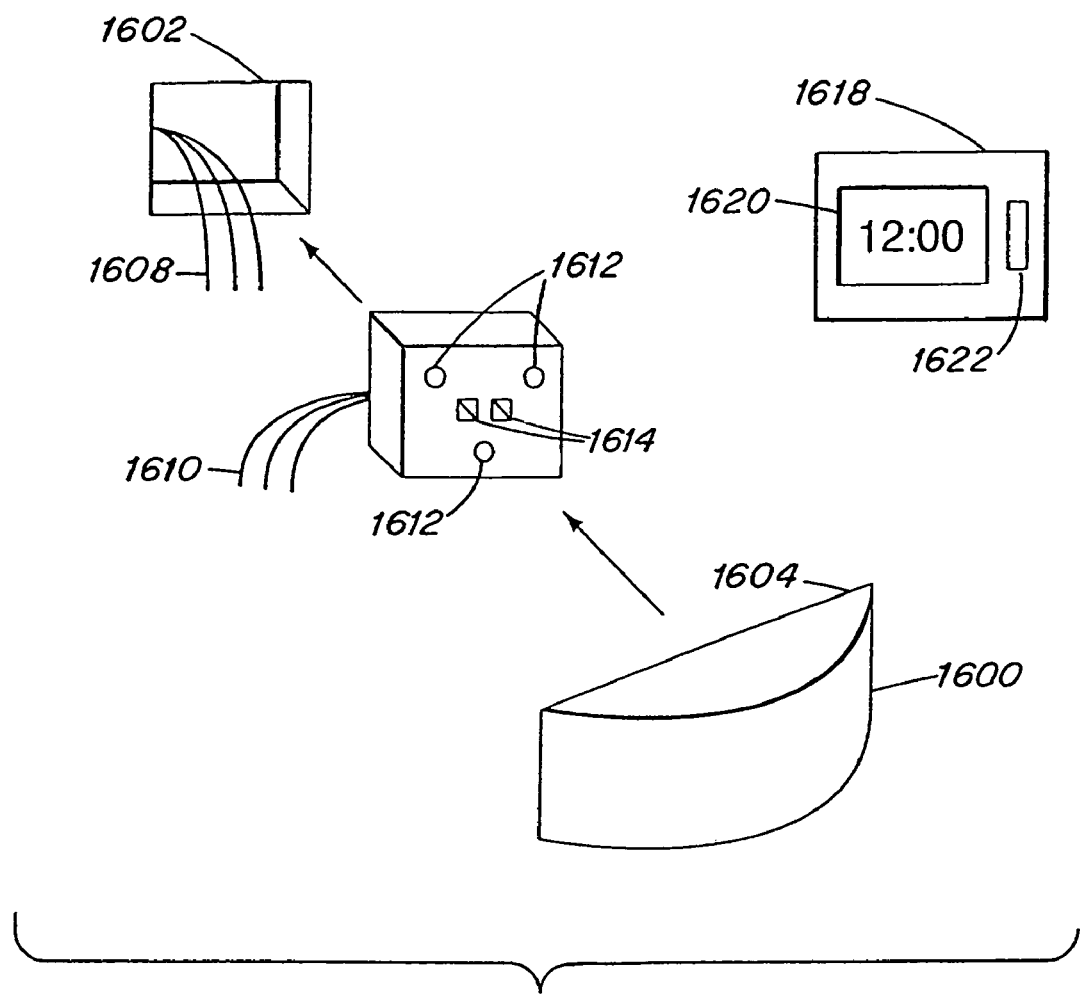
FIG. 16 shows a lighting system according to the principles of the invention.

FIG. 16 depicts a modular unit. A lighting device 1600 may contain one or more LEDs and a decorative portion of a lighting fixture. An interface box 1616 could contain a processor, memory, control circuitry, and a power supply to convert the AC to DC to operate the lighting device 1600. The interface box 1616 may have standard power wiring 1610 to be connected to a power connection 1608. The interface box 1616 can be designed to fit directly into a standard junction box 1602. The interface box 1616 could have physical connection devices 1612 to match connections on a backside 1604 of the lighting device 1600. The physical connection devices 1612 could be used to physically mount the lighting device 1600 onto the wall. The interface box 1616 could also include one or more electrical connections 1614 to bring power to the lighting device 1600. The electrical connections 1614 may include connections for carrying data to the interface box 1616, or otherwise communicating with the interface box 1616 or the lighting device 1600. The connections 1614 and 1612 could match connections on the backside 1604 of the lighting device 1600. This would make the assembly and changing of lighting devices 1600 easy. These systems could have the connectors 1612 and 1614 arranged in a standard format to allow for easy changing of lighting devices 1600. It will be obvious to one with ordinary skill in the art that the lighting fixture 1600 could also contain some or all of the circuitry.

The lighting devices 1600 could also contain transmitters and receivers for transmitting and receiving information.

This could be used to coordinate or synchronize several lighting devices 1600. A control unit 1618 with a display screen 1620 and interface 1622 could also be provided to set the modes of, and the coordination between, several lighting devices 1600. This control unit 1618 could control the lighting device 1600 remotely. The control unit 1618 could be placed in a remote area of the room and communicate with one or more lighting devices 1600. The communication could be accomplished using any communication method such as, but not limited to, RF, IR, microwave, acoustic, electromagnetic, cable, wire, network or other communication method. Each lighting device 1600 could also have an addressable controller, so that each one of a plurality of lighting devices 1600 may be individually accessed by the control unit 1618, through any suitable wired or wireless network.

Figure 17:
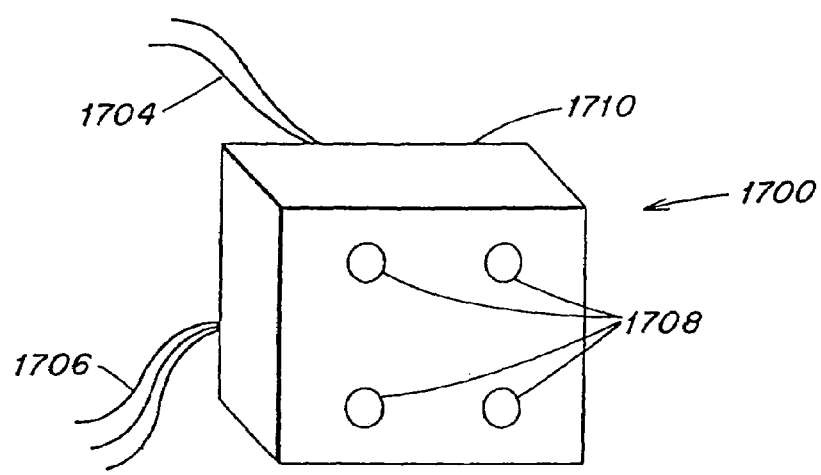
FIG. 17 shows a light according to the principles of the invention.

FIG. 17 shows a modular topology for a lighting device. In this modular configuration, a light engine 1700 may include a plurality of power connectors 1704 such as wires, a plurality of data connectors 1706, such as wires, and a plurality of LEDs 1708, as well as the other components described in reference to FIGS. 1 and 2A–2B, enclosed in a housing 1710. The light engine 1700 may be used in lighting fixtures or as a stand-alone device. The modular configuration may be amenable to use by lighting designers, architects, contractors, technicians, users or other people designing or installing lighting, who may provide predetermined data and power wiring throughout an installation, and locate a light engine 1700 at any convenient location therein.

Optics may be used to alter or enhance the performance of illumination devices. For example, reflectors may be used to redirect LED radiation, as described in U.S. patent application Ser. No. 60/235,966 "Optical Systems for Light Emitting Semiconductors," the teachings of which are incorporated herein by reference.

Figure 18:
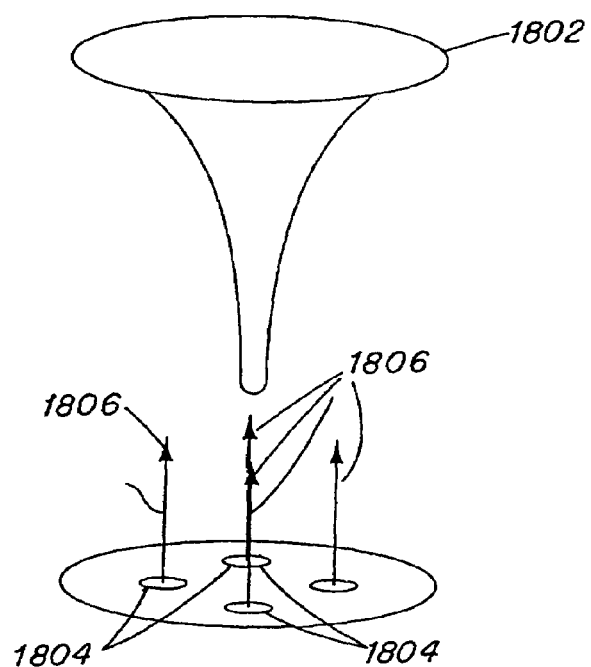
FIG. 18 shows a light and reflector arrangement according to the principles of the invention.

FIG. 18 shows a reflector that may be used with the systems described herein. As shown in FIG. 18, a contoured reflective surface 1802 may be placed apart from a plurality of LEDs 1804, such that radiation from the LEDs 1804 is directed toward the reflective surface 1802, as indicated by arrows 1806. In this configuration, radiation from the LEDs 1804 is redirected out in a circle about the reflective surface 1802. The reflective surface 1802 may have areas of imperfections or designs to create projection effects. The LEDs 1804 can be arranged to uniformly project the light onto the reflector or they can be arranged with a bias to increase the illumination on certain sections of the reflector. The individual LEDs 1804 of the plurality of LEDs 1804 can also be independently controlled. This technique can be used to create light patterns or color effects.

Figure 19:
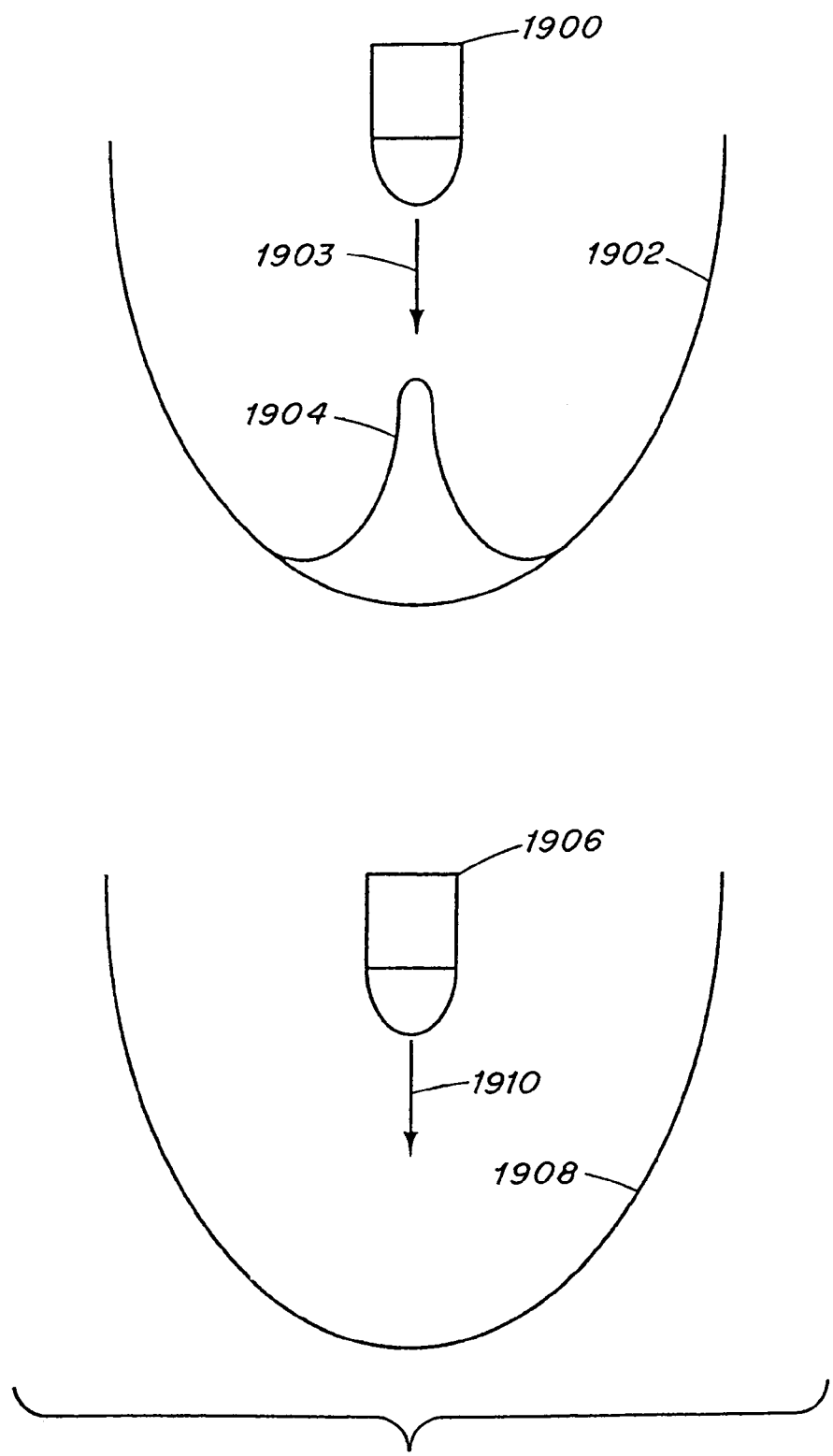
FIG. 19 shows a light and reflector arrangement according to the principles of the invention.
Figure 20:
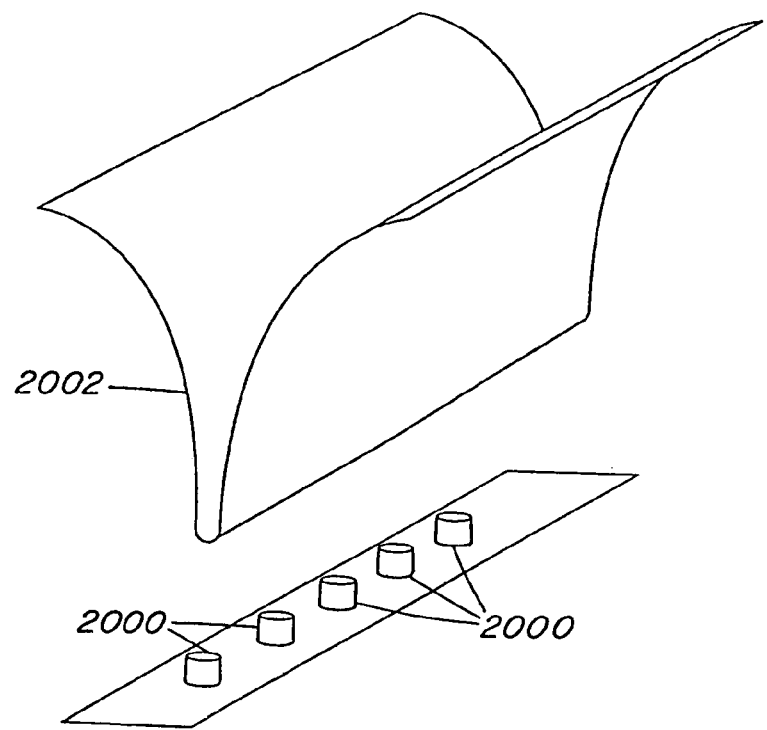
FIG. 20 shows a light and reflector arrangement according to the principles of the invention.
Figure 21:
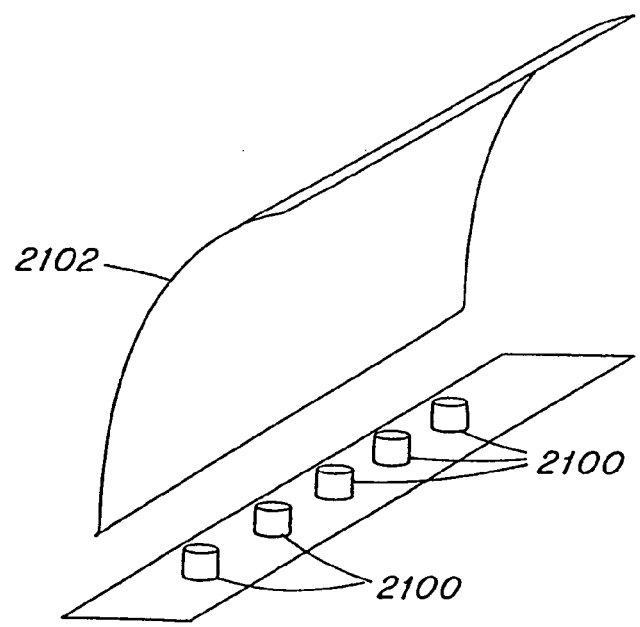
FIG. 21 shows a light and reflector arrangement according to the principles of the invention.

FIG. 19 illustrates a reflector design where an LED 1900 is directed toward a general parabolic reflector 1902, as indicated by an arrow 1903. The generally parabolic reflector 1902 may include a raised center portion 1904 to further focus or redirect radiation from the LED 1900. As shown by a second LED 1906, a second generally parabolic reflector 1908, and a second arrow 1910, the raised center portion 1904 may be omitted in some configurations. It will be appreciated that the LED 1900 in this configuration, or in the other configurations described herein using reflective surfaces, may be in any package or without a package. Where no package is provided, the LED may be electrically connected on an n-side and a p-side to provide the power for operation. As shown in FIG. 20, a line of LEDs 2000 may be directed toward a planar reflective surface 2002 that directs the line of LEDs 2000 in two opposite planar directions. As shown in FIG. 21, a line of LEDs 2100 may be directed toward a planar surface 2102 that directs the line of LEDs 2100 in one planar direction.

A system such as that described in reference to FIG. 1 may be incorporated into a toy, such as a ball. Control circuitry, a power supply, and LEDs may be suspended or mounted inside the ball, with all or some of the ball exterior formed of a light-transmissive material that allows LED color-changing effects to be viewed. Separate portions of the exterior may be formed from different types of light-transmissive material, or may be illuminated by different groups of LEDs to provide the exterior of the ball to be illuminated in different manners over different regions of its exterior.

The ball may operate autonomously to generate color-changing effects, or may respond to signals from an activation switch that is associated with a control circuit. The activation switch may respond to force, acceleration, temperature, motion, capacitance, proximity, Hall effect or any other stimulus or environmental condition or variable. The ball could include one or more activation switches and the control unit can be pre-programmed to respond to the different switches with different color-changing effects. The ball may respond to an input with a randomly selected color-changing effect, or with one of a predetermined sequence of color-changing effects. If two or more switches are incorporated into the ball, the LEDs may be activated according to individual or combined switch signals. This could be used, for example, to create a ball that has subtle effects when a single switch is activated, and dramatic effects when a plurality of switches are activated.

The ball may respond to transducer signals. For example, one or more velocity or acceleration transducers could detect motion in the ball. Using these transducers, the ball may be programmed to change lighting effects as it spins faster or slower. The ball could also be programmed to produce different lighting effects in response to a varying amount of applied force. There are many other useful transducers, and methods of employing them in a color-changing ball.

The ball may include a transceiver. The ball may generate color-changing effects in response to data received through the transceiver, or may provide control or status information to a network or other devices using the transceiver. Using the transceiver, the ball may be used in a game where several balls communicate with each other, where the ball communicates with other devices, or communicates with a network. The ball could then initiate these other devices or network signals for further control.

A method of playing a game could be defined where the play does not begin until the ball is lighted or lighted to a particular color. The lighting signal could be produced from outside of the playing area by communicating through the transceiver, and play could stop when the ball changes colors or is turned off through similar signals. When the ball passes through a goal the ball could change colors or flash or make other lighting effects. Many other games or effects during a game may be generated where the ball changes color when it moves too fast or it stops. Color-changing effects for play may respond to signals received by the transceiver, respond to switches and/or transducers in the ball, or some combination of these. The game hot potato could be played where the ball continually changes colors, uninterrupted or interrupted by external signals, and when it suddenly or gradually changes to red or some other predefined color you have to throw the ball to another person. The ball could have a detection device such that if the ball is not thrown within the predetermined period it initiates a lighting effect such as a strobe. A ball of the present invention may have various shapes, such as spherical, football-shaped, or shaped like any other game or toy ball.

As will be appreciated from the foregoing examples, an LED system such as that described in reference to FIGS. 1 & 2A–2B may be adapted to a variety of color-changing toys and games. For example, color-changing effects may be usefully incorporated into many games and toys, including a toy gun, a water gun, a toy car, a top, a gyroscope, a dart board, a bicycle, a bicycle wheel, a skateboard, a train set, an electric racing car track, a pool table, a board game, a hot potato game, a shooting light game, a wand, a toy sword, an action figure, a toy truck, a toy boat, sports apparel and equipment, a glow stick, a kaleidoscope, or magnets. Color-changing effects may also be usefully incorporated into branded toys such as a View Master, a Super Ball, a Lite Brite, a Harry Potter wand, or a Tinkerbell wand.

Figure 22:
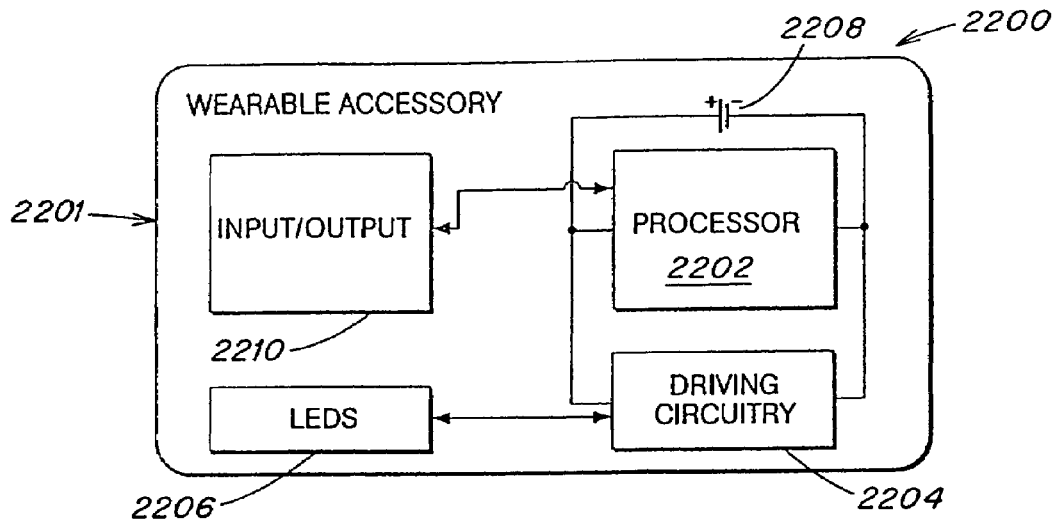
FIG. 22 is a block diagram of an embodiment of a device according to the principles of the invention having internal illumination circuitry.

FIG. 22 is a block diagram of an embodiment of a device according to the principles of the invention having internal illumination circuitry. The device 2200 is a wearable accessory that may include a system such as that described with reference to FIGS. 1 and 2A–2B. The device may have a body 2201 that includes a processor 2202, driving circuitry 2204, one or more LED's 2206, and a power source 2208. The device 2200 may optionally include input/output 2210 that serves as an interface by which programming may be received to control operation of the device 2200. The body 2201 may include a light-transmissive portion that is transparent, translucent, or translucent-diffusing for permitting light from the LEDs 2206 to escape from the body 2200. The LEDs 2206 may be mounted, for example, along an external surface of a suitable diffusing material. The LEDs 2206 may be placed inconspicuously along the edges or back of the diffusing material. Surface mount LED's may be secured directly to the body 2200 on an interior surface of a diffusing material.

The input/output 2210 may include an input device such as a button, dial, slider, switch or any other device described above for providing input signals to the device 2200, or the input/output 2210 may include an interface to a wired connection such as a Universal Serial Bus connection, serial connection, or any other wired connection, or the input/output 2210 may include a transceiver for wireless connections such as infrared or radio frequency transceivers. In an embodiment, the wearable accessory may be configured to communicate with other wearable accessories through the input/output 2210 to produce synchronized lighting effects among a number of accessories. For wireless transmission, the input/output 2210 may communicate with a base transmitter using, for example, infrared or microwave signals to transmit a DMX or similar communication signal. The autonomous accessory would then receive this signal and apply the information in the signal to alter the lighting effect so that the lighting effect could be controlled from the base transmitter location. Using this technique, several accessories may be synchronized from the base transmitter. Information could also then be conveyed between accessories relating to changes of lighting effects. In one instantiation, the input/output 2210 may include a transmitter such as an Abacom TXM series device, which is small and low power and uses the 400 Mhz spectrum. Using such a network, multiple accessories on different people can be synchronized to provide interesting effects including colors bouncing from person to person or simultaneous and synchronized effects across several people. A number of accessories on the same person may also be synchronized to provide coordinated color-changing effects. A system according to the principle of the invention may be controlled though a network as described herein. The network may be a personal, local, wide area or other network. The Blue Tooth standard may be an appropriate protocol to use when communicating to such systems although any protocol could be used.

The input/output 2210 may include sensors for environmental measurements (temperature, ambient sound or light), physiological data (heart rate, body temperature), or other measurable quantities, and these sensor signals may be used to produce color-changing effects that are functions of these measurements.

A variety of decorative devices can be used to give form to the color and light, including jewelry and clothing. For example, these could take the form of necklaces, tiaras, ties, hats, brooches, belt-buckles, cuff links, buttons, pins, rings, or bracelets, anklets etc. Some examples of shapes for the body 2201, or the light-transmissive portion of the body, may include icons, logos, branded images, characters, and symbols (such as ampersands, dollar signs, and musical notes). As noted elsewhere, the system may also be adapted to other applications such as lighted plaques or tombstone signs that may or may not be wearable.

Figure 23:
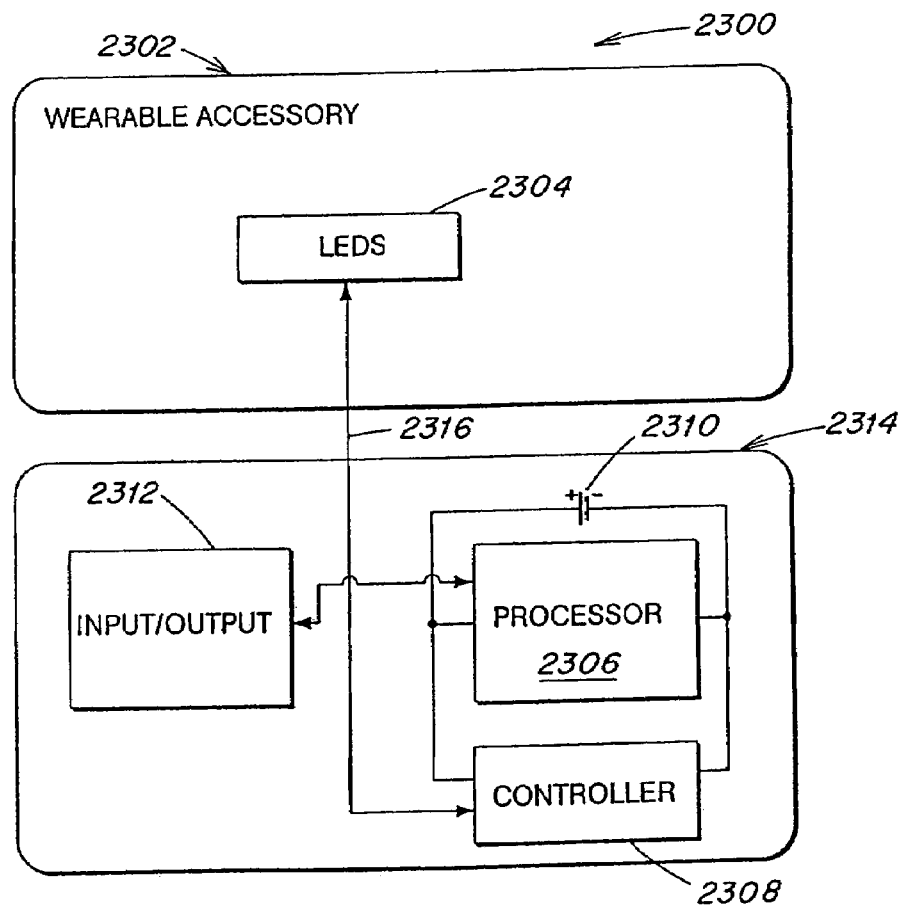
FIG. 23 is a block diagram of an embodiment of a device according to the principles of the invention having external illumination circuitry.

FIG. 23 is a schematic diagram of an embodiment of a device according to the principles of the invention having external illumination circuitry. As shown in FIG. 23, a wearable accessory 2300 may include a first housing 2302 such as a wearable accessory that includes one or more LED's 2304. Illumination circuitry including a processor 2306, controllers 2308, a power source 2310, and an input/output 2312 are external to the first housing 2302 and may be included in a second housing 2314. A link 2316 is provided so that the illumination circuitry may communicate drive signals to the LEDs 2304 within the first housing 2301. This configuration may be convenient for applications where the first housing 2302 is a small accessory or other wearable accessory that may be connected to remote circuitry, as in, for example, the buttons of a shirt. It will be appreciated that while all of the illumination circuitry except for the LEDs 2304 are shown as external to the first housing 2302, one or more of the components may be included within the first housing 2302.

Figure 24:
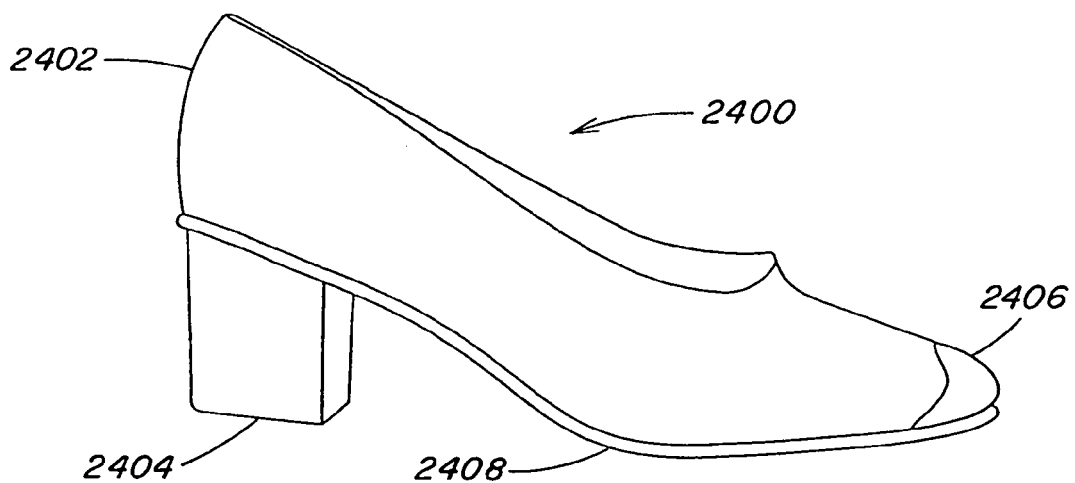
FIG. 24 depicts an autonomous color-changing shoe according to the principles of the invention.

FIG. 24 depicts an autonomous color-changing shoe according to the principles of the invention. A shoe 2400 includes a main portion 2402, a heel 2404, a toe 2406, and a sole 2408. The main portion 2402 is adapted to receive a human foot, and may be fashioned of any material suitable for use in a shoe. The heel 2402 may be formed of a translucent, diffusing material, and may have embedded therein a system such as that described with reference to FIGS. 1 and 2A–2B. In addition to, or instead of a heel 2402 with autonomous color changing ability, another portion of the shoe 2400 may include an autonomous color changing system, such as the toe 2406, the sole 2408, or any other portion. A pair of shoes may be provided, each including an input/output system so that the two shoes may communicate with one another to achieve synchronized color changing effects. In an embodiment of the shoe 2400, circuitry may be placed within a sole 2408 of the shoe, with wires for driving LED's that are located within the heel 2404 or the toe 2406, or both.

As will be appreciated from the foregoing example, the systems disclosed herein may have wide application to a variety of wearable and ornamental objects. Apparel employing the systems may include coats, shirts, pants, clothing, shoes, footwear, athletic wear, accessories, jewelry, backpacks, dresses, hats, bracelets, umbrellas, pet collars, luggage, and luggage tags. Ornamental objects employing the systems disclosed herein may include picture frames, paper weights, gift cards, bows, and gift packages.

Color-changing badges and other apparel may have particular effect in certain environments. The badge, for example, can be provided with a translucent, semi-translucent or other material and one or more LEDs can be arranged to provide illumination of the material. In a one embodiment, the badge would contain at least one red, one blue and one green LED and the LEDs would be arranged to edge light the material. The material may have a pattern such that the pattern reflects the light. The pattern may be etched into the material such that the pattern reflects the light traveling through the material and the pattern appears to glow. When the three colors of LEDs are provided, many color changing effects can be created. This may create an eye-catching effect and can bring attention to a person wearing the badge; a useful attention-getter in a retail environment, at a trade show, when selling goods or services, or in any other situation where drawing attention to one's self may be useful.

The principle of edge lighting a badge to illuminate etched patterns can be applied to other devices as well, such as an edge lit sign. A row of LEDs may be aligned to edge light a material and the material may have a pattern. The material may be lit on one or more sides and reflective material may be used on the opposing edges to prevent the light from escaping at the edges. The reflective material also tends to even the surface illumination. These devices can also be backlit or lit through the material in lieu of, or in addition to, edge lighting.

Figure 25:
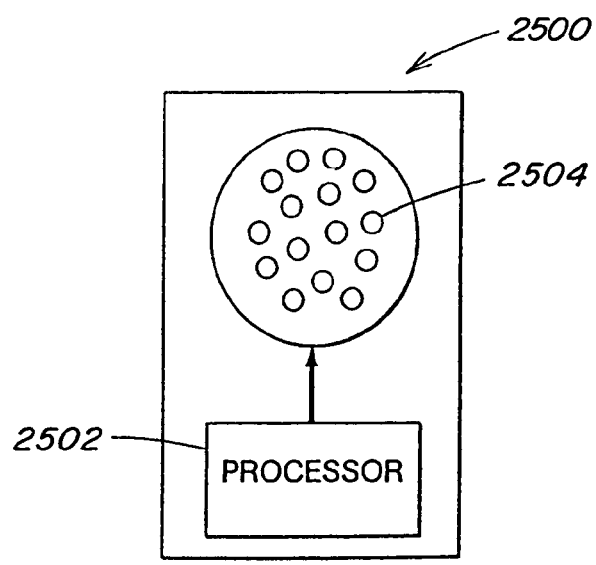
FIG. 25 depicts a device for use with color-changing icicles.

FIG. 25 depicts an LED device according to the invention. The device 2500 may include a processor 2502 and one or more LEDs 2504 in a configuration such as that described with reference to FIGS. 1 and 2A–2B. The device 2500 may be adapted for use with icicles formed from light-transmissive material. The icicles may be mock icicles formed from plastic, glass, or some other material, and may be rendered in a highly realistic, detailed fashion, or in a highly stylized, abstract fashion. A number of color-changing icicles are described below.

Figure 26:
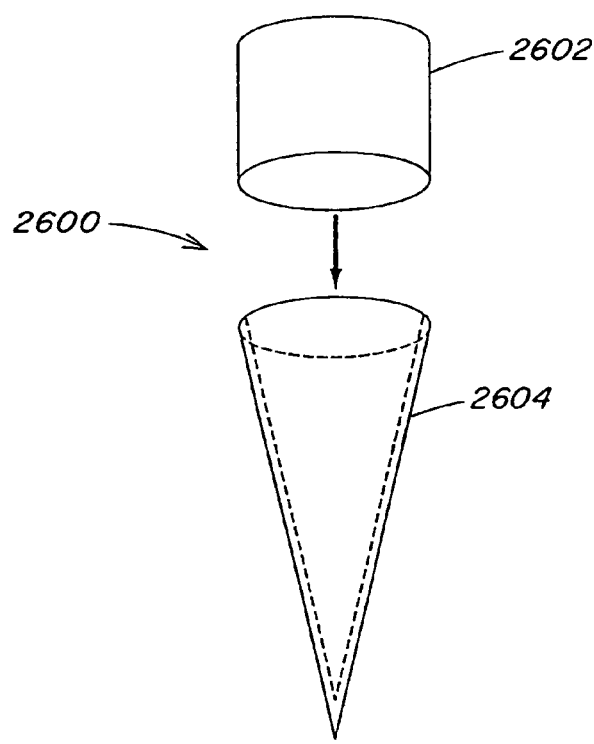
FIGS. 26–30 depict color-changing icicles.

FIG. 26 illustrates a lighted icicle 2600, where an LED lighting device 2602 such as that described in FIGS. 1, 2A–2B, and 25 is used to provide the illumination for an icicle 2604. The icicle 2604 could be formed from a material such as a semi-transparent material, a semi-translucent material, a transparent material, plastic, paper, glass, ice, a frozen liquid or any other material suitable for forming into an icicle and propagating LED radiation. The icicle 2604 may be hollow, or may be a solid formed from light-transmissive material. The illumination from the lighting device 2602 is directed at the icicle 2604 and couples with the icicle 2604. The icicle material may have imperfections to provide various lighting effects. One such effect is created when a primarily transparent material contains a pattern of defects. The defects may redirect the light passing through or along the material, causing bright spots or areas to appear in the illuminated material. If these imperfections are set in a pattern, the pattern will appear bright while the other areas will not appear lighted. The imperfections can also substantially cover the surface of the icicle 2604 to produce a frosted appearance. Imperfections that substantially uniformly cover the surface of the icicle 2604 may create an effect of a uniformly illuminated icicle.

The icicle 2604 can be lit with one or more LEDs to provide illumination. Where one LED is used, the icicle 2604 may be lit with a single color with varying intensity or the intensity may be fixed. In one embodiment, the lighted icicle 2600 includes more than one LED and in another embodiment the LEDs are different colors. By providing a lighted icicle 2600 with different colored LEDs, the hue, saturation and brightness of the lighted icicle 2600 can be changed. The two or more LEDs can be used to provide additive color. If two LEDs were used in the lighted icicle 2600 with circuitry to turn each color on or off, four colors could be produced including black when neither LED is energized. Where three LEDs are used in the lighted icicle 2600 and each LED has three intensity settings, $3^3$ or 27 color selections are available. In one embodiment, the LED control signals would be PWM signals with eight bits (=128 combinations) of resolution. Using three different colored LEDs, this provides $128^3$ or 16.7 million available colors.

Figure 27:
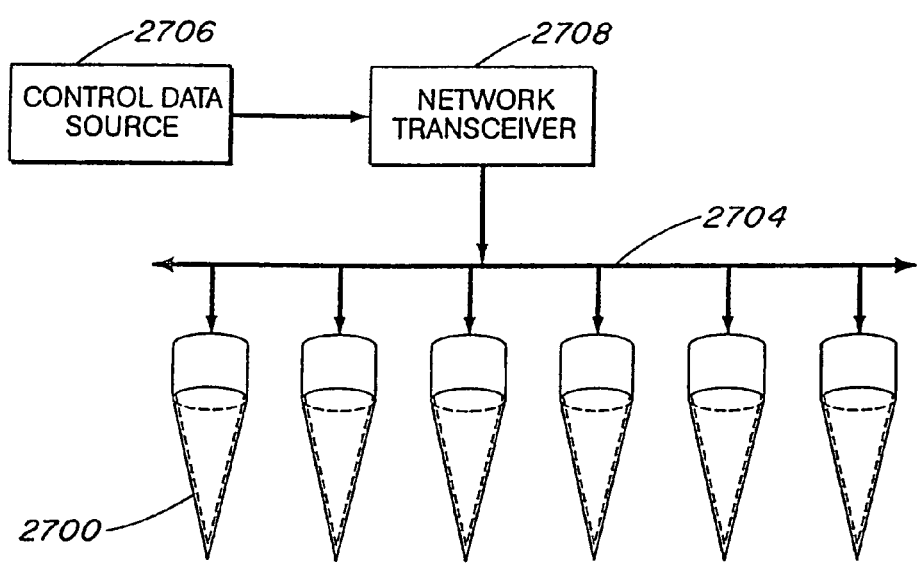

FIG. 27 illustrates a plurality of icicles sharing a network. A plurality of lighted icicles 2700 each includes a network interface to communicate over a network 2704, such as any of the networks mentioned above. The network 2704 may provide lighting control signals to each of the plurality of lighted icicles 2700, each of which may be uniquely addressable. Where the lighted icicles 2700 are not uniquely addressable, control information may be broadcast to all of the lighted icicles 2700. A control data source 2706, such as a computer or any of the other controls mentioned above, may provide control information to the lighted icicles 2700 through a network transceiver 2708 and the network 2704. One of the lighted icicles 2700 could also operate as a master icicle, providing control information to the other lighted icicles 2700, which would be slave icicles. The network 2704 may be used generally to generate coordinated or uncoordinated color-changing lighting effects from the plurality of lighted icicles.

One or more of the plurality of lighted icicles 2700 may also operate in a stand-alone mode, and generate color-changing effects separate from the other lighted icicles 2700. The lighted icicles 2700 could be programmed, over the network 2704, for example, with a plurality of lighting control routines to be selected by the user such as different solid colors, slowly changing colors, fast changing colors, stobing light, or any other lighting routines. The selector switch could be used to select the program. Another method of selecting a program would be to turn the power to the icicle off and then back on within a predetermined period of time. For example, non-volatile memory could be used to provide an icicle that remembers the last program it was running prior to the power being shut off. A capacitor could be used to keep a signal line high for 10 seconds and if the power is cycled within this period, the system could be programmed to skip to the next program. If the power cycle takes more then 10 seconds, the capacitor discharges below the high signal level and the previous program is recalled upon re-energizing the system. Other methods of cycling through programs or modes of operation are known, and may be suitably adapted to the systems described herein.

Figure 28:
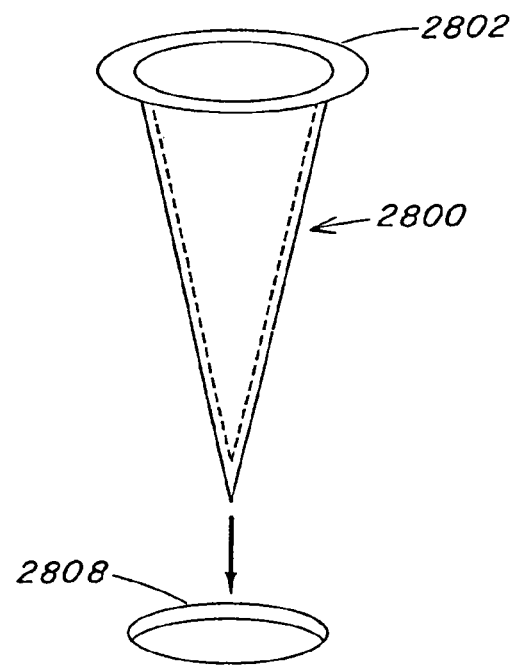

FIG. 28 depicts an icicle 2800 having a flange 2802. The flange 2802 may allow easy mounting of the icicle 2800. In one embodiment, the flange 2802 is used such that the flange couples with a ledge 2808 while the remaining portion of the icicle 2800 hangs through a hole formed by the ledge 2808. This method of attachment is useful where the icicles can hang through existing holes or holes can be made in the area where the icicles 2800 are to be displayed. Other attachment methods are known, and may be adapted to use with the invention.

Figure 29:
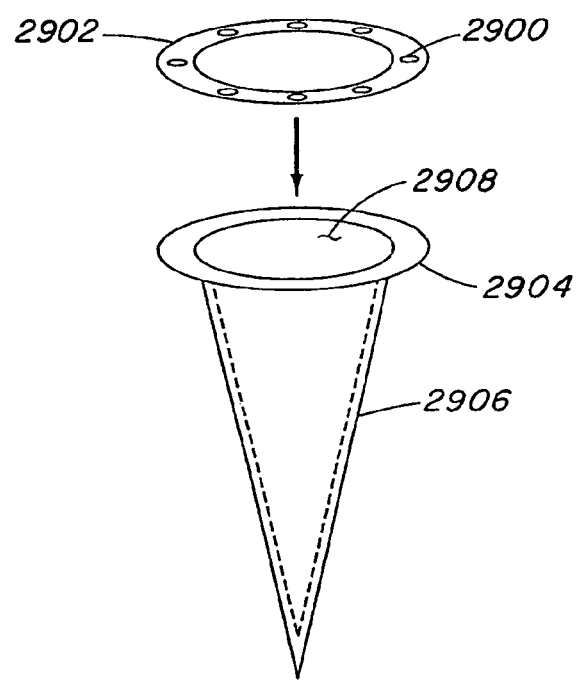

FIG. 29 shows an icicle according to the principles of the invention. A plurality of LEDs 2900 may be disposed in a ring 2902. The ring 2902 may be engaged to a flange 2904 of an icicle 2906. Arranged in this manner, the LEDs 2900 may radiate illumination that is transmitted through icicle 2906. If the ring 2902 is shaped and sized so that the LEDs 2900 directly couple to the flange 2904, then the icicle 2906 will be edge-lit. The ring 2902 may instead be smaller in diameter than the flange 2904, so that the LEDs 2900 radiate into a hollow cavity 2908 in the icicle 2906, or onto a top surface of the icicle 2906 if the icicle 2906 is formed of a solid material.

Figure 30:
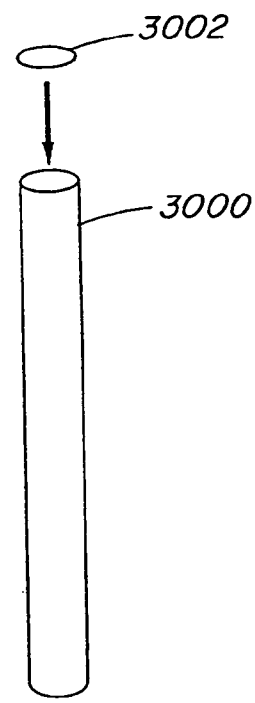

FIG. 30 depicts a solid icicle 3000 which may be in the form or a rod or any other suitable form, with one or more LEDs 3002 positioned to project light into the solid icicle 3000.

Figure 31:
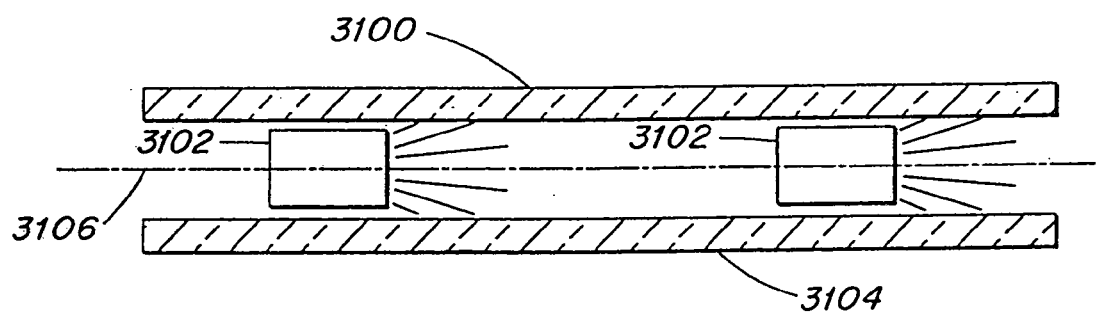
FIG. 31 depicts a color-changing rope light.

FIG. 31 depicts a rope light according to the principles of the invention. The rope light 3100 may include a plurality of LEDs or LED subsystems 3102 according to the description provided in reference to FIGS. 1 and 2A–2B. In one embodiment, three LED dies of different colors may be packaged together in each LED subsystem 3102, with each die individually controllable. A plurality of these LED subsystems 3102 may be disposed inside of a tube 3102 that is flexible and semi-transparent. The LED subsystems 3102 may be spaced along the tube 3104, for example, at even intervals of every six inches, and directed along an axis 3106 of the tube 3104. The LED subsystems 3102 may be controlled through any of the systems and methods described above. In one embodiment, a number of LED subsystems 3102 may be controlled by a common signal, so that a length of tube 3104 of several feet or more may appear to change color at once. The tube 3104 may be fashioned to resemble a rope, or other cylindrical material or object. The LED subsystems 3102 may be disposed within the tube 3104 in rings or other geometric or asymmetric patterns. The LED subsystems 3102 could also be aligned to edge light the tube 3104, as described above. A filter or film may be provided on an exterior surface or an interior surface of the tube 3104 to create pleasing visual effects.

Other consumer products may be realized using the systems and methods described herein. A hammer may generate color-changing effects in response to striking a nail; a kitchen timer may generate color-changing effects in response to a time countdown, a pen may generate color-changing effects in response to the act of writing therewith, or an electric can opener may generate color-changing effects when activated.

Another embodiment of the invention is directed to various implementations of illuminated wall panel apparatus. Generally, such apparatus include an essentially planar member that serves as either a portion of a wall itself, or that is adapted to be essentially flush-mounted on a wall. For example, in one aspect, the essentially planar member may be in the form of a common wallplate used for electrical switches and sockets. The apparatus also includes an LED-based light source adapted to be positioned with respect to the essentially planar member so as to be behind the essentially planar member when the essentially planar member is mounted on a wall. In one aspect, the LED-based light source is configured to generate light that is perceived by an observer while viewing the essentially planar member.

In particular, in various aspects of this embodiment, the apparatus may be implemented as a multicolored wall switch, plate, socket, data port, or the like, wherein the color of the system is generated by a multicolored LED-based light source, as described herein in various other embodiments. As discussed herein, the LED lighting system of this embodiment may be associated with interface devices such as a user interface, network interface, sensor, transducer or other signal generator to control the color of the system. In another aspect, the lighting system may include more than one color of LEDs such that modulating the output of one or more of the LEDs can change the color of the device.

Figure 32B:
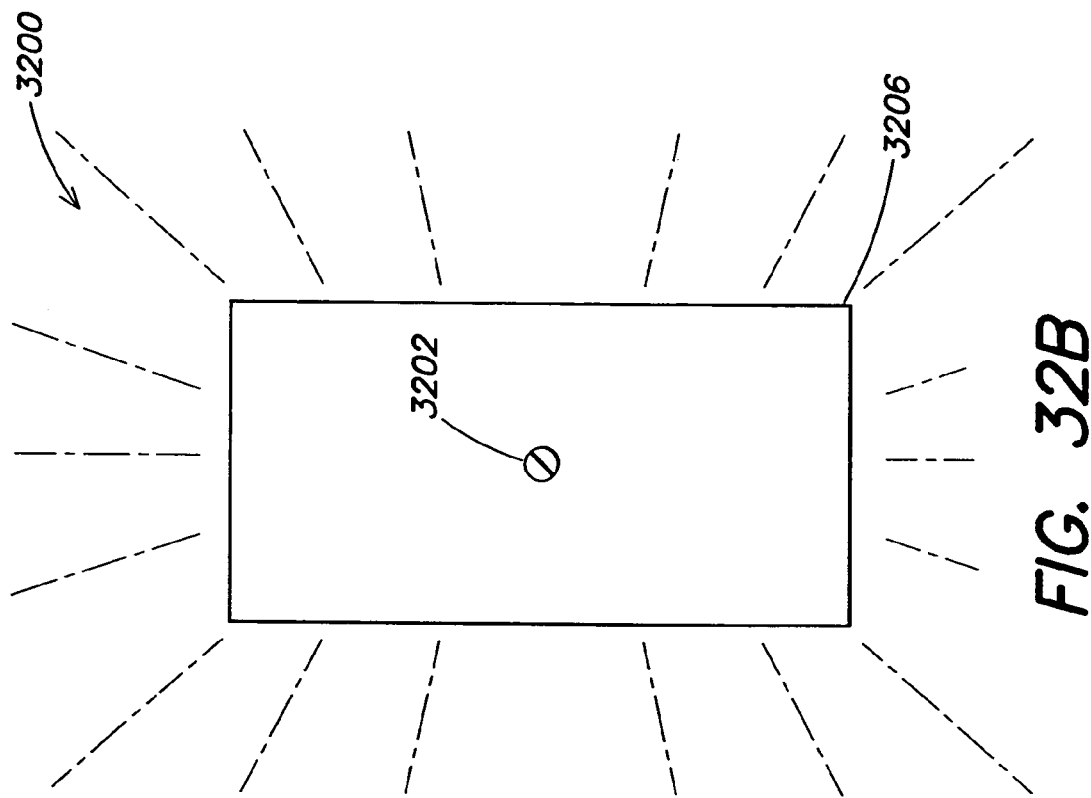
FIGS. 32A and 32B illustrate an illuminated wall panel device according to one embodiment of the invention.
Figure 32A:
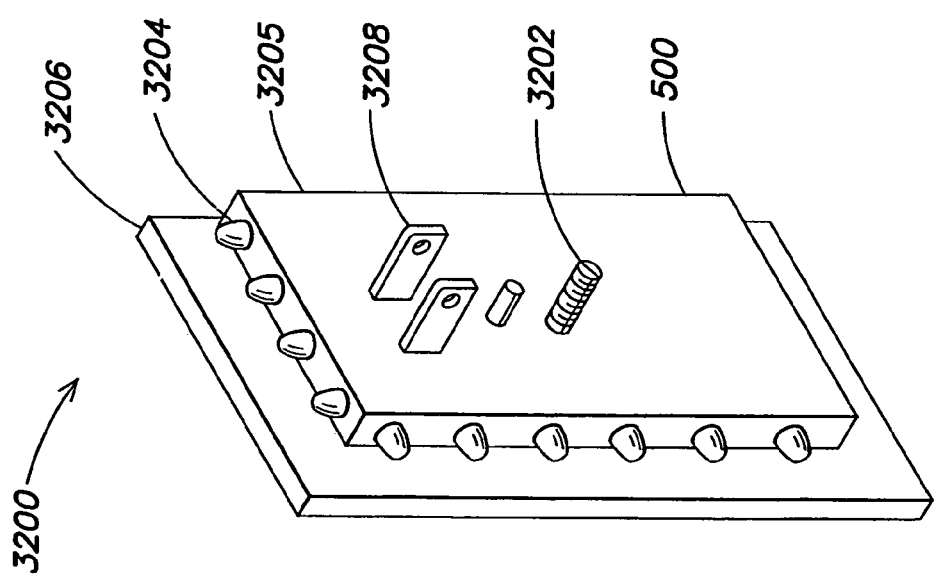

FIGS. 32A and 32B illustrate a lighting device 3200 according to the principles of the present invention. The lighting device 3200 may include a lighting system 500 as shown in FIG. 1, for example. LED(s) 3204 may be arranged to project light from a base member 3205. A faceplate 3206 may be provided in the device to cover the direct view of the LED(s) while allowing the projection of the light from the LED(s). FIG. 32B illustrates the front view of the lighting device 3200 while FIG. 32A illustrates the rear view of the lighting device 3200.

The lighting device 3200 may include a power adapter 3208. In an embodiment, the power adapter 3208 is an outlet plug designed to be attached to a standard power outlet. In an embodiment, there may be two or more power adapters 3208. The lighting device may also include a fastener 3202 to secure the attachment of the lighting device. In an embodiment, the fastener may be a screw that is designed to fasten the lighting device 3200 to a power outlet to prevent the device from being removed. This may be useful in situations where the lighting device is available to children and the children are attracted to the device to prevent them from removing the device.

In an embodiment, the lighting device 3200 may be provided with LEDs and a circuit or processor to produce a constant unchangeable light. In another embodiment, the lighting system 3200 may be arranged to provide color-changing effects. As with other embodiments described herein, the lighting device 3200 may be provided with a user interface, network or data port connections, sensors or other systems to control the light generated by the lighting device 3200.

Figure 33:
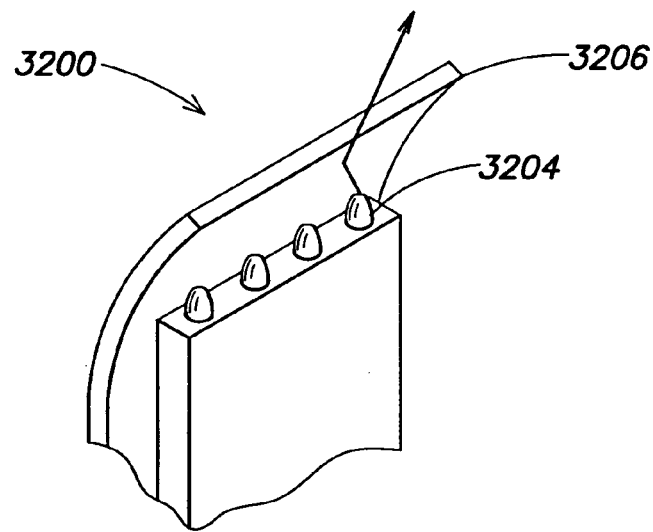
FIG. 33 illustrates a modified faceplate of the device shown in FIGS. 32A and 32B.

FIG. 33 illustrates another embodiment of the lighting device 3200 according to the principles of the present invention. In this embodiment, the faceplate 3206 may be shaped and or the LED(s) 3204 may be directed such that at least a portion of the light from the LED(s) is reflected off of the faceplate. By reflecting the light off of the surface, increased color mixing may be achieved as well as smoother effects may be generated. In an embodiment, the faceplate may be made of material that allows for partial transmission of the light to allow for certain lighting effects to be generated. In an embodiment, the faceplate may include a rough surface to increase the reflection distribution of the light. In another embodiment, the faceplate surface may be smooth. In an embodiment, the edges of the faceplate 3206 may include a pattern to change the projected lighting effects. In an embodiment, the pattern may include projections from the faceplate such that the projections interfere with the light and cause a light pattern.

Figure 34:
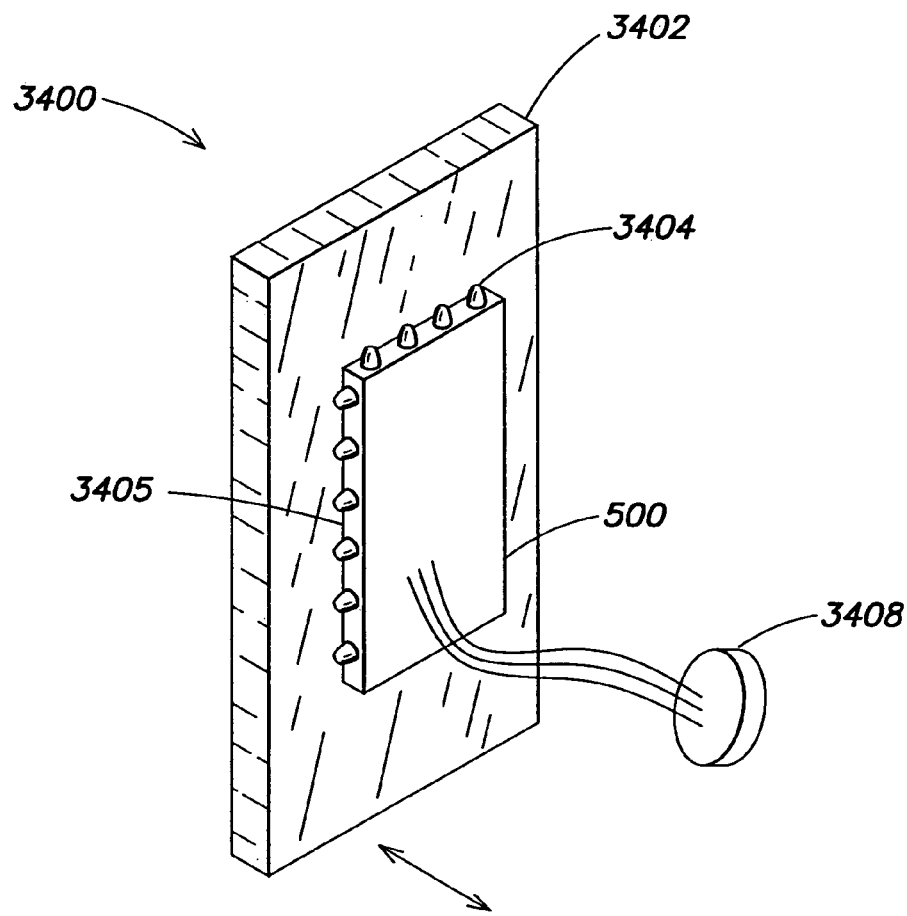
FIG. 34 illustrates an illuminated panel according to another embodiment of the invention.

FIG. 34 illustrates another lighting device 3400 according to the principles of the present invention. In an embodiment, the lighting device 3400 may include a lighting system 500 as shown in FIG. 1. The system may be designed to produce a single color light or it may be designed to generate color-changing effects or other lighting effects. The LEDs 3404 may be mounted on a base member 3405 and the base member 3405 may be arranged in an optic 3402. The optic 3402 may be transparent, translucent, semi-transparent or other material deigned to transmit a portion of the light emitted from the LEDs 3404. In an embodiment, several colors of LEDs may be used (e.g. red, green, blue, white) along with a processor that independently controls the LEDs such that mixtures of colors may be produced.

In an embodiment, the lighting device 3400 may be arranged to be mounted in or on a junction box or designed to replace a junction box. A power adapter 3408 may be provided with the lighting device 3400 such that it can be electrically connected with external power. In an embodiment, the power adapter 3408 may be a set of wires intended to be connected to power in a wall.

In an embodiment the optic 3402 may be transparent such that the light projected from the LEDs is directed out of the optic. This may be useful in providing a lighting device that will project light onto a wall for example. The sides of the optic 3402 may be etched or otherwise rough such that the sides appear to glow as a result of internally reflected light. The front of the optic may likewise be rough to provide a glowing panel. In an embodiment, the optic 3402 may be hollow or solid.

Figure 35:
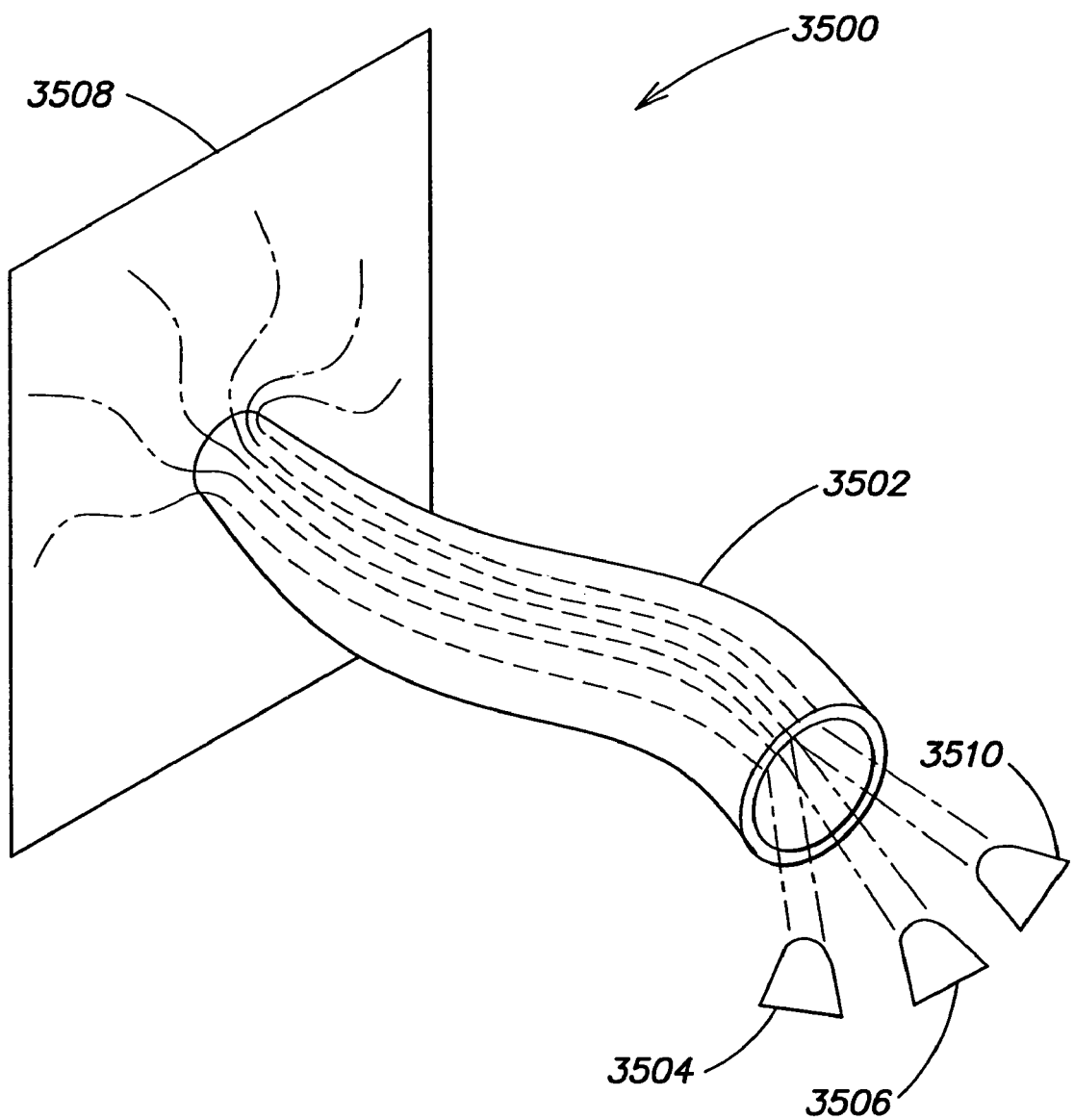
FIG. 35 illustrates an illuminated panel using fiber optics according to another embodiment of the invention.

FIG. 35 illustrates another lighting device 3500 according to the principles of the present invention. The lighting device in the illustrated embodiment may include LEDs 3504, 3506, and 3510 and/or a lighting system 500 as shown in FIG. 1. The LED illumination may be projected into a fiber, several fibers, a fiber bundle or other fiber arrangement 3502. The emitting sections of the fiber arrangement 3502 may be arranged to project light into, through, or from a faceplate 3508. The fiber may be arranged to emit light from the end of the fiber or the fiber may be side-emitting fiber.

Figure 37:
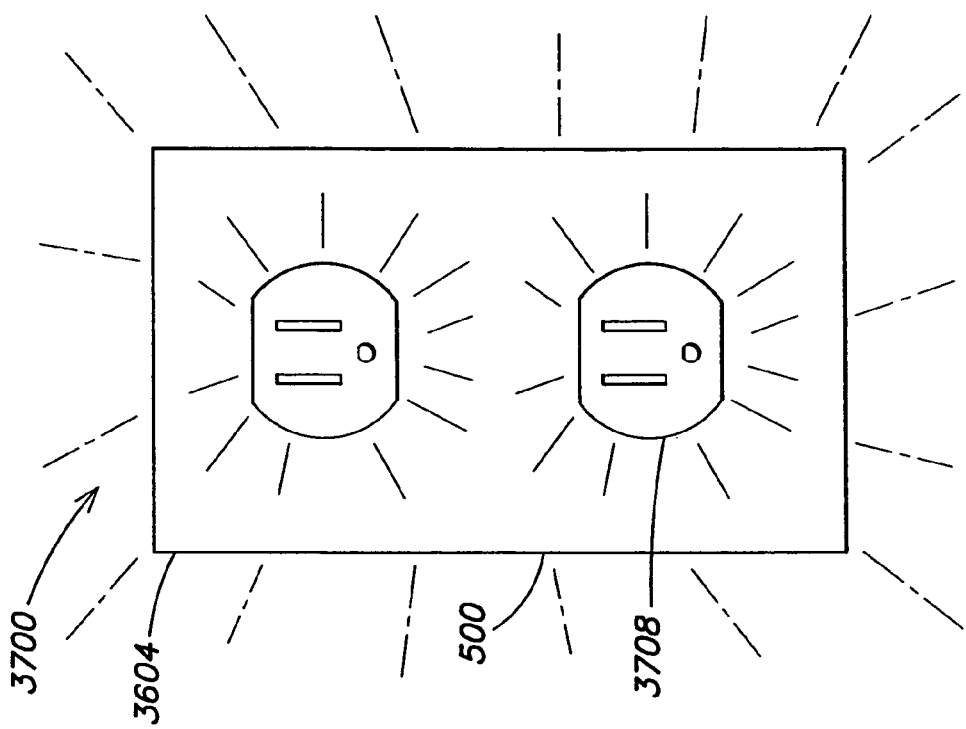
FIG. 37 illustrates an illuminated wall socket/plate according to another embodiment of the invention.
Figure 36:
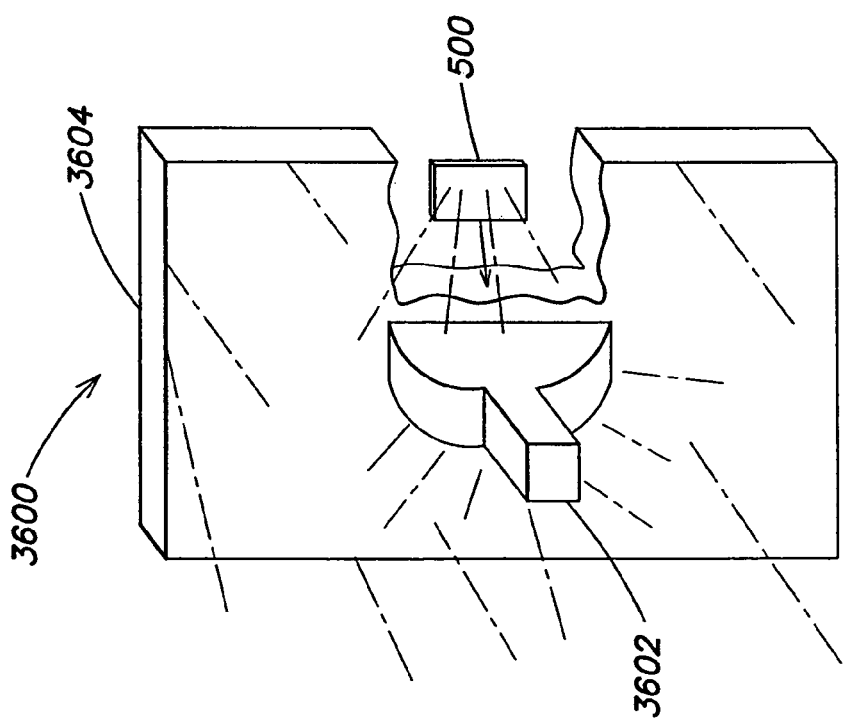
FIG. 36 illustrates an illuminated wall switch/plate according to another embodiment of the invention.

FIG. 36 illustrates another embodiment of a lighting device 3600 of the invention, including a wall switch 3602 with a wall cover plate 3604. One or more lighting systems 500 as shown for example in FIG. 1 may be included in the device 3600 to provide illumination to the switch 3602 and/or wall plate 3604. FIG. 37 illustrates a similar device 3700 including an illuminated electrical socket 3708.

In FIGS. 36 and 37, the lighting system 500 may be arranged to illuminate the material of the switch, plate, socket, etc. from behind or through the edge of the material, for example. The material or portion thereof may be transparent, translucent, semi-transparent, semi-translucent or another material that will allow a portion of the light to be transmitted and or reflected. In an embodiment, the material may be etched or have other imperfections on the surface or in the bulk of the material to mix and or redirect the light. The imperfections may be provided to generate a uniform lighting effect on or in the material. For example, the surface of the material may be sand blasted and a lighting system 500 may be arranged to light the material. The light may then enter the material and scatter in many directions causing the material to be evenly illuminated. In an embodiment, imperfections may be introduced in a pattern such that the pattern appears to glow. For example, the material may include a pattern of imperfections wherein the area surrounding the pattern is opaque, transparent, or different than the patterned area. When the material is lit, the pattern will appear to glow.

In an embodiment, a lighting system 500 used in the devices 3600 or 3700, or a portion of the lighting system 500, may be located in a junction box and arranged to project light onto the wall plate 3604, switch 3602, socket 3708, or other section of the devices 3600 or 3700. In an embodiment, the lighting system 500, or portion thereof may be located in the switch 3602 itself, or other material to light the material.

Figure 38:
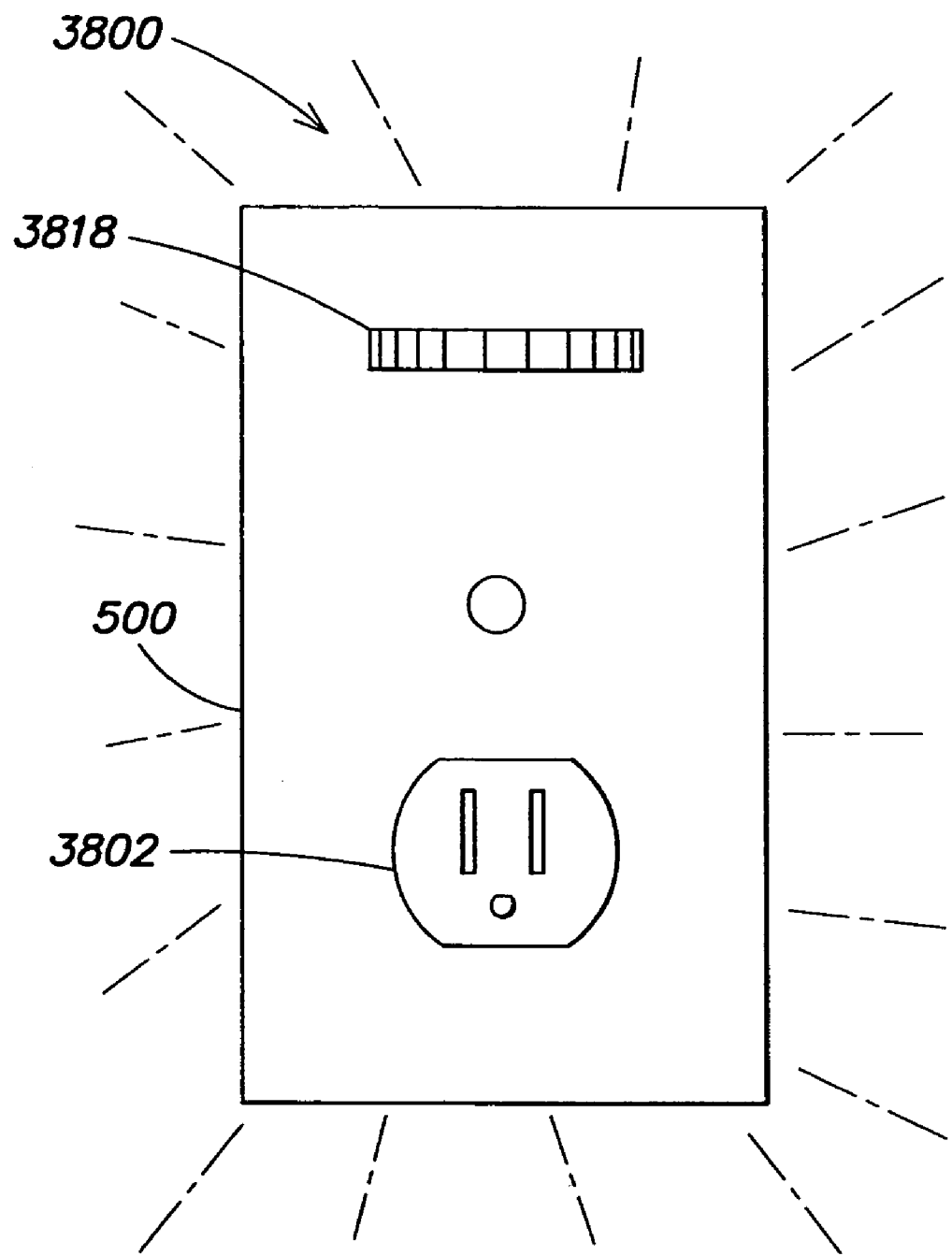
FIG. 38 illustrates an illuminated wall socket/plate having a user interface according to another embodiment of the invention.

FIG. 38 illustrates another lighting device 3800 according to the principles of the present invention. In the illustrated embodiment, the lighting device 3800 may include a lighting system 500 as shown in FIG. 1, and also may include any of a variety of user interfaces 3818 as described herein (e.g., such that a user can adjust the color of the device 3800). In particular, as shown in FIG. 38, the user interface may be a switch, button, dial, etc.

In general, any of the devices shown in FIGS. 32–38 as well as other figures may include a user interface that is provided as a dial such that changing the position of the dial may change the color of the system. In the embodiment of FIG. 36, for example, the user interface may be the switch 3602 itself, such that the switch not only operates power but also activates the lighting system 500 to produce the colored light to illuminate the panel or the switch. In another embodiment, one or more user interfaces may be provided through switches, dials, or the like that are not generally accessible to the user. For example, the installer of the switch or junction box may select the color by setting switches on the lighting system and when the lighting system is installed the switches are no longer accessible to the common user.

As discussed herein, user interfaces for any of the devices shown in FIGS. 32–38 as well as other figures may alternatively be implemented as a software driven graphical user interface, a personal digital assistant (PDA), a mobile remote-control interface, etc. In particular, the user interface may generate and communicate signals to various lighting devices through wired or wireless transmission.

Additionally, any of the lighting devices discussed in connection with FIGS. 32–38 or other figures may be associated with a network, local area network, personal area network, wide area network or other network. For example, several devices described herein may be provided in a building (e.g., house, office, retail establishment, etc.) and the color of the devices may be controlled (e.g., coordinated, changed over time, etc.) through a central control system (e.g., connected to the network of lighting devices). The central control system may be a computer, PDA, web enabled interface, switch, dial, programmable controller or other network device.

As also discussed earlier, any of the lighting devices discussed in connection with FIGS. 32–38 or other figures may be associated with a sensor or other system that generates a signal. For example, a proximity detector may be provided wherein one or more lighting devices changes color based on one or more signals provided by the detector. In such a system, the lighting device(s) may light to a particular color or produce a color changing effect based on the input from the sensor. In an embodiment, a hallway or other area may have several lighting devices where each of them is associated with a proximity detector. As a person walks down the hallway, the lighting devices activate, change colors or display lighting effects. Once the person has passed the lighting device, it may go back to a default mode an await further activation through the proximity detector.

Figure 39:
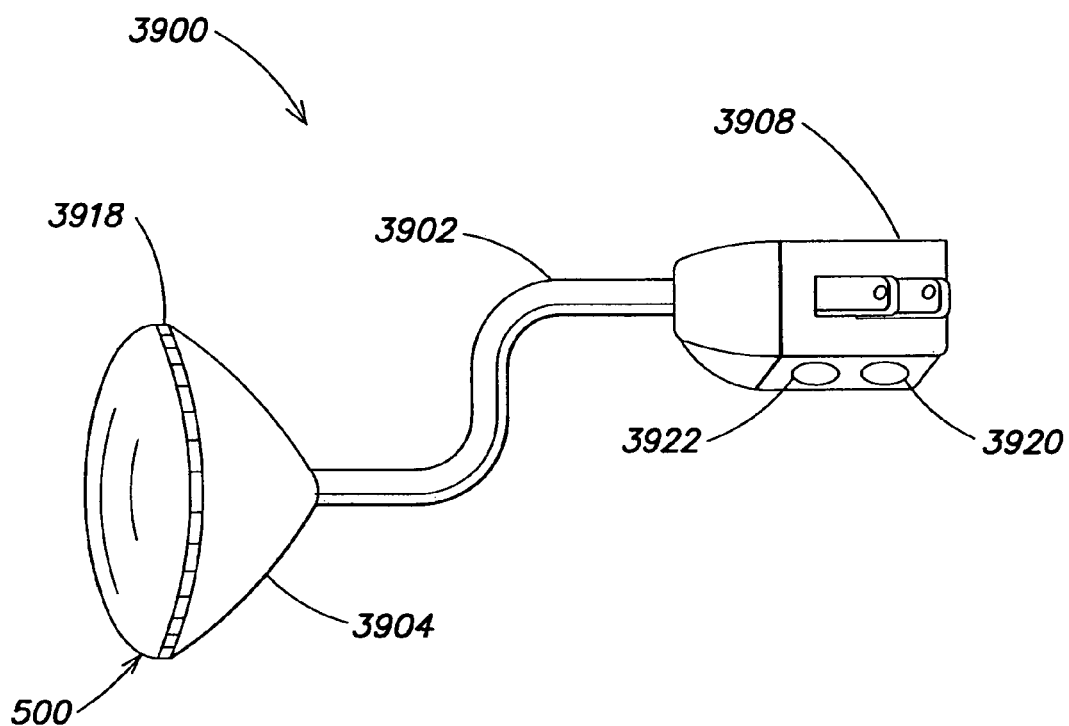
FIG. 39 illustrates an illumination device having a flexible neck according to another embodiment of the invention.

FIG. 39 illustrates another lighting device 3900 according to the principles of the present invention. The lighting device 3900 may include a lighting system 500 as shown for example in FIG. 1. As can be seen from the illustration, the lighting device may include a plug or other adapter 3908 to connect the lighting device to outlet power. In an embodiment, the lighting device may also include an AC/DC power converter to convert the received power to power for the lighting system 500. The lighting device 3900 may include a user interface 3918. In an embodiment, the user interface may be a dial encompassing the perimeter of the housing 3904 or another style of user interface. As with other lighting devices described herein, the lighting device 3900 may also be associated with an optional sensor 3922, network or data port interface 3920 or other element. The lighting device 3900 may also include a flexible neck member 3902 connecting the power adapter 3908 to the housing 3904.

Although the lighting device 3900 is illustrated with an easily removable power adapter, another useful embodiment may not have such an easily removable power adapter. For example, the flexible neck 3902 may be affixed to another device such that it is not intended to be removed. In another embodiment, the adapter 3908 may be designed to fit into another enclosure designed specifically for the application.

Figure 40:
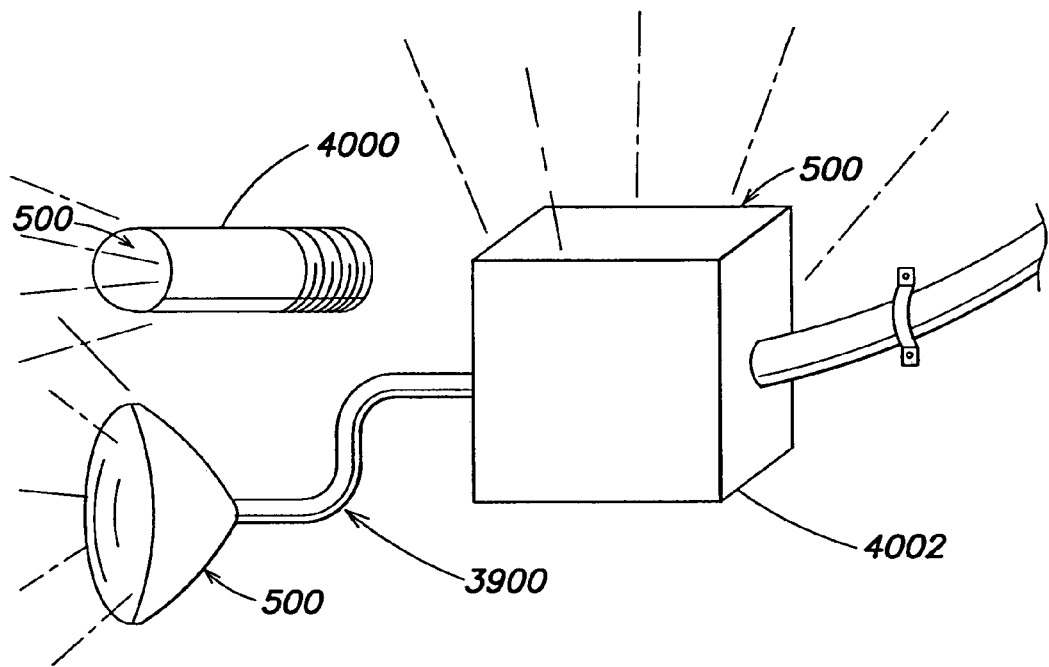
FIG. 40 illustrates a junction box for various illumination devices according to another embodiment of the invention.

For example, FIG. 40 illustrates a junction box 4002 wherein the junction box may include outlets for one or more lighting devices, such as the lighting devices 4000 or 3900 shown in FIG. 39. The box 4002 may be internally lighted itself and or the box may include outlets for various lighting devices. The box 4002 may include any combination of user interfaces, network connections or data outlets, sensors, or other devices or connections to allow the control of the lights in the box or connected to the box.

Figure 41A:
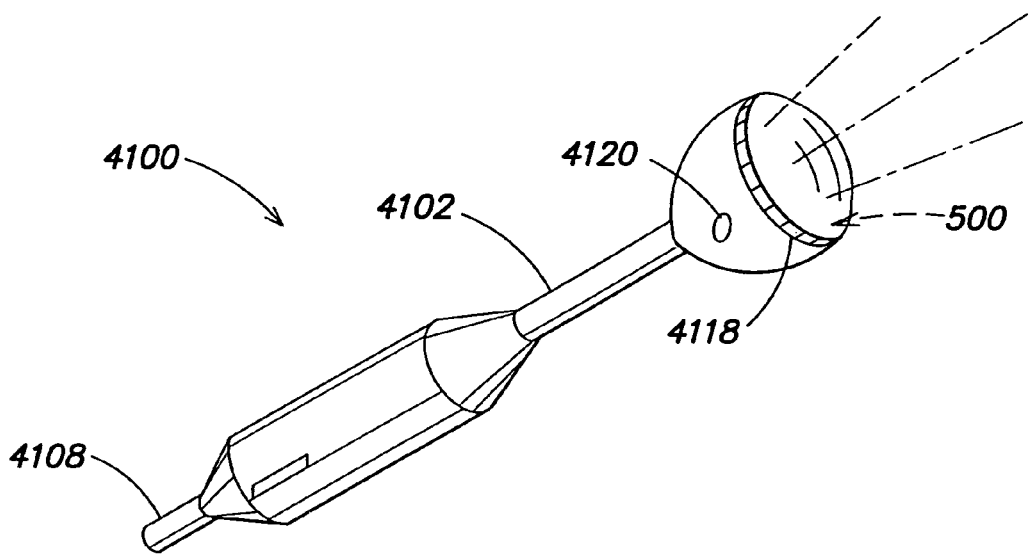
FIGS. 41A, 41B, and 41C illustrate various illumination devices for automotive applications according to other embodiments of the invention.
Figure 41B:
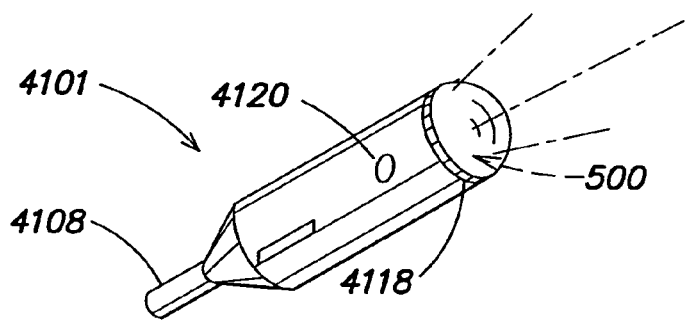
Figure 41C:
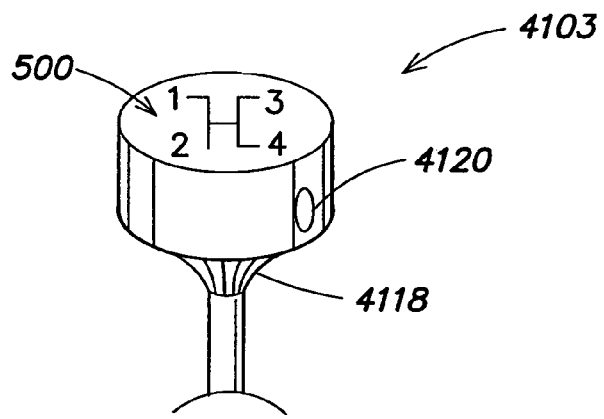

FIGS. 41A, 41B, and 41C illustrate other lighting devices according to the principles of the present invention that may be particularly implemented in vehicle-based (automotive) environments. For example, FIGS. 41A and 41B illustrate lighting devices 4100 and 4101, respectively, that may plug into an automobile power outlet (e.g., a cigarette lighter) through a power adapter 4108. The device 4100 includes a flexible neck 4102, and either of the devices 4100 or 4101 may be equipped with a user interface 4118, one or more sensors 4120, and lighting system 500 as discussed above. The lighting device 4101 is formed as a "plug" for a cigarette lighter, and may illuminate from an end as shown in FIG. 41B, or the entire body of the plug may glow with illumination from the lighting system 500. FIG. 41C illustrates a color changing stick (e.g., a gear shift) that may be internally powered (e.g. battery) or externally powered through the vehicles power supply.

While many of the embodiments described herein are intended for decorative lighting, there are other embodiments where the color of the light projected from the system or device is associated with providing information. The systems described herein may be used to monitor the power, inductive load, power factor, or other parameters for an associated device. The lighting system may change colors to indicate various conditions. For example, the system may indicate power consumption is nearing a critical point by emitting red light or flashing red light. The system may indicate an inductive load is high by emitting blue light.

As also discussed earlier, various lighting devices may also be associated with sensors, networks, or other sources of information wherein the lighting system is arranged to produce a color or pattern of light in response to received information. For example, an audio signal or other signal generators may control the lighting systems such that the lights change in response to the music. The lighting system may also be associated with other networks (e.g. local area network, world wide network, personal network, communication network) wherein the network provides data or a signal and the lighting system responds to the data by changing colors. For example, lighting conditions may change to red when the phone rings and the call is identified as a person you do not want to talk to. The lighting conditions may change green upon receipt of a phone call or email from your spouse or other loved one.

Additionally, while many of the embodiments described herein disclose useful illumination systems and devices, the same systems and devices may be used as communication devices. For example, a lighting device according to the principles of the present invention may be associated with fire sensors, smoke detectors, audio sensors or other sensors to effectuate communication of a condition or information. The information supplied to the lighting device may also come from networks or other signal generators. The lighting device may, for example, flash red when the smoke detector is activated or lighting devices that are in close proximity with exits may turn a particular color or display a light pattern. A detection system may also warn of exits that are not safe because of the proximity of smoke or other dangers. This warning signal may be used to change the lighting pattern being displayed by the lighting devices near the dangerous exits as well as the safe exits.

Yet another lighting device according to the principles of the present invention may include an elongated shaped optic that is lit by one or both ends. The optic may also include a reflective material to reflect the light received from the ends out of the optic. Such a system may provide substantially uniform lighting along the body of the optic, giving the appearance the optic is glowing and or providing substantially uniform illumination from the optic. Such a lighting system may be used for the illumination of cove areas, under, over or in cabinetry, in displays or in other areas where such lighting is found useful. In an embodiment, such a lighting device may include one or more LED-based lighting systems 500 as shown for example in FIG. 1.

Figure 42:
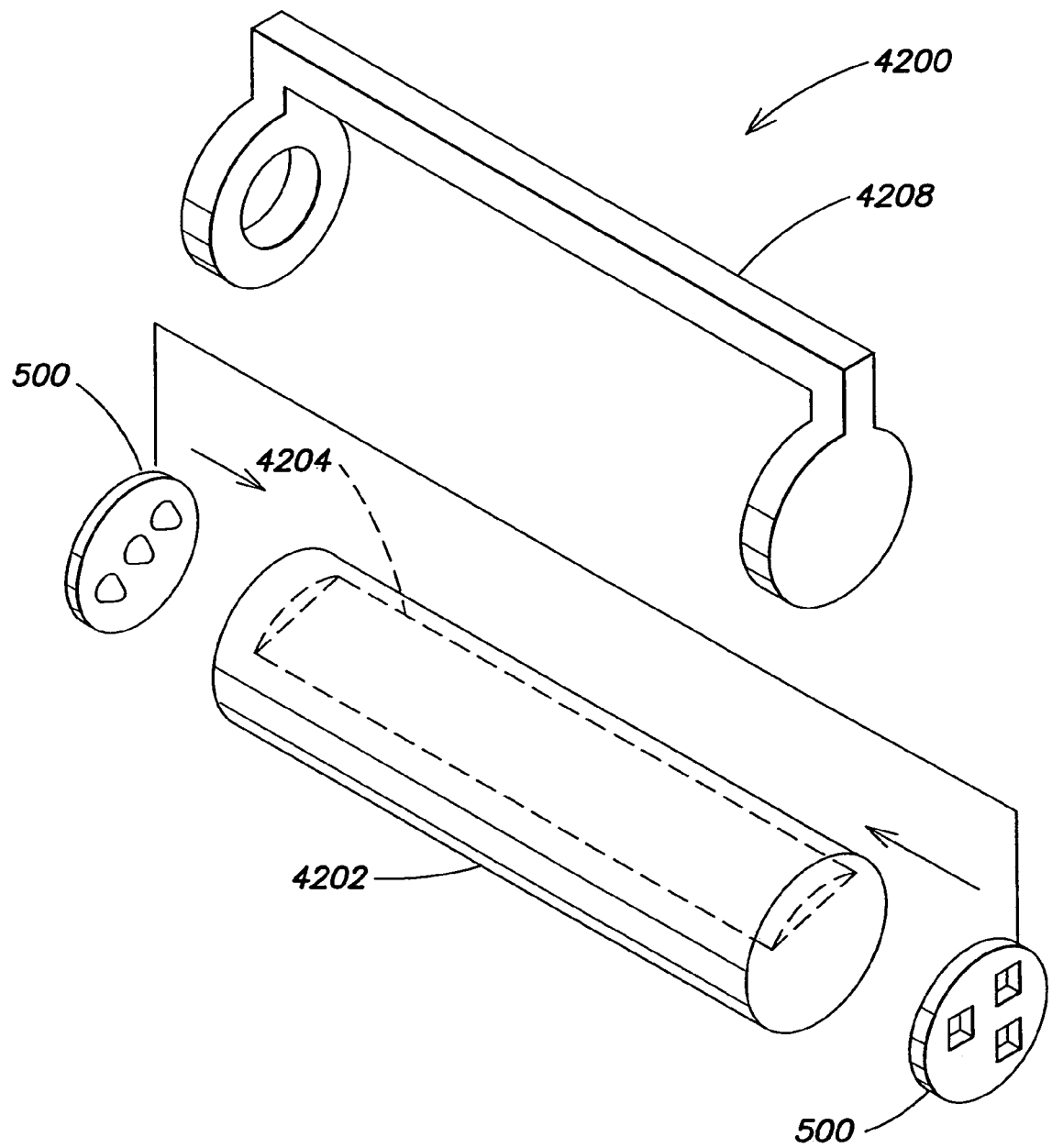
FIG. 42 illustrates a lighting device having an elongated optic element, according to another embodiment of the invention.

FIG. 42 illustrates one example of such a lighting device 4200 according to the principles of the present invention. The lighting device 4200 may include an optic 4202 which may be an elongated optic, tubular optic, light guide, tubular light guide, elongated light guide, or other style of optic. The optic 4202 may be constructed of a transparent material, semitransparent material, translucent material, plastic, glass or other material that allows for the transmission or partial transmission of light. The wavelength of transmitted light is not limited to the visible spectrum and may include ultraviolet, infrared or other wavelengths in the electromagnetic spectrum. In another aspect, the material may be selected to purposefully filter one or more particular wavelengths, including ultraviolet and/or infrared.

The optic 4202 may be associated with another material 4204 designed to reflect at least a portion of the light transmitted through the optic 4202. The material 4204 may be a reflective material, partially reflective material, a strip of material, an opaque material, or other material designed to reflect at least a portion of the light that impinges upon its surface. The material 4204 may be associated with the optic 4202, co-extruded in the optic 4202, embedded in the optic 4202, proximate to the optic 4202, or otherwise arranged such that light may be reflected by the material 4204 through the optic.

The lighting device 4200 may also include one or more LED based illumination devices 500 as discussed, for example, in connection with FIG. 1. In an embodiment, an illumination device 500 may be arranged to project light through an end of an optic 4202. In one aspect of this embodiment, an illumination device may be associated and control two illuminating sections at either end of the optic, with one processor 2 as shown in FIG. 1 controlling both ends. In another embodiment, two individual illumination devices 500 (each with their own processor 2) may be used to project light through opposite ends of the optic 4202. The light from the illumination devices 500 may be projected into the ends of the optic 4202 such that a portion of the light reflects off of the reflective material 4204 and then out of the optic 4202 in a direction away from the reflective material.

In an embodiment, this system may be used to provide substantially uniform illumination from the lighting device 4200.

In an embodiment, the reflective material 4204 may be co-extruded with the optic 4202 such that the reflective material 4204 is embedded in the optic 4202. The reflective material 4204 may have a flat side that is used to reflect the light out of the optic 4202. The reflective material 4204 may also be non-flat. For example, the reflective material may follow the contour of the optic.

Figure 43A:
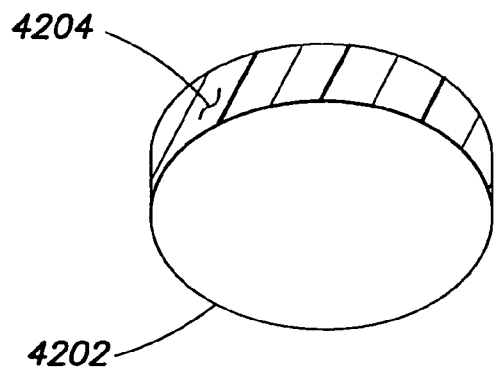
FIGS. 43A, 43B, and 43C illustrate various arrangements of a reflector implemented with the optic element of FIG. 42, according to another embodiment of the invention.
Figure 43B:
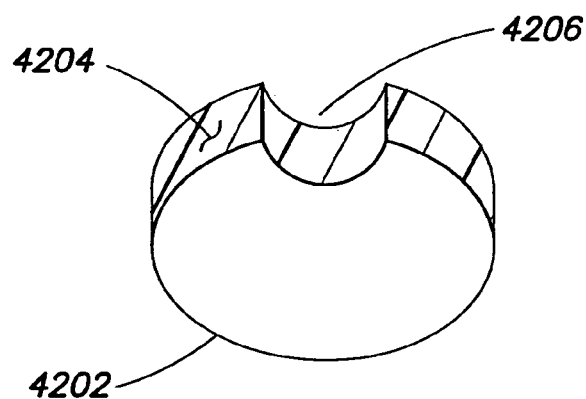
Figure 43C:
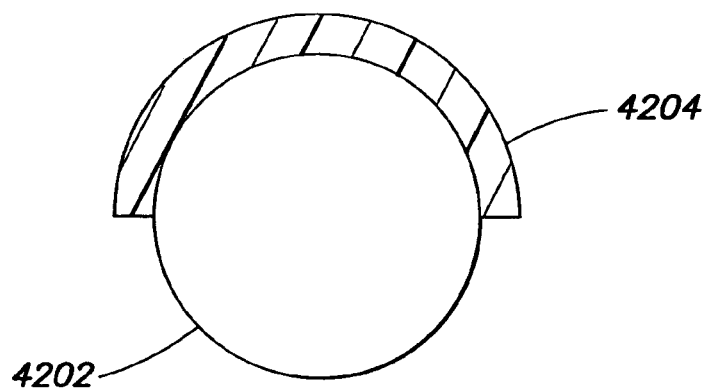

In particular, in an embodiment, the reflective material is arranged on the outer surface of the optic, as illustrated in the cross sectional view of FIG. 43C. FIGS. 43A and 43B also illustrate some other useful reflector designs according to the principles of the present invention. FIG. 43A illustrates a co-extruded reflector 4204 with a curved shape. FIG. 43B illustrates a shaped reflector 4204 with a raceway 4206 to allow the passing of wires or other elements from one end of the optic to the other.

Figure 47:
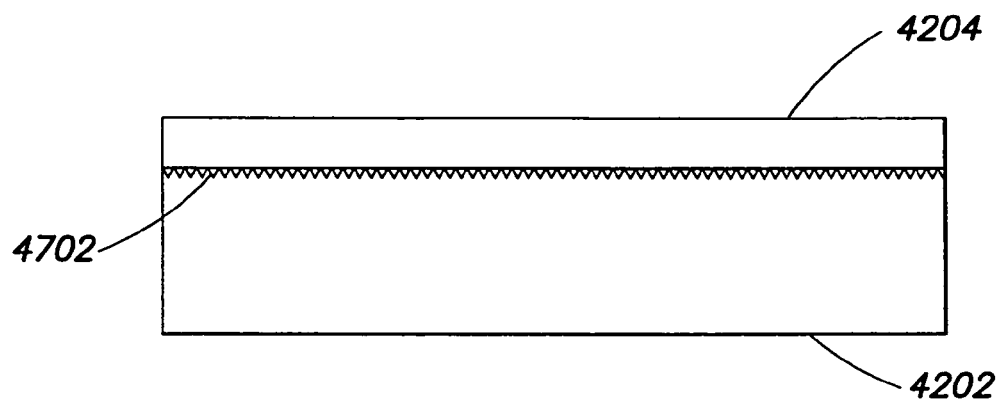
FIG. 47 illustrates one example of a reflector for the optic element of FIG. 42, according to another embodiment of the invention.

The reflector 4204 may also have a rough surface to increase the reflection and the rough surface may not be uniform throughout the surface. For example, the material may increase in roughness further from the ends of the material to increase reflection farther away from the ends as well as reducing the reflection close to the ends. In another embodiment, the optic may have a smooth surface towards the ends of the material and a rough surface towards the center. In another embodiment, the roughness or other surface condition may be applied uniformly. FIG. 47 illustrates one example of a reflective material 4204 with a rough surface 4702 according to the principles of the present invention.

In an embodiment, the reflector 4204 may be a diffuse reflector dispersing the light in many directions. In an embodiment, the surface of the reflector 4204 may contain imperfections or the like that are arranged to reflect the light in a preferred direction or pattern. The imperfections may be arranged to reflect more or less incident light in a particular direction depending on the distance the surface is from the illumination device(s) 500. A pattern of imperfections on the surface of the reflector 4204 may be arranged, for example, such that dispersion is diffuse near the illumination device(s) 500 and directional further from the illumination device(s). The reflector's surface near the illumination device(s) may be very smooth (e.g. specular) to prevent diffuse reflection and otherwise patterned further from the illumination device(s) 500 to increase the diffuse reflection or otherwise increase reflection out of the optic. These uneven patterned surfaces may be arranged to project a relatively uniform pattern of light from the optic 4202. In an embodiment, a reflector 4204 according to the present invention may also have a substantially uniform surface (e.g. diffuse surface).

Figure 44:
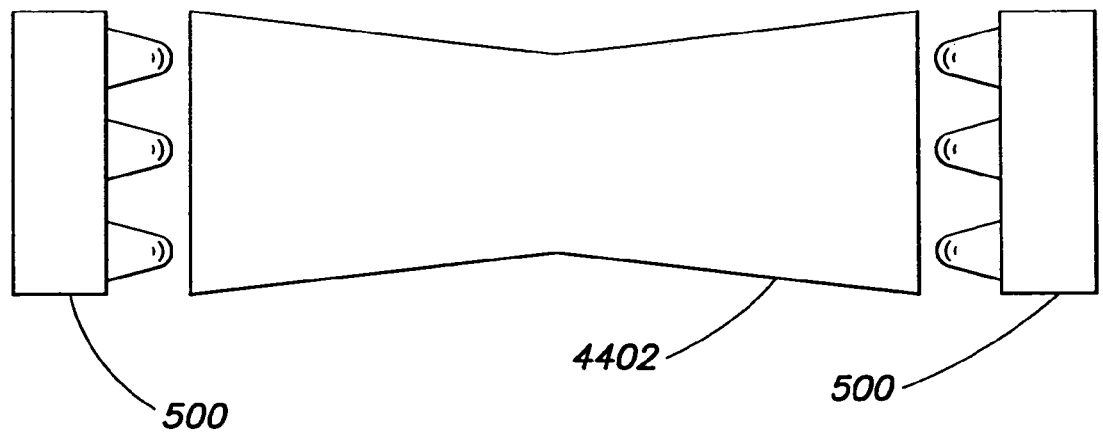
FIG. 44 illustrates one example of a modified shape of the optic element of FIG. 42, according to another embodiment of the invention.
Figure 48:
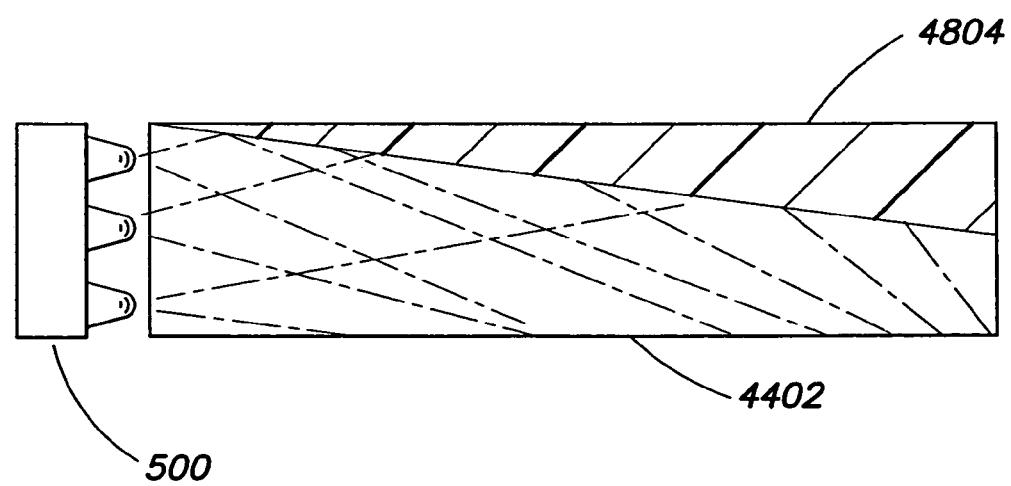
FIG. 48 illustrates one example of a shaped reflector according to another embodiment of the invention.

An optic 4202 or reflector 4204 according to the principles of the present invention may be shaped to optimize the light output. FIG. 44 illustrates such an optic 4402. The optic 4402 may be arranged with shaped sides such that the light will impinge the sides of the optic with greater frequency. Generally, the light projected into a uniformly shaped optic will be more intense at the ends of the optic and slowly reduce in intensity towards the middle of the optic. The tapered optic embodiment illustrated in FIG. 44 allows less light to escape at the ends of the optic and more to escape towards the middle because of the increased reflection. The overall effect is a more uniform distribution of light output throughout the optic. A reflector may likewise be shaped to increase the light reflected from a portion of the reflector. FIG. 48 illustrates a shaped reflector 4804 that complements the shaped optic 4402 shown in FIG. 44, according to one embodiment of the invention.

Figure 45:
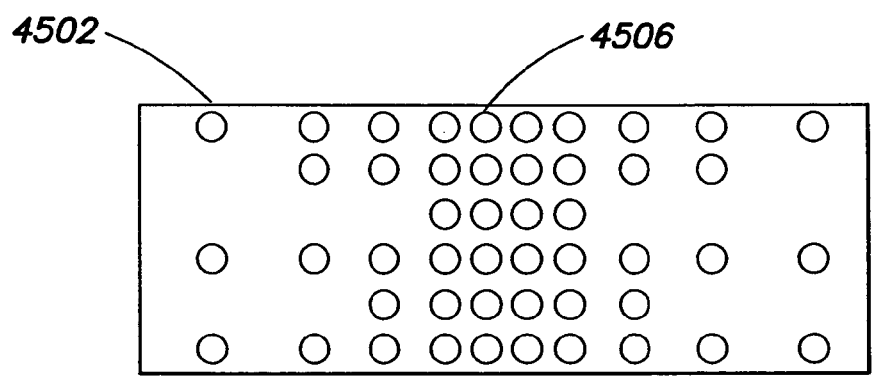
FIG. 45 illustrates an example of non-uniform imperfections implemented with the optic element of FIG. 42, according to another embodiment of the invention.

In an embodiment, the optic may include imperfections, coatings or the like (collectively referred to herein as imperfections) that are not uniformly distributed along its length. For example, FIG. 45 illustrates an optic 4502 with a greater frequency of imperfections 4506 in the middle of the optic as compared to the ends of the optic. The imperfections 4506 may be in the bulk of the optic material 4502 or on or near the surface of the material 4502. In an embodiment, the imperfections 4506 may be marks, bubbles, or other imperfections in or on the material. In an embodiment, the imperfections may be uniformly distributed but they may not be of similar size. For example, the imperfections towards the ends of the optic may be smaller than the ones towards the middle of the optic. In an embodiment, the imperfections may be the result of a coating that is applied to the surface of the optic 4502. For example, 3M manufactures a material that includes imperfections and the size of imperfections in the material increases further away from the ends. The material is referred to as Conformable Lighting Element.

In an embodiment, the illumination devices 500 may be epoxied or otherwise attached to the various types of optics to minimize the loss of light or for other reasons. In an embodiment, the ends of the optic may also be coated with an anti-reflective coating to increase the light transmission efficiency and hence the overall efficiency of the lighting system. In an embodiment, a platform where the LED-based illumination devices are mounted may be made of or coated with a reflective material. The platform may be constructed of standard materials, or the platform may be constructed of materials designed to increase the reflection off of the platforms surface (e.g. a white platform, a platform coated with a reflective material).

Figure 46:
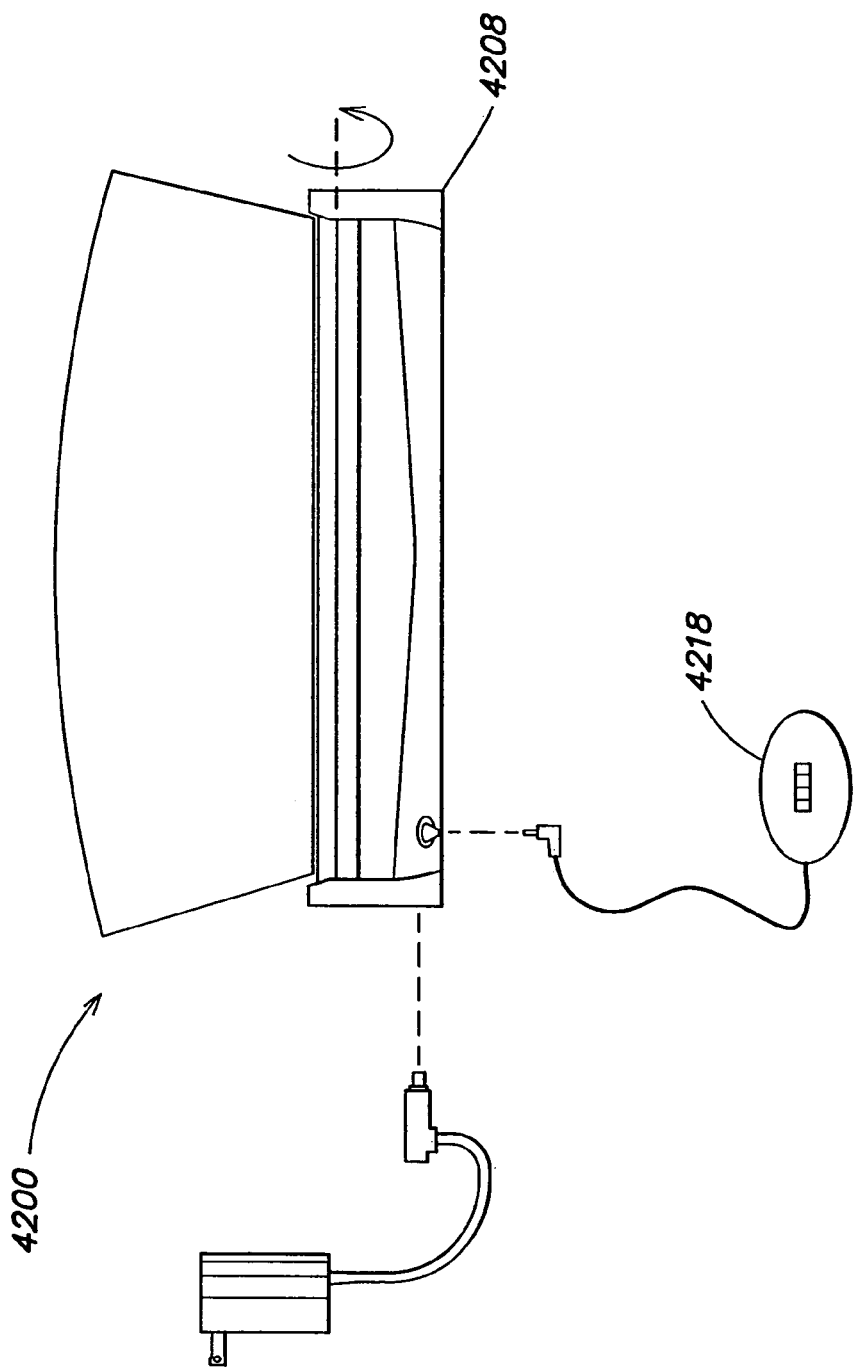
FIG. 46 illustrates an exemplary housing and accessories for the lighting device of FIG. 42, according to another embodiment of the invention.

An lighting device 4200 including an elongated optic according to the present invention may also include a housing 4208, as shown for example in FIG. 42 or 46. The housing may be designed to hold the illumination devices 500 and the optic 4202 along with the reflective material 4204. In an embodiment, as shown in FIG. 46, the housing may be arranged such that the optic can be rotated to direct the light emitted from the optic. In another embodiment, the optic may be arranged in a fixed position in the housing. As also shown in FIG. 46, the lighting device 4200 may be associated with a user interface 4218 and one or more connectors for power and/or data connections.

The lighting device 4200 including an elongated optic as discussed above may have a number of applications. For example, the device may be used to provide illumination in any environment in which flourescent or other tubular shaped lighting elements formerly were used (e.g., various office, warehouse, and home spaces such as under cabinets in a kitchen). In this application, the devices 4200 may be aligned in much the same way as fluorescent systems are mounted. One strip of lighting may comprise a number of individual lighting devices 4200, for example, that may be controlled individually, collectively, or an any subset of groups, according to the various concepts discussed herein (e.g., a networked lighting system). In such a system, a central controller may be provided as a separate device or as an integral part of one of the lighting devices 4200, making a master/slave relationship amongst the group of lighting devices.

Another embodiment of the present invention is directed to a lighting device (e.g., the glow sticks or key chains of FIGS. 3 and 4) that can be pre-programmed to generate light and or lighting patterns, receive light control information in the form of one or more external signals, and/or receive light control information in the form of a downloaded lighting program. In particular, in one aspect of this embodiment, a method of programming such a device according to the principles of the present invention may involve the steps of downloading a lighting program from a programming device (e.g., a computer) to the lighting device, wherein the programming device may communicate with the lighting device through wired or wireless transmission.

For example, in an embodiment, a computer may be connected to a cradle arranged to accept a lighting device. When the lighting device is set in the cradle, electrical contacts of the lighting device may be connected with electrical contacts in the cradle allowing communication from the computer to the lighting device. Lighting programs or instructions may then be downloaded from the computer to the lighting device. In one embodiment, such a downloading system may be useful for providing custom generated lighting shows and/or lighting effects (e.g., "color of the day," "effect of the day," holiday effects, or the like) from a light programming authoring interface or web site, for example.

As discussed above, a lighting device according to the various concepts herein may include a display (e.g., an LCD, LED, plasma, or monitor; see FIGS. 15 and 16), which may indicate various information. In one aspect, such a device with a display may be configured to indicate via the display various status information in connection with downloading lighting control programs or instructions.

Figure 49:
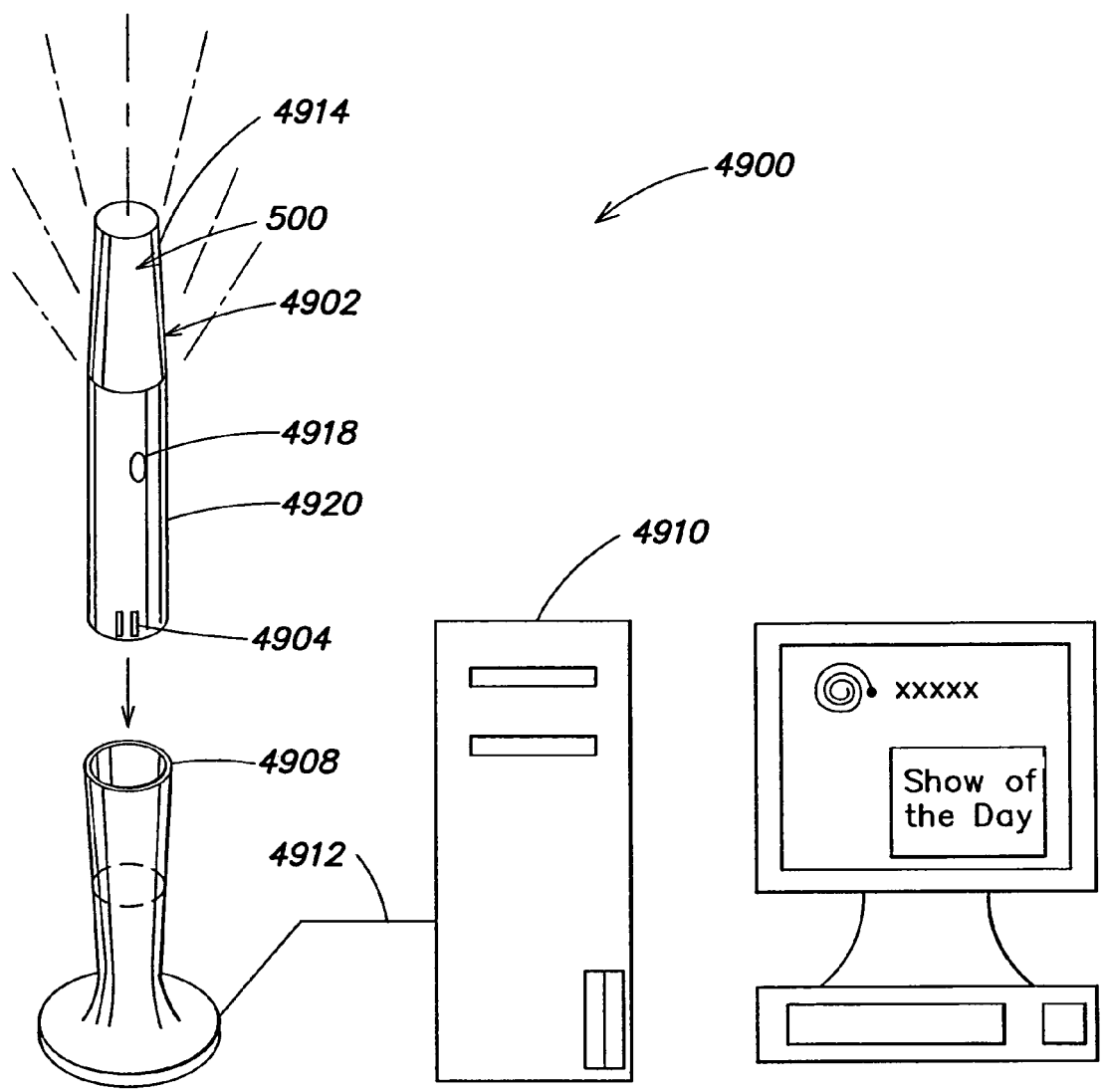
FIG. 49 illustrates a lighting device programming system and method according to one embodiment of the present invention.

FIG. 49 illustrates a downloading system 4900 according to the principles of the present invention. The lighting device 4902 may include an LED-based illumination device 500 as shown in FIG. 1 or as described in other embodiments of this disclosure. The lighting device 4902 may include a housing 4920 where the electronics, including various processors, controllers, and other circuitry, are housed. The lighting device may also include an optic 4914 wherein the illumination device 500 is arranged to illuminate the optic 4914. The optic may be transparent, translucent, or have other properties to allow a portion of the light to be transmitted. In an embodiment, the optic includes imperfections (e.g. a rough surface) to cause the light to be reflected in many directions to provide an optic that appears to glow uniformly when lit with the illumination device 500.

The lighting device 4902 may also include electrical contacts 4904. The electrical contacts 4904 may be electrically associated with the processor 2 and/or the memory 6 of the illumination device 500 (see FIG. 1) such that communication to the processor and/or memory can be accomplished. For example, in an embodiment, the contacts are electrically associated with the memory such that new lighting programs can be downloaded directly to the memory without requiring interaction with the lighting device's processor. In this embodiment, the processor may be idle while a programming device 4910 downloads control program and/or other information to the device 4902. The electrical contacts 4904 may be adapted to make electrical contact with contacts (not shown) in a cradle 4908. The contacts in the cradle in turn may be associated with data line(s) 4912 from the programming device 4910. With such an arrangement, lighting signals, programs, data and the like can be downloaded from the programming device 4910 to the lighting device 4902.

In one aspect, the programming device 4910 maybe a computer connected to a network (e.g., the Internet). A web page may contain various lighting programs that may be downloaded, such as a particular color or color changing effects (e.g., "color of the day," "effect of the day" or "holiday mode" lighting effects). The programming device 4910 may also be used to generate custom lighting shows to be downloaded to the lighting device 4902. For example, the programming device 4910 may include a program to assist a user in creating/generating a new lighting effect, and then the new lighting effect may be transferred to the lighting device 4902. A web site, or other remote platform, may be used to generate the lighting effect as well. A web site may include a section wherein the user can create/generate lighting effects and download them to the programming device 4910, to be in turn transferred to the lighting device (or the lighting effects may be transferred directly from the web site to the lighting device 4902).

While the programming device 4910 is described above as a conventional computer, it should be understood that the present invention encompasses all computing devices capable of performing the functions described herein. For example, the programming device 4910 may be a personal digital assistant (PDA), palm top device, cellular phone, MP3 player, a hand held computing device, a stand-alone computing device, a custom tailored computing device, a desk top computing device, or other computing device.

In particular, in one embodiment, a PDA may be used as the programming device 4910. The PDA may be used to generate/author lighting programs or it may be used to receive lighting programs or otherwise download lighting programs. For example, one user may wish to share a particular lighting effect with another user. The first user may use wired or wireless transmission to transfer the lighting effect from her PDA to a second user's PDA. Then the second user can download the lighting effect to his lighting device 4902.

While many of the embodiments herein describe wired transfer of information from the programming device 4910 to the cradle 4908 and the lighting device 4902, it should be understood that wireless communication or combinations of wired and wireless communications may be used in a system according to the principles of the present invention. For example, the programming device 4910 may transfer information to the cradle 4908 using wireless transmission and the data is transferred to the lighting device 4902 through wired transmission. In another embodiment, the transmission from the cradle 4908, or other device, may be accomplished through wireless transmission. In yet another embodiment, the transfer of information from the programming device 4910 to the lighting device 4902 may be accomplished without the need of the cradle 4908. The information may be transferred directly from the programming device 4910 to the lighting device 4902 through wired or wireless transmission.

A lighting device 4902 according to the principles of the present invention may also include a transmitter or be capable of transmitting information through one or more of the LEDs. In an embodiment, the LED(S) may be arranged to provide both illumination as well as information transmission. The LEDs may also provide information transmission simultaneously with the illumination such that the illumination does not appear to be disrupted to an observer.

In an embodiment, the lighting device is capable of transmitting information and is used to transmit lighting effects, colors, or other information to another lighting device. In an embodiment, transferring lighting effects from device to device is provided through a memory card, memory stick or other portable memory device. Information can be transferred to the portable memory device and then the portable memory device can be transferred to the lighting device 4902.

Although the lighting device 4902 is discussed in the above example as a hand held lighting device, it should be appreciated that other types of lighting devices according to the present invention, including but not limited to other portable or stationary lighting devices, modular lighting devices, table mount lighting devices, wall mount lighting devices, ceiling mount lighting devices, floor mount lighting devices, lighting devices incorporated into other apparatus such as toys or games, etc., may receive programmed lighting control information via the downloading techniques discussed herein.

Another embodiment of the invention is directed generally to LED-based lighting devices (e.g., as shown in FIG. 1) including one or more optical components that provide for broader directionality or spread in the light generated by the device. In one aspect of this embodiment, one or more LEDs generate radiation toward one or more optical components that are adapted to reflect and/or diffuse the radiation. The optical component(s) may be used to redirect the radiation such that the combination of the lighting device together with the optical component(s) projects light with a wider distribution than the original light projected by the device alone. The optical component(s) may also be arranged to direct the light to another direction while maintaining or changing the beam angle of the light. The optical components may also be used to help mix the light from more than one LED (e.g., differently colored LEDs). In one aspect, such optical components may be arranged as full or partial enclosures or housings for one or more LED-based lighting devices.

Figure 50:
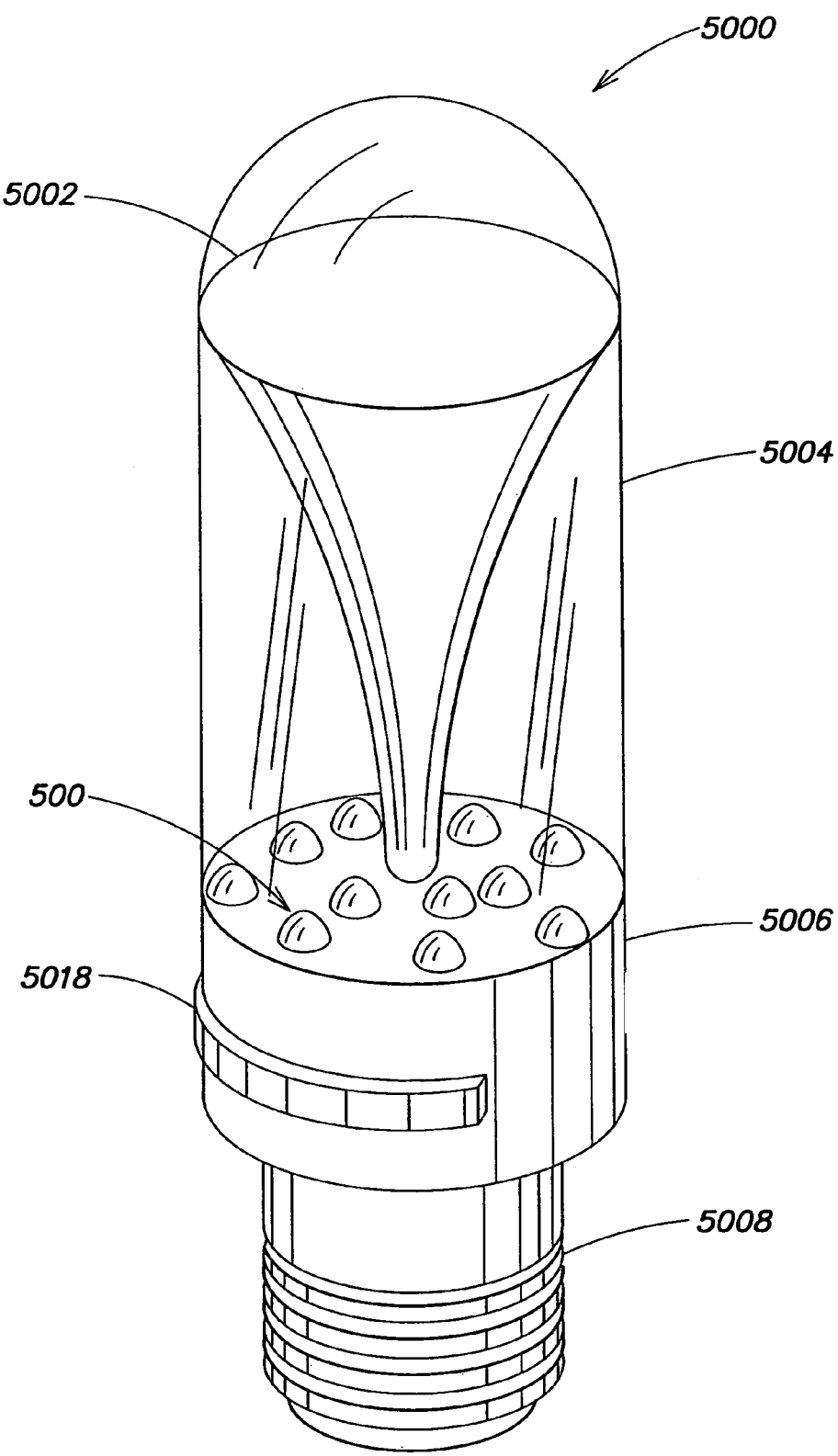
FIG. 50 illustrates a lighting device with an optical element according to another embodiment of the invention.
Figure 51:
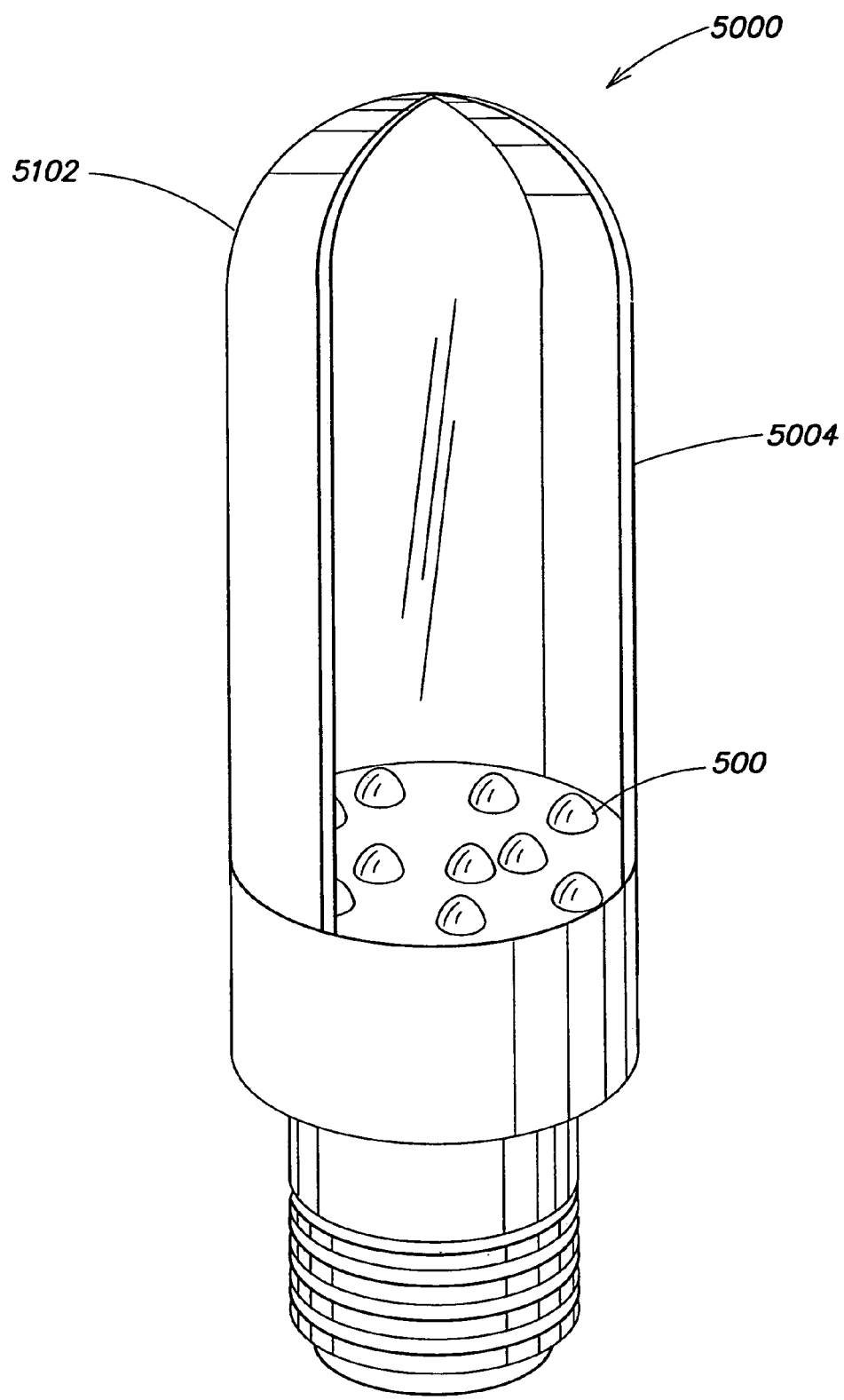
FIG. 51 illustrates an example of a directional reflector as the optical element in the device of FIG. 50, according to one embodiment of the invention.

FIG. 50 illustrates another lighting device 5000 according to the principles of the present invention. The lighting device 5000 may include an illumination device 500 as discussed in connection with FIG. 1, for example. The lighting device 5000 also may include a reflective surface 5002. The reflective surface 5002 may be any number of shapes including, but not limited to, conical, parabolic, curved conical, straight sided conical, or other shape designed to reflect the light impinging on the reflective surface in a different direction. The reflective surface may include a section that is transparent or translucent to allow at least a portion of the light to pass through the surface without being deflected significantly. This may be useful when the desired light distribution pattern involves allowing a portion of the light to be projected in a direction similar to that of the originally-generated light. As illustrated in FIG. 50, the reflective surface may be arranged with a narrow end towards the LEDs of the illumination device 500 and a wider end away from the LEDs. This may be useful when the reflective surface is symmetrical, as in the case of a conical reflector, for example, for reflecting light in many directions. Other reflector designs may be adapted to direct the light in a particular direction or with a maximum light in a particular direction. One example of a directional reflector 5102 according to the present invention is illustrated in FIG. 51.

As shown in FIG. 50, the lighting device 5000 may also include a housing 5006. The housing 5006 may house the illumination device 500, including various electronics to drive the illumination device (as discussed for example in connection with FIG. 1) and optionally include a user interface 5018 according to the various concepts discussed herein. The LEDs of the illumination device 500 may be arranged on or in the housing such that the light emitted from the LEDs is projected from the housing. The housing may also be adapted with a power adapter 5008. The power adapter 5008 may be an Edison style screw base, spade adapter, bin-pin adapter, wedge based adapter or any other style of power adapter to adapt the lighting device 5000 to a power system. The power adapter 5008 may also be associated with an AC to DC power converter, AC power transformer, DC power supply or other system to convert received power to power levels used by the electronics and or the LEDs of the lighting device 5000. In an embodiment, the lighting device 5000 may include a power adapter 208 to connect the lighting device 5000 to a power source such as that found on a bicycle or other system for generating power (e.g. solar, generation through the Seebeck effect, wind, etc.).

The lighting device 5000 may also be provided with an enclosure 5004. The enclosure 5004 may be provided to protect the illumination device 500 and the reflector 5002 and/or to provide a mechanical means for holding the reflector 5002. In one aspect, the enclosure 5004 and reflector 5002 may be one integrated assembly. The enclosure 5004 may be transparent or translucent such that at least a portion of the light emitted from the illumination device 500 is transmitted through the enclosure 5004. For example, the enclosure may be made of clear plastic.

Figure 52:
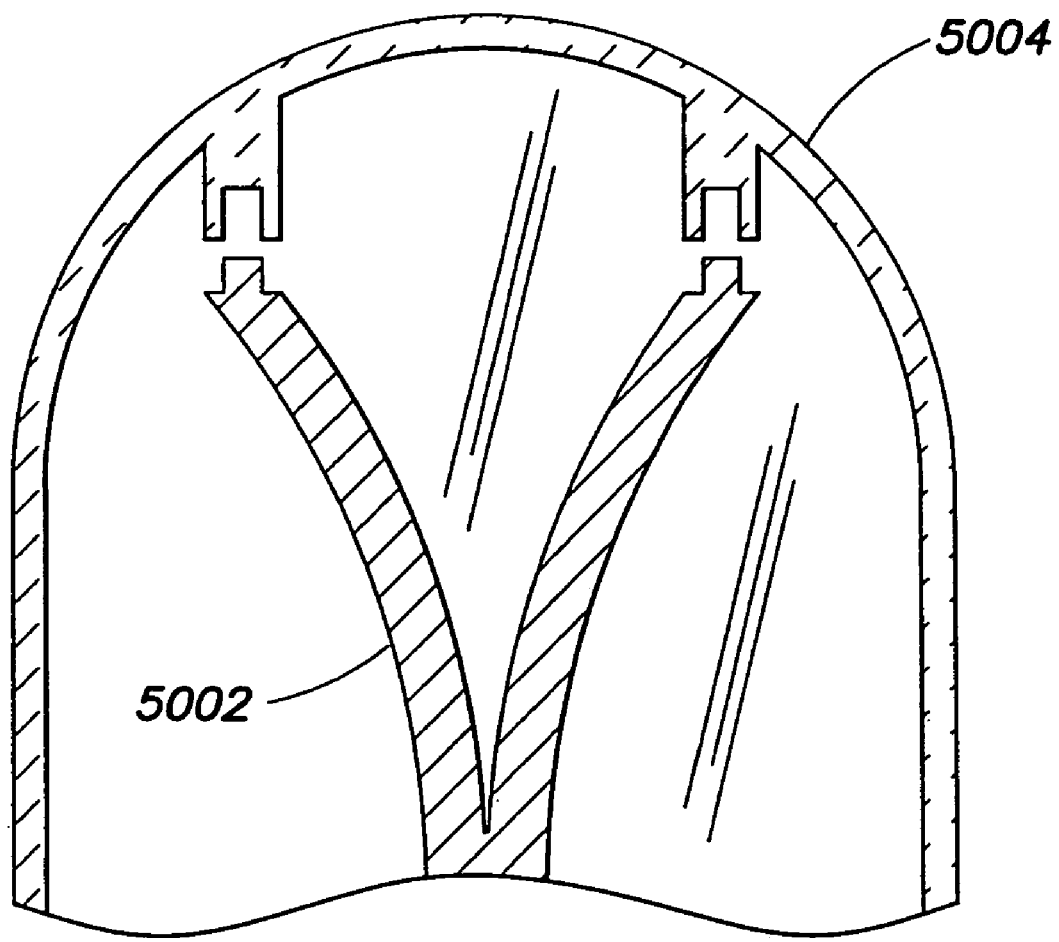
FIG. 52 illustrates a mechanical coupling of an optical element and an enclosure of the device of FIG. 50, according to one embodiment of the invention.

FIG. 52 illustrates a mechanical attachment between the reflective surface 5002 and the enclosure 5004 of the lighting device 5000 according to one embodiment of the invention. The two pieces of material used for the reflector and enclosure may be adapted to mechanically attach to provide a means for hanging the reflector in the lighting device 5000. The enclosure 5004 may also have mechanical attachment points at the opposite end of the enclosure 5004 adapted to attach to the housing 5006.

Figure 53:
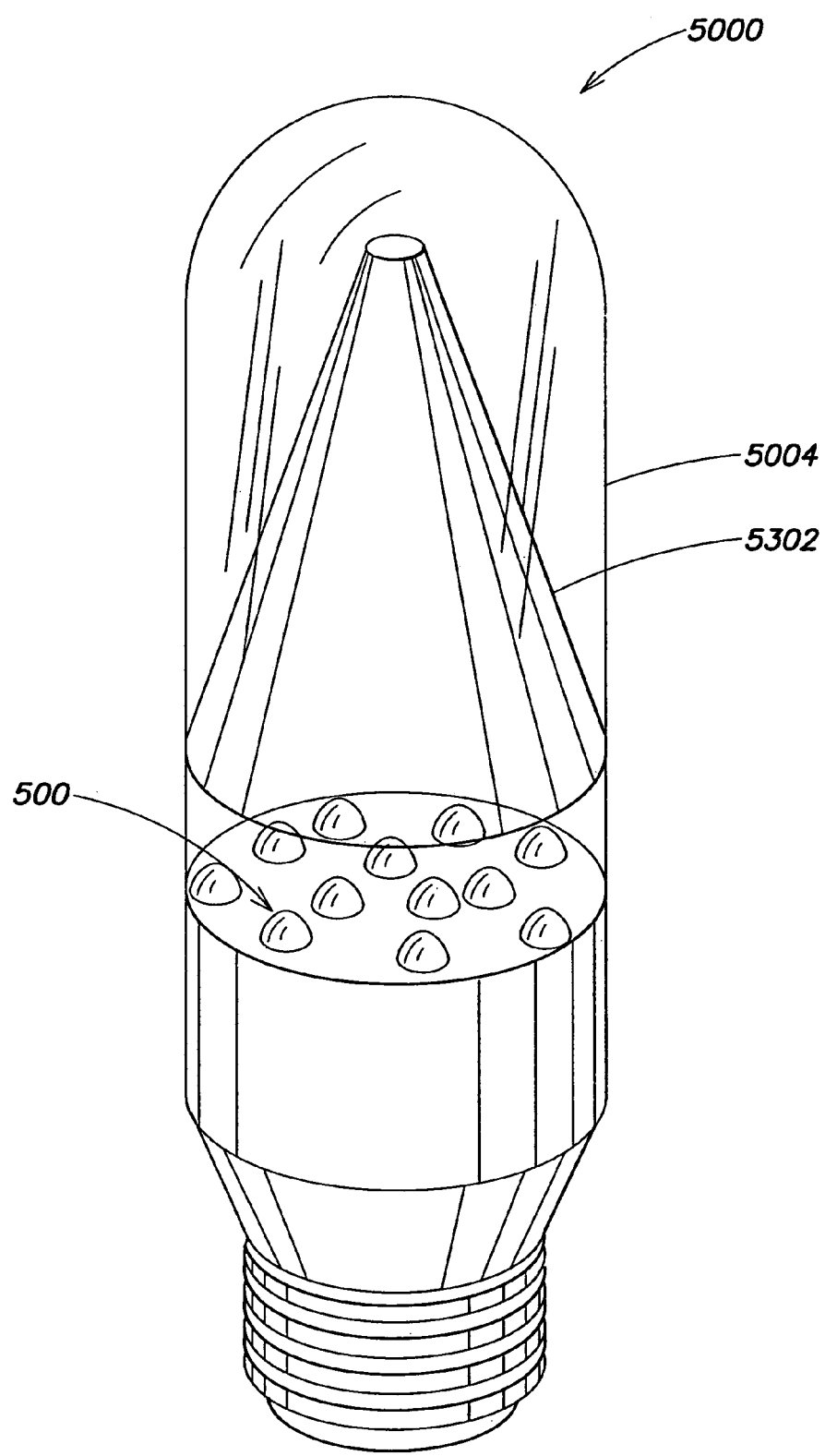
FIG. 53 illustrates a lighting device with an diffusing optical element according to another embodiment of the invention.

FIG. 53 illustrates that the lighting device 5000 may be provided alternatively or additionally with a diffusive surface 5302. The diffusive surface 5302 may be arranged to diffuse the light received from the illumination device 500. The material of the diffusive surface may be transparent or translucent such that at least a portion of the light passes through the material. The material may be adapted to diffuse light at one or more of the surfaces of the material or in the bulk of the material. There are many known diffusing materials with such properties. For example, the diffusing surface 5302 may be made of plastic material with a roughened surface or a surface or bulk that includes imperfections to redirect the light.

In an embodiment, the shape of the diffusing surface 5302 may be conical, tampered, or otherwise shaped. The diffusing surface 5302 may be three dimensionally shaped with straight or curved sides to optimize the desired lighting effect. For example, the diffusing surface 5302 may be conically shaped, or shaped as a pyramid or other three-dimensional shape, such that more light from the center of the light beam is captured towards the top of the diffusing surface. The light from the LEDs generally becomes less intense farther from the source due to the beam angle of the light. As the intensity diminishes, the surface is moved closer to the center of the beam to capture more light. This arrangement can provide a surface with substantially uniform light distribution. The surface itself may appear to be substantially uniformly illuminated and or the area around the surface may appear to be substantially uniformly illuminated.

In an embodiment, the LEDs of the illumination device 500 may be provided with varying beam angles, on a shaped platform, or the LEDs may be directed in various directions. The light from the LEDs may be projected through a diffusing surface or onto a reflective surface to attain the desired lighting effect. For example, the lighting system may be provided with a cylindrical diffusing surface and LEDs with differing beam angles may be provided on a platform. The varying beam angles may sum and provide substantially uniform illumination of the surface or from the surface. In an embodiment, the LEDs may be provided in several directions or on a shaped platform to provide a desired lighting effect.

Figure 54:
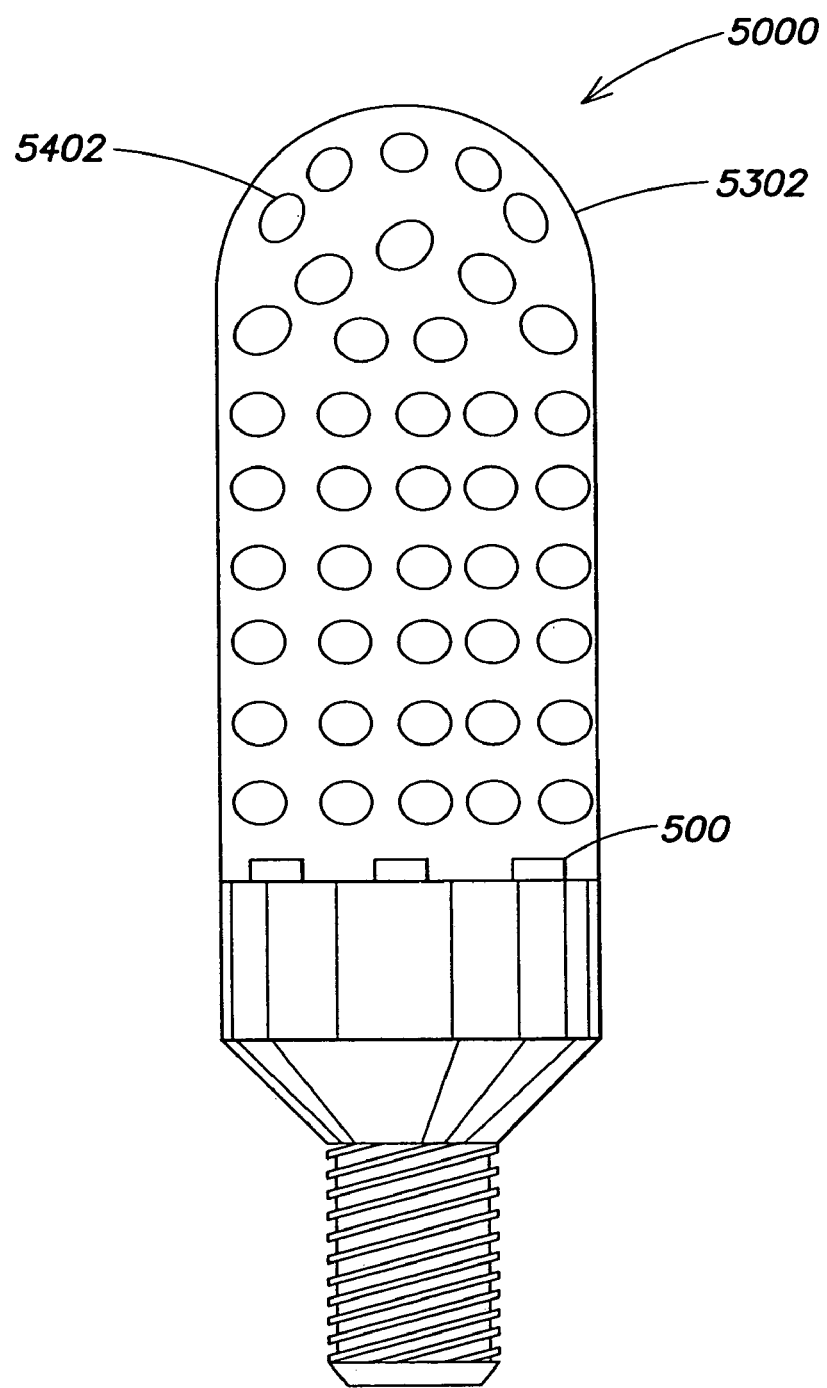
FIG. 54 illustrates one example of the diffusing optical element of FIG. 53, according to one embodiment of the invention.

FIG. 54 illustrates another embodiment of the present invention. The diffusing surface 5302 in this embodiment includes imperfections 5402 in the bulk or on the surface of the material. The imperfections may be arranged such that they get larger and or more frequent with distance from the illumination device 500. This arrangement may be used to generate substantially uniform illumination from the lighting device 5000. The imperfections may be bubbles in the material, for example, or the imperfections may form a pattern on the surface of the material. A pattern on the surface of the material may include areas where not much light is able to pass through and other areas where the light is allowed to pass with higher transmission. The relative ratio of transmitting area to non-transmitting area may change as a function of the distance from the illumination device 5000. For example, the transmitting area may increase as the distance from the LEDs increases. This arrangement may provide substantially uniform illumination from the lighting device 5000. The areas where light transmission is low may include areas of high reflectivity to maximize the overall lighting efficacy. Materials to obtain such lighting effects are available from 3M Corporation, for example, and are referred to as Conformable Lighting Element.

Another embodiment of the present invention is directed to lighting apparatus and methods for insect control. Insects are, by far, the most numerous of species on the planet and, as a result, also exhibit an extraordinary diversity of visual systems including wide variations in visual acuity, sensitivity, motion detection and more. Typically vertebrates, including humans, have much higher resolution vision, but insects exhibit extraordinary capabilities in other areas such as temporal resolution. While humans may perceive thirty images per second as continuous movement, the temporal resolution for many insects is as high as two hundred images/second. Additionally, their ability to sense movement is far better than that of other animals. Some insects can detect polarized light which is used for navigating in large open areas.

Insects are known to respond to certain wavelengths of electromagnetic radiation or light. As compared to humans, most insects have only two types of visual pigments and respond to wavelengths associated with those pigments. One pigment absorbs green and yellow light (550 nm) and the other absorbs blue and ultraviolet light (<480 nm). Thus, insects cannot see red and have limited color vision and, unlike humans, can see into the ultraviolet. However some insects such as honeybees and butterflies have true trichromatic vision systems and a good ability to discriminate and see color.

Many nocturnal insects are attracted to certain forms of electromagnetic radiation or light and this is termed positive phototaxis. As a comparison, cockroaches are negatively phototactic and run from light. The UV-A range is known to be the most attractive to insects, especially nocturnal species. These species, especially mosquitoes, are often the focus of insect eradication efforts.

Conventional "bug lights" typically include yellow incandescent lights that do not repel bugs but simply attract them less, as compared to a normal white incandescent light bulb. Light traps, used widely in food processing applications, employ fluorescent-style UV sources to attract and then electrocute insects via charged plates or grids, and then collect the fried insect parts into a pan or other container.

In view of the foregoing, one embodiment of the invention is directed to methods and apparatus for insect control. For example, in one embodiment, a plurality of illumination units, each equipped with a light facility, are controlled by a processor or processors, wherein the illumination units are disposed about an area in which control of insects is desired. By disposing the illumination units about the area, it is possible to illuminate certain portions of the area with insect-attractive illumination and other areas with insect-repellant illumination. Thus, for example, the illumination units can illuminate the area about a door with light that is not as attractive to insects as illumination units that illuminate an area away from the door. The combination of attractive and repellent units can thus guide bugs into a desired location and away from an undesired location.

In another embodiment, an insect control device or system according to the present invention need not require a processor. In particular, a fixed control signal can be supplied to illumination units to provide a particular sequence of intensity change, flicker, or wavelength control without requiring a processor. In one aspect, a simple memory chip to store the sequence can be triggered in a manner similar to that employed in the circuit used in a 'singing card', whereby a small piece of memory is used to store and playback a sequence.

The insect control system can be dynamic; that is, because each illumination unit may be addressably controlled and networked, the illumination from that unit can be changed as desired by the user, instantaneously. Thus, at one time insects may be directed away from a given area, while at others they may be directed to that area, depending on what area the user wishes to use (e.g., a back porch that is in use only some of the time). Use of the 'flicker effect' can contribute to attraction or repulsion of the insects by using a flicker rate that is known to affect insect behavior.

In another embodiment, an insect control system of the present invention may be equipped with an insecticide, insect repellant, citronella candle, electric bug killer, carbon dioxide generating capture system or similar facility for killing, repelling, or disabling bugs. Thus, the insect control system can use illumination to direct insects to such a facility, increasing the effectiveness of such a facility without requiring, for example, widespread application of an insecticide which otherwise could have detrimental effects on non-insects including pets, children, birds and other small animals.

In embodiments, illumination may be designed to attract favorable insects (or other creatures, such as bats) that control other insects. Thus, if a preferred wavelength is known to attract the preying mantis, it may be displayed to attract that species in order to control other species. This can be a function of the visual system of that particular insect family and designed expressly to make it respond to the illumination and chemical system.

Like other devices discussed herein, an insect control system of the present invention may be equipped with other facilities, such as a communications facility for receiving data from an external source. The external source might be a user interface (allowing the user to turn the illumination system on or off, or to select particular configurations of illumination, perhaps through a graphical user interface on a wall mount or handheld device or a computer screen that shows the individual lights in a geometric configuration), or it might be an external device, such as a computer or sensor. If equipped with a sensor, the device may sense an environmental condition, such as temperature, humidity, presence of insects, light level, presence of carbon dioxide (known to attract may species of mosquito), or the like. Thus, the sensor may indicate an environmental condition that is favorable to insect activity, then activate, or control the mode of illumination operation of, the illumination system. Thus, the insect control system can activate when the light levels are low and humidity is high, thus directing insects away from areas likely to be used by humans and toward areas that have insect-control facilities, such as insecticides.

In yet another embodiment of the present invention, an illumination system is disposed in combination with a scent-producing facility. Together with a processor or processors, this combination allows simultaneous or coordinated production of controlled scent and illumination. In embodiments, the scent/illumination device can be employed in conjunction with a network. In embodiments, the device may be provided with addressable control facilities. In embodiments, the devices can be employed using data delivery protocols such as DMX and power protocols such as pulse width modulation. In embodiments, the devices may be equipped with a communications facility, such as a transmitter, receiver, transceiver, wireless communications facility, wire, cable, or connector. Thus, the device can store, manipulate and otherwise handle data, including instructions that facilitate controlled illumination or controlled scent, or both. The device may also, in embodiments, receive control signals from another source, such as a user interface, an external computer, a sensor, or the like.

A wide variety of illumination and display effects can be employed in connection with the scent producing facility, ranging from color washes, to rainbow effects, to rapid changes in color, and the like. The scents can also be controlled whereby different chemicals are triggered to respond to an input signal (e.g. Digiscents Inc. multi-scent devices) and a 'smell wash' or smell sequence synchronous with a color wash or color sequence can be activated.

In other embodiments, the illumination can reflect a sensed condition, such as a condition sensed in the environment of the scent-producing facility. In other embodiments, the illumination can reflect a condition of the scent-producing facility, such as remaining life of the device, the remaining amount of scent-producing materials or chemicals, the quality of the scent, the strength of scent, battery life, or the like.

The scent-producing facility may be an air freshener or other scent-producing facility that may optionally plug into a room outlet. In embodiments, the scent may be varied in response to data received by the device, as controlled by a processor that also controls the illumination.

The scent-producing facility can be programmed to produce scents in concert with the illumination; thus, a scent may be correlated with illumination that reflects a similar aesthetic condition, emotional state, environmental condition, data item, or other object or characteristic. For example, a pine scent could be coupled with green illumination, while a pumpkin scent could be coupled with orange illumination. Thus, a wide range of correlated colors and scents can be provided in a device where one or more processors controls both scent and illumination.

In an embodiment, the device is a combined air freshener and color-changing night-light, with a processor for control of the illumination condition of the night light, and with LEDs providing the source of illumination for the night light.

In an embodiment, a gel may be presented and a color changing illumination system may be directed to illuminate the gel. For example, there are many fragrances, deodorants, and the like that are made into gels. This gel can be made into most any shape and an illumination system may be used to project light through the gel. In an embodiment, the gel may appear to be glowing in colors.

In an embodiment, the gel or other material may evapaorate over time and as the material evaporates, the light levels captured by the material may diminish. This will result in the light levels decreasing as the material evaporates giving an indication of material life. In an embodiment, the light may actually appear when the evaporation, or other process, has removed a portion of the material.

In an embodiment, the illumination may be associated with a sensor. Such a sensor may measure or indicate germ, bacteria or other contamination levels and cause an illumination system to emit certain lighting conditions. An embodiment may be a color changing "germ alert sensors" that would hang in the toilet or trashcan, etc. Example: as your tidy bowl reached the terrifying point of not flooding the sewer lines with chlorine at every flush, your tiny tricolor LED would pulse RED hues to alert you.

While the invention has been disclosed in connection with a number of embodiments shown and described in detail, various modifications and improvements should be readily apparent to those skilled in the art.

The invention claimed is:

1. A method, comprising:
generating first radiation having a first spectrum representing a first color temperature from a first plurality of first white LEDs;
generating second radiation having a second spectrum different than the first spectrum from a second plurality of second LEDs;
passing at least some of the first radiation and at least some of the second radiation, when generated, though an elongated optic to provide visible radiation to an observer; and
controlling a resulting color or a resulting color temperature of the visible radiation as perceived by the observer.

2. An apparatus, comprising:
a first plurality of first white LEDs configured to generate first radiation having a first spectrum representing a first color temperature;
a second plurality of second LEDs configured to generate second radiation having a second spectrum different than the first spectrum;
an elongated optic arranged with respect to the first plurality of first white LEDs and the second plurality of second LEDs such that at least some of the first radiation and at least some of the second radiation, when generated, pass through the elongated optic to provide visible radiation to an observer; and
at least one controller coupled to the first plurality of first white LEDs and the second plurality of second LEDs, and configured to control a resulting color or a resulting color temperature of the visible radiation as perceived by the observer.

3. The apparatus of claim 2, wherein the first plurality of first white LEDs and the second plurality of second LEDs are disposed collectively in a substantially linear arrangement.

4. The apparatus of claim 2, wherein at least some of the first plurality of first white LEDs and at least some of the second plurality of second LEDs are arranged at one end of the elongated optic.

5. The apparatus of claim 4, wherein at least some of the first plurality of first white LEDs and at least some of the second plurality of second LEDs are arranged at both ends of the elongated optic.

6. The apparatus of claim 2, wherein the at least one controller is configured to selectively control the first plurality of the first white LEDs and the second plurality of the second LEDs such that the visible radiation is perceived as a single, substantially uniform color or color temperature.

7. The apparatus of claim 6, wherein the at least one controller is configured to selectively control the first plurality of the first white LEDs and the second plurality of the second LEDs such that the visible radiation is perceived as essentially white light.

8. The apparatus of claim 2, wherein the at least one controller is configured to selectively control the first plurality of the first white LEDs and the second plurality of the second LEDs such that the visible radiation emanating from different portions of the elongated optic is perceived as different colors or different color temperatures.

9. The apparatus of claim 2, wherein the at least one controller is configured to selectively control the first plurality of the first white LEDs and the second plurality of the second LEDs such that the visible radiation is perceived as at least one dynamic lighting effect.

10. The apparatus of claim 2, wherein the elongated optic is formed from a semitransparent or translucent material.

11. The apparatus of claim 2, wherein the elongated optic is configured such that the visible light is perceived as substantially uniform along the elongated optic.

12. The apparatus of claim 2, wherein the elongated optic includes a reflective material embedded in the elongated optic.

13. The apparatus of claim 2, wherein the elongated optic has a tapered shape.

14. The apparatus of claim 2, wherein the at least one controller is configured as an addressable controller to receive at least one control signal from a network.

15. The apparatus of claim 2, wherein the second plurality of second LEDs includes a second plurality of second white LEDs.

16. The apparatus of claim 15, wherein the first plurality of first white LEDs and the second plurality of second white LEDs are disposed collectively in a substantially linear arrangement.

17. The apparatus of claim 2, wherein the at least one controller includes at least one microprocessor.

18. A system comprising at least two apparatus according to claim 14 coupled to the network.

19. The system of claim 18, wherein each of the at least two apparatus includes a microprocessor.

20. An apparatus, comprising:
a first plurality of first white LEDs configured to generate first radiation having a first spectrum;
a second plurality of second LEDs configured to generate second radiation having a second spectrum different than the first spectrum;
an elongated optic arranged with respect to the first plurality of first LEDs and the second plurality of second LEDs such that at least some of the first radiation and at least some of the second radiation, when generated, passes through the elongated optic to provide visible radiation to an observer; and
at least one controller including at least one microprocessor coupled to the first plurality of first LEDs and the second plurality of second LEDs, the at least one controller configured to control a resulting color or a resulting color temperature of the visible radiation as perceived by the observer.

21. The apparatus of claim 20, wherein the elongated optic has a tapered shape.

22. The apparatus of claim 20, wherein the at least one controller is configured as an addressable controller to receive at least one control signal from a network.

23. A system comprising at least two apparatus according to claim 22 coupled to the network.

24. The apparatus of claim 20, wherein the elongated optic includes a reflective material embedded in the elongated optic.

25. The apparatus of claim 20, wherein the first plurality of first LEDs and the second plurality of second LEDs are disposed collectively in a substantially linear arrangement.

26. The apparatus of claim 20, wherein at least some of the first plurality of first LEDs and at least some of the second plurality of second LEDs are arranged at one end of the elongated optic.

27. The apparatus of claim 20, wherein at least some of the first plurality of first LEDs and at least some of the second plurality of second LEDs are arranged at both ends of the elongated optic.

28. The apparatus of claim 20, wherein the at least one controller is configured to selectively control the first plurality of the first LEDs and the second plurality of the second LEDs such that the visible radiation is perceived as a single, substantially uniform color or color temperature.

29. The apparatus of claim 28, wherein the at least one controller is configured to selectively control the first plurality of the first LEDs and the second plurality of the second LEDs such that the visible radiation is perceived as essentially white light.

30. The apparatus of claim 20, wherein the at least one controller is configured to selectively control the first plurality of the first LEDs and the second plurality of the second LEDs such that the visible radiation emanating from different portions of the elongated optic is perceived as different colors or different color temperatures.

31. The apparatus of claim 20, wherein the at least one controller is configured to selectively control the first plurality of the first LEDs and the second plurality of the second LEDs such that the visible radiation is perceived as at least one dynamic lighting effect.

32. The apparatus of claim 20, wherein the elongated optic is formed from a semitransparent or translucent material.

33. The apparatus of claim 20, wherein the elongated optic is configured such that the visible light is perceived as substantially uniform along the elongated optic.

* * * * *

UNITED STATES PATENT AND TRADEMARK OFFICE
CERTIFICATE OF CORRECTION

PATENT NO. : 7,161,313 B2
APPLICATION NO. : 11/106381
DATED : January 9, 2007
INVENTOR(S) : Colin Piepgras et al.

It is certified that error appears in the above-identified patent and that said Letters Patent is hereby corrected as shown below:

On the title page, item (56) References Cited, U.S. Patent Documents:

"2,769,897 A  11/1956  Rzeszuiko" should read -- 2,769,897 A  11/1956  Rzeszutko --.

On the title page, item (60) insert:

-- Provisional application No. 60/341,898, filed on Dec. 19, 2001, provisional application No. 60/068,792, filed Dec. 24, 1997, provisional application No. 60/078,861, filed Mar. 20, 1998, provisional application No. 60/079,285, filed Mar 25, 1998, provisional application No. 60/090,920, filed Jun. 26, 1998 --.

On page 2, Item [56] References Cited, U.S. Patent Documents:

"2005/0122292 A1  6/2005  Schritz" should read -- 2005/0122292 A1  6/2005  Schmitz --.

On page 2, Item [56] References Cited, Other Publications:

"U.S. Appl. No. 10/705,543" should read -- U.S. Appl. No. 10/705,643 --.

On page 3, Item [56] References Cited, Other Publications:

"Color Kinetics v. Super Vision International, Inc., "Super Vision International, Inc's Notice of Filing Declaration of Brett Kingstone Part X," United States District Court, District of Massachusetts, Case No. 02 CV 11137 MEL" should read -- Color Kinetics v. Super Vision International, Inc., "Super Vision International, Inc's Notice of Filing Declaration of Brett Kingstone Part X," United States District Court, District of Massachusetts, Case No. 02 CV 11137 MEL --.

Insert -- Color Kinetics v. Super Vision International, Inc., "Super Vision International, Inc's Notice of Filing Declaration of Brett Kingstone Part XI," United States District Court, District of Massachusetts, Case No. 02 CV 11137 MEL --.

UNITED STATES PATENT AND TRADEMARK OFFICE
CERTIFICATE OF CORRECTION

PATENT NO. : 7,161,313 B2
APPLICATION NO. : 11/106381
DATED : January 9, 2007
INVENTOR(S) : Colin Piepgras et al.

It is certified that error appears in the above-identified patent and that said Letters Patent is hereby corrected as shown below:

In the Claims:

Col. 38, claim 1, line 43, "when generated, though" should read -- when generated, through --.

Signed and Sealed this

Twenty-fourth Day of June, 2008

JON W. DUDAS
*Director of the United States Patent and Trademark Office*